(12) United States Patent
Yoshimochi et al.

(10) Patent No.: US 11,297,279 B2
(45) Date of Patent: Apr. 5, 2022

(54) TRANSMISSION DEVICE, RECEPTION DEVICE, AND COMMUNICATION SYSTEM

(71) Applicant: Sony Semiconductor Solutions Corporation, Kanagawa (JP)

(72) Inventors: Naoki Yoshimochi, Tokyo (JP);
Tomohiro Takahashi, Tokyo (JP);
Miho Ozawa, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 12 days.

(21) Appl. No.: 17/042,672

(22) PCT Filed: Feb. 14, 2019

(86) PCT No.: PCT/JP2019/005234
§ 371 (c)(1),
(2) Date: Sep. 28, 2020

(87) PCT Pub. No.: WO2019/193842
PCT Pub. Date: Oct. 10, 2019

(65) Prior Publication Data
US 2021/0127087 A1    Apr. 29, 2021

(30) Foreign Application Priority Data
Apr. 5, 2018   (JP) .............................. JP2018-073247

(51) Int. Cl.
*H04N 7/035*   (2006.01)
*G06T 7/11*    (2017.01)
(Continued)

(52) U.S. Cl.
CPC ............. *H04N 7/0357* (2013.01); *G06T 7/11* (2017.01); *H04L 1/0043* (2013.01); *H04L 69/22* (2013.01);
(Continued)

(58) Field of Classification Search
CPC .... H04N 7/0357; H04N 7/18; H04N 21/4728; H04N 5/232; H04N 21/234345;
(Continued)

(56) References Cited

U.S. PATENT DOCUMENTS 10,735,282 B1 *   8/2020  Singh .................. H04L 63/0227
2008/0304737 A1 * 12/2008 Kajita .................. H04N 19/182
                                                                382/165

(Continued)

FOREIGN PATENT DOCUMENTS

JP    2012-209831 A    10/2012
JP    2013-164834 A     8/2013
(Continued)

*Primary Examiner* — Michael E Teitelbaum
(74) *Attorney, Agent, or Firm* — Michael Best & Friedrich LLP

(57) ABSTRACT

A transmission device includes an image processing unit that controls transmission of a first packet including region information regarding a region detected from an image and controls transmission of a second packet for each of lines in which at least the region has been detected in the image. The second packet comprises a header including information regarding the line, and a payload including region data concerning a partial region corresponding to the line, out of the region, in which the header includes: identification information of the data included in the payload; an error correction code of the information included in the header; and an extension region provided so as to be interposed between the identification information and the error correction code, and information indicating whether or not the region data is included in the payload corresponding to the header is set in at least a part of the extension region.

22 Claims, 37 Drawing Sheets

(51) Int. Cl.
*H04L 1/00* (2006.01)
*H04L 29/06* (2006.01)
*H04N 7/18* (2006.01)
*H04L 69/22* (2022.01)

(52) U.S. Cl.
CPC ..... *H04N 7/18* (2013.01); *G06T 2207/20164* (2013.01); *G06T 2207/30232* (2013.01)

(58) Field of Classification Search
CPC ................... H04N 21/236; G06T 7/11; G06T 2207/20164; G06T 2207/30232; H04L 1/0043; H04L 69/22
See application file for complete search history.

(56) References Cited

U.S. PATENT DOCUMENTS

2009/0067626 A1* 3/2009 Dufaux .................. H04N 19/61
380/217
2010/0158099 A1* 6/2010 Kalva ................ H04N 21/8543
375/240.01

FOREIGN PATENT DOCUMENTS

| JP | 2014-39219 A | 2/2014 |
| JP | 2016-201756 A | 12/2016 |

\* cited by examiner

FIG. 3

HEADER INFORMATION TYPE
(Header Info Type)

| Byte | Bit | Contents |
|---|---|---|
| H3 | 31 | Reserved |
| | 30 | Reserved |
| | 29 | Reserved |
| | 28 | Reserved |
| | 27 | Reserved |
| | 26 | Reserved |
| | 25 | Reserved |
| | 24 | Reserved |
| H2 | 23 | Reserved |
| | 22 | Reserved |
| | 21 | Reserved |
| | 20 | Reserved |
| | 19 | Reserved |
| | 18 | Reserved |
| | 17 | Reserved |
| | 16 | Reserved |

← EXTENSION REGION

| Byte | Bit | Contents |
|---|---|---|
| H5 | 47 | EBD Line |
| | 46 | Data ID[3] |
| | 45 | Data ID[2] |
| | 44 | Data ID[1] |
| | 43 | Data ID[0] |
| | 42 | Outputs "0" |
| | 41 | Outputs "0" |
| | 40 | Outputs "0" |
| H4 | 39 | Reserved |
| | 38 | Reserved |
| | 37 | Reserved |
| | 36 | Reserved |
| | 35 | Reserved |
| | 34 | Reserved |
| | 33 | Reserved |
| | 32 | Reserved |

← EXTENSION REGION

FIG.4

HEADER INFORMATION TYPE (Header Info Type)

| Byte | Bit | Contents |
|---|---|---|
| H5 | 47 | EBD Line |
| | 46 | Data ID[3] |
| | 45 | Data ID[2] |
| | 44 | Data ID[1] |
| | 43 | Data ID[0] |
| | 42 | Outputs "0" |
| | 41 | Outputs "0" |
| | 40 | Outputs "1" |
| H4 | 39 | Reserved |
| | 38 | Reserved |
| | 37 | Reserved |
| | 36 | Reserved |
| | 35 | Reserved |
| | 34 | Reserved |
| | 33 | Reserved |
| | 32 | Reserved |

PAYLOAD LENGTH

| Byte | Bit | Contents |
|---|---|---|
| H3 | 31 | Line Length[15] |
| | 30 | Line Length[14] |
| | 29 | Line Length[13] |
| | 28 | Line Length[12] |
| | 27 | Line Length[11] |
| | 26 | Line Length[10] |
| | 25 | Line Length[9] |
| | 24 | Line Length[8] |
| H2 | 23 | Line Length[7] |
| | 22 | Line Length[6] |
| | 21 | Line Length[5] |
| | 20 | Line Length[4] |
| | 19 | Line Length[3] |
| | 18 | Line Length[2] |
| | 17 | Reserved |
| | 16 | Reserved |

FIG.6

| SIGNAL NAME | NUMBER OF BYTES |
|---|---|
| ROI ID | 2 |
| UPPER-LEFT COORDINATES | 4 |
| HEIGHT | 2 |
| WIDTH | 2 |
| AD bit | 1 |
| EXPOSURE | 2 |
| GAIN | 1 |
| SENSING INFORMATION | 8 |

FIG. 7

| Byte | Bit | Contents |
|------|-----|----------|
| H5 | 47 | EBD Line |
|  | 46 | Data ID[3] |
|  | 45 | Data ID[2] |
|  | 44 | Data ID[1] |
|  | 43 | Data ID[0] |
|  | 42 | Outputs "0" |
|  | 41 | Outputs "0" |
|  | 40 | Outputs "1" |
| H4 | 39 | Reserved |
|  | 38 | Reserved |
|  | 37 | Reserved |
|  | 36 | Reserved |
|  | 35 | Reserved |
|  | 34 | Reserved |
|  | 33 | Reserved |
|  | 32 | Reserved |

HEADER INFORMATION TYPE
INDICATING THAT REGION INFORMATION IS
TO BE TRANSMITTED (Header Info Type)

| Byte | Bit | Contents |
|------|-----|----------|
| H3 | 31 | Line Length[15] |
|  | 30 | Line Length[14] |
|  | 29 | Line Length[13] |
|  | 28 | Line Length[12] |
|  | 27 | Line Length[11] |
|  | 26 | Line Length[10] |
|  | 25 | Line Length[9] |
|  | 24 | Line Length[8] |
| H2 | 23 | Line Length[7] |
|  | 22 | Line Length[6] |
|  | 21 | Line Length[5] |
|  | 20 | Line Length[4] |
|  | 19 | Line Length[3] |
|  | 18 | Line Length[2] |
|  | 17 | Reserved |
|  | 16 | Reserved |

INFORMATION INDICATING THAT REGION COORDINATES ARE TO BE TRANSMITTED
INFORMATION INDICATING THAT REGION DATA IS TO BE TRANSMITTED

| SIGNAL NAME | NUMBER OF BYTES |
|---|---|
| ROI ID | 2 |
| UPPER-LEFT COORDINATES | 4 |
| HEIGHT | 2 |
| WIDTH | 2 |
| AD bit | 1 |
| EXPOSURE | 2 |
| GAIN | 1 |
| SENSING INFORMATION | 8 |

FIG. 16

| Byte | Bit | Contents |
|---|---|---|
| H5 | 47 | EBD Line |
|  | 46 | Data ID[3] |
|  | 45 | Data ID[2] |
|  | 44 | Data ID[1] |
|  | 43 | Data ID[0] |
|  | 42 | Outputs "0" |
|  | 41 | Outputs "0" |
|  | 40 | Outputs "1" |
| H4 | 39 | Reserved |
|  | 38 | Reserved |
|  | 37 | Reserved |
|  | 36 | Reserved |
|  | 35 | Reserved |
|  | 34 | Reserved |
|  | 33 | Reserved |
|  | 32 | Reserved |

HEADER INFORMATION TYPE INDICATING THAT REGION INFORMATION IS TO BE TRANSMITTED (Header Info Type)

| Byte | Bit | Contents |
|---|---|---|
| H3 | 31 | Line Length[15] |
|  | 30 | Line Length[14] |
|  | 29 | Line Length[13] |
|  | 28 | Line Length[12] |
|  | 27 | Line Length[11] |
|  | 26 | Line Length[10] |
|  | 25 | Line Length[9] |
|  | 24 | Line Length[8] |
| H2 | 23 | Line Length[7] |
|  | 22 | Line Length[6] |
|  | 21 | Line Length[5] |
|  | 20 | Line Length[4] |
|  | 19 | Line Length[3] |
|  | 18 | Line Length[2] |
|  | 17 | Reserved |
|  | 16 | Reserved |

INFORMATION INDICATING THAT REGION COORDINATES ARE TO BE TRANSMITTED
INFORMATION INDICATING THAT REGION DATA IS TO BE TRANSMITTED

| SIGNAL NAME | NUMBER OF BYTES |
|---|---|
| ROI ID | 2 |
| UPPER-LEFT COORDINATES | 4 |
| HEIGHT | 2 |
| WIDTH | 2 |
| AD bit | 1 |
| EXPOSURE | 2 |
| GAIN | 1 |
| SENSING INFORMATION | 8 |

FIG. 23

HEADER INFORMATION TYPE
INDICATING THAT REGION INFORMATION IS
TO BE TRANSMITTED (Header Info Type)

| Byte | Bit | Contents |
|---|---|---|
| H5 | 47 | EBD Line |
| | 46 | Data ID[3] |
| | 45 | Data ID[2] |
| | 44 | Data ID[1] |
| | 43 | Data ID[0] |
| | 42 | Outputs "0" |
| | 41 | Outputs "0" |
| | 40 | Outputs "1" |
| H4 | 39 | Reserved |
| | 38 | Reserved |
| | 37 | Reserved |
| | 36 | Reserved |
| | 35 | Reserved |
| | 34 | Reserved |
| | 33 | Reserved |
| | 32 | Reserved |

| Byte | Bit | Contents |
|---|---|---|
| H3 | 31 | Line Length[15] |
| | 30 | Line Length[14] |
| | 29 | Line Length[13] |
| | 28 | Line Length[12] |
| | 27 | Line Length[11] |
| | 26 | Line Length[10] |
| | 25 | Line Length[9] |
| | 24 | Line Length[8] |
| H2 | 23 | Line Length[7] |
| | 22 | Line Length[6] |
| | 21 | Line Length[5] |
| | 20 | Line Length[4] |
| | 19 | Line Length[3] |
| | 18 | Line Length[2] |
| | 17 | Reserved |
| | 16 | Reserved |

INFORMATION INDICATING THAT REGION DATA IS TO BE TRANSMITTED

| SIGNAL NAME | NUMBER OF BYTES |
|---|---|
| ROI ID | 2 |
| UPPER-LEFT COORDINATES | 4 |
| HEIGHT | 2 |
| WIDTH | 2 |
| AD bit | 1 |
| EXPOSURE | 2 |
| GAIN | 1 |
| SENSING INFORMATION | 8 |

FIG.30

HEADER INFORMATION TYPE
INDICATING THAT REGION INFORMATION IS
TO BE TRANSMITTED (Header Info Type)

| Byte | Bit | Contents |
|---|---|---|
| H3 | 31 | Line Length[15] |
| | 30 | Line Length[14] |
| | 29 | Line Length[13] |
| | 28 | Line Length[12] |
| | 27 | Line Length[11] |
| | 26 | Line Length[10] |
| | 25 | Line Length[9] |
| | 24 | Line Length[8] |
| H2 | 23 | Line Length[7] |
| | 22 | Line Length[6] |
| | 21 | Line Length[5] |
| | 20 | Line Length[4] |
| | 19 | Line Length[3] |
| | 18 | Line Length[2] |
| | 17 | Reserved |
| | 16 | Reserved |

| Byte | Bit | Contents |
|---|---|---|
| H5 | 47 | EBD Line |
| | 46 | Data ID[3] |
| | 45 | Data ID[2] |
| | 44 | Data ID[1] |
| | 43 | Data ID[0] |
| | 42 | Outputs "0" |
| | 41 | Outputs "0" |
| | 40 | Outputs "1" |
| H4 | 39 | Reserved |
| | 38 | Reserved |
| | 37 | Reserved |
| | 36 | Reserved |
| | 35 | Reserved |
| | 34 | Reserved |
| | 33 | Reserved |
| | 32 | Reserved |

INFORMATION INDICATING REGION TYPE (ROI Info Type)
INFORMATION INDICATING THAT REGION DATA IS TO BE TRANSMITTED

FIG. 31

| PH | ROI Info | ROI DATA |

| ROI Info Type[3:0] | | | | | | | | | | | |
|---|---|---|---|---|---|---|---|---|---|---|---|
| 4'b0000 | NO CHANGE FROM PREVIOUS PACKET | | | | | | | | | | |
| 4'b0001, 4'b0010, 4'b0011 | NO SETTING | | | | | | | | | | |
| 4'b0100 | Num of ROI | 1st ROI ID | 2nd ROI ID | ... | Last ROI ID | | | | | | |
| 4'b0101 | Num of ROI | 1st ROI ID | 1st ROI LEN | 2nd ROI ID | 2nd ROI LEN | ... | Last ROI ID | Last ROI LEN | | | |
| 4'b0110 | Num of ROI | 1st ROI ID | 1st ROI X | 2nd ROI ID | 2nd ROI X | ... | Last ROI ID | Last ROI X | | | |
| 4'b0111 | Num of ROI | 1st ROI ID | 1st ROI X | 1st ROI LEN | 2nd ROI ID | 2nd ROI X | 2nd ROI LEN | ... | Last ROI ID | Last ROI X | Last ROI LEN |
| 4'b1000 | Y | Last ROI ID | | | | | | | | | |
| 4'b1001, 4'b1010, 4'b1011 | NO SETTING | | | | | | | | | | |
| 4'b1100 | Y | Num of ROI | 1st ROI ID | 2nd ROI ID | ... | Last ROI ID | | | | | |
| 4'b1101 | Y | Num of ROI | 1st ROI ID | 1st ROI LEN | 2nd ROI ID | 2nd ROI LEN | ... | Last ROI ID | Last ROI LEN | | |
| 4'b1110 | Y | Num of ROI | 1st ROI ID | 1st ROI X | 2nd ROI ID | 2nd ROI X | ... | Last ROI ID | Last ROI X | | |
| 4'b1111 | Y | Num of ROI | 1st ROI ID | 1st ROI X | 1st ROI LEN | 2nd ROI ID | 2nd ROI X | 2nd ROI LEN | ... | Last ROI ID | Last ROI X | Last ROI LEN |

TRANSMISSION DEVICE, RECEPTION DEVICE, AND COMMUNICATION SYSTEM

FIELD

The present disclosure relates to a transmission device, a reception device, and a communication system.

BACKGROUND

In recent years, there have been increasing opportunities to use applications of transmitting a large amount of large-capacity data. This often leads to application of heavy load to the transmission system, and in the worst case, the transmission system might be interrupted, leading to a data transmission failure.

CITATION LIST

Patent Literature

Patent Literature 1: JP 2016-201756 A
Patent Literature 2: JP 2013-164834 A
Patent Literature 3: JP 2012-209831 A
Patent Literature 4: JP 2014-39219 A

SUMMARY

Technical Problem

Due to the above situation in the background, there has been a demand for introducing a technology capable of reducing the load on the transmission system, for example, by transmitting only the data of a partial region cut out from the captured image instead of transmitting the captured image data as a whole. Note that techniques for cutting out a partial region from a captured image are disclosed in Patent Literatures 1 to 4, for example.

In view of these, the present disclosure proposes a technology capable of transmitting data in a region that is set for an image in a more preferable manner.

Solution to Problem

According to the present disclosure, a transmission device is provided that includes an image processing unit that controls to transmit a first packet including region information regarding a region detected from an image and controls to transmit a second packet for each of lines in which at least the region has been detected in the image, the second packet including: a header including information regarding the line; and a payload including region data concerning a partial region corresponding to the line, out of the region, wherein the header includes: identification information of the data included in the payload; an error correction code of the information included in the header; and an extension region provided so as to be interposed between the identification information and the error correction code, and information indicating whether or not the region data is included in the payload corresponding to the header is set in at least a part of the extension region.

Moreover, according to the present disclosure, a reception device is provided that includes an image processing unit that restores a partial image corresponding to a region detected from an image, based on a result of reception of a first packet including region information regarding the region and based on a result of reception of a second packet for each of lines in which at least the region has been detected in the image, the second packet including: a header including information regarding the line; and a payload including region data concerning a partial region corresponding to the line, out of the region, wherein the header includes: identification information of the data included in the payload; an error correction code of the information included in the header; and an extension region provided so as to be interposed between the identification information and the error correction code, and information indicating whether or not the region data is included in the payload corresponding to the header is set in at least a part of the extension region.

According to the present disclosure, a communication system is provided that includes: a transmission device including a first image processing unit that controls to transmit a first packet including region information regarding a region detected from an image and controls to transmit a second packet for each of lines in which at least the region has been detected in the image, the second packet including a header including information regarding the line, and a payload including region data concerning a partial region corresponding to the line, out of the region; and a reception device including a second image processing unit that restores a partial image corresponding to the region on the basis of a result of reception of the first packet and a result of reception of the second packet for each of lines in which at least the region has been detected in the image, wherein the header includes: identification information of the data included in the payload; an error correction code of the information included in the header; and an extension region provided so as to be interposed between the identification information and the error correction code, and information indicating whether or not the region data is included in the payload corresponding to the header is set in at least a part of the extension region.

Moreover, according to the present disclosure, a transmission device is provided that includes an image processing unit that controls to transmit a first packet including region information regarding a region detected from an image and controls to transmit a second packet for each of lines in which at least the region has been detected in the image, the second packet including: a header including information regarding the line; and a payload including region data concerning a partial region corresponding to the line, out of the region, wherein whether or not the payload of the second packet includes the region data is recognized on the receiving side of the second packet, based on at least one of information included in the header corresponding to the payload or the region information.

Moreover, according to the present disclosure, a reception device is provided that includes an image processing unit that restores a partial image corresponding to a region detected from an image, based on a result of reception of a first packet including region information regarding the region and based on a result of reception of a second packet for each of lines in which at least the region has been detected in the image, the second packet including: a header including information regarding the line; and a payload including region data concerning a partial region corresponding to the line, out of the region, wherein the image processing unit recognizes whether or not the payload of the second packet includes the region data, based on at least one of information included in the header corresponding to the payload or the region information.

Moreover, according to the present disclosure, a communication system is provided that includes: a transmission device including a first image processing unit that controls to transmit a first packet including region information regarding a region detected from an image and controls to transmit a second packet for each of lines in which at least the region has been detected in the image, the second packet including a header including information regarding the line, and a payload including region data concerning a partial region corresponding to the line, out of the region; and a reception device including a second image processing unit that restores a partial image corresponding to the region on the basis of a result of reception of a first packet and a result of reception of a second packet for each of lines in which at least the region has been detected in the image, wherein the second image processing unit recognizes whether or not the payload of the second packet includes the region data, based on at least one of information included in the header corresponding to the payload or the region information.

Advantageous Effects of Invention

As described above, according to the present disclosure, there is provided a technology capable of transmitting data in a region that is set for an image in a more preferable manner.

It is noted that the above effects are not necessarily limited, and, along with or instead of the above effects, any of the effects described in the present specification or other effects which can be understood from the present specification may be exhibited.

BRIEF DESCRIPTION OF DRAWINGS

FIG. 3 is a diagram illustrating an extension region provided in a header of a packet.

FIG. 4 is a diagram illustrating an extension region provided in a header of a packet.

FIG. 6 is a diagram illustrating an example of information included in Embedded Data in the first transmission method.

FIG. 7 is a diagram illustrating an example of a configuration of a packet header in the first transmission method.

FIG. 9 is a diagram illustrating an example of data transmitted by the first transmission method.

FIG. 11 is a diagram illustrating another example of data transmitted by the first transmission method.

FIG. 15 is a diagram illustrating an example of information included in Embedded Data in the second transmission method.

FIG. 16 is a diagram illustrating an example of a configuration of a packet header in the second transmission method.

FIG. 17 is a diagram illustrating an example of data transmitted by the second transmission method.

FIG. 18 is a diagram illustrating another example of data transmitted by the second transmission method.

FIG. 22 is a diagram illustrating an example of information included in Embedded Data in the third transmission method.

FIG. 23 is a diagram illustrating an example of a configuration of a packet header in the third transmission method.

FIG. 24 is a diagram illustrating an example of data transmitted by the third transmission method.

FIG. 25 is a diagram illustrating another example of data transmitted by the third transmission method.

FIG. 29 is a diagram illustrating an example of information included in Embedded Data in the fourth transmission method.

FIG. 30 is a diagram illustrating an example of a configuration of a packet header in the fourth transmission method.

FIG. 31 is a diagram illustrating an example of information indicating a region type.

DESCRIPTION OF EMBODIMENTS

Figure 1:
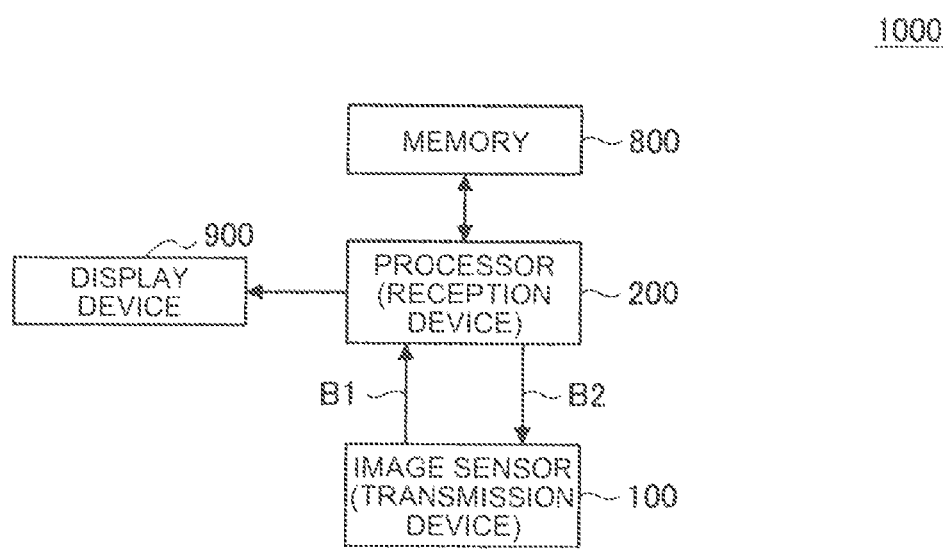
FIG. 1 is a diagram illustrating an example of a system configuration of a communication system according to an embodiment of the present disclosure.

Hereinafter, preferred embodiments of the present disclosure will be described in detail with reference to the accompanying drawings. Note that in the present specification and drawings, components having substantially the same functional configuration will be denoted by the same reference numerals, and a redundant description thereof will be omitted.

Note that the description will be provided in the following order.
1. System configuration
2. Packet structure
3. Technical features
3.1. First transmission method
3.2. Second transmission method
3.3. Third transmission method
3.4. Fourth transmission method
3.5. Supplement
4. Conclusion

1. SYSTEM CONFIGURATION

First, a system configuration example of a communication system according to an embodiment of the present disclosure will be described.

For example, FIG. 1 is a diagram illustrating an example of a system configuration of a communication system according to an embodiment of the present disclosure.

A communication system 1000 includes an image sensor 100, a processor 200, memory 800, and a display device 900, for example.

The image sensor 100 has an imaging function and a transmission function and transmits data indicating an image generated by imaging. The processor 200 receives the data transmitted from the image sensor 100 and processes the received data. That is, in the communication system 1000, the image sensor 100 functions as a transmission device and the processor 200 functions as a reception device.

Note that although FIG. 1 illustrates the communication system 1000 having one image sensor 100, the number of image sensors 100 included in the communication system according to the present embodiment is not limited to the example illustrated in FIG. 1. For example, the communication system according to the present embodiment may include two or more image sensors 100.

Note that although FIG. 1 illustrates the communication system 1000 having one processor 200, the number of processor 200 included in the communication system according to the present embodiment is not limited to the example illustrated in FIG. 1. For example, the communication system according to the present embodiment may include two or more processors 200.

In a communication system having a plurality of image sensors 100 and processors 200, the image sensors 100 and the processors 200 may correspond one-to-one, or one processor 200 may correspond to the plurality of image sensors 100. Furthermore, in a communication system including a plurality of image sensors 100 and a plurality of processors 200, the plurality of processors 200 may correspond to one image sensor 100.

In a communication system including the plurality of image sensors 100 and the plurality of processors 200, communication is performed between the image sensors 100 and the processors 200 similarly to the communication system 1000 illustrated in FIG. 1.

The image sensor 100 and the processor 200 are electrically connected by a data bus B1. The data bus B1 is a signal transmission path that connects the image sensor 100 and the processor 200. For example, data representing an image transmitted from the image sensor 100 (hereinafter, sometimes referred to as "image data") is transmitted from the image sensor 100 to the processor 200 via the data bus B1.

The image sensor 100 and the processor 200 may be electrically connected by a control bus B2 different from the data bus B1, for example. The control bus B2 is a transmission path that connects the image sensor 100 and the processor 200 for transmission of other signals. For example, control information output from the processor 200 may be transmitted from the processor 200 to the image sensor 100 via the control bus B2.

The control information may include information used for control and a processing command. Examples of the information used for control include pieces of information for controlling functions of the image sensor 100, such as an image size, a frame rate, and an amount of output delay from the reception of an image output command to the output of an image. Furthermore, the control information may include identification information indicating the image sensor 100. An example of the identification information is any type of information capable of specifying the image sensor 100, such as an ID set in the image sensor 100.

Note that the information transmitted from the processor 200 to the image sensor 100 via the control bus B2 is not limited to the above example. For example, the processor 200 may transmit, via the control bus B2, region designation information that designates a region of an image. An example of the region designation information is information in any format capable of specifying the region, such as information indicating the position of the pixel included in the region (for example, coordinates indicating the position of the pixel included in the region).

While FIG. 1 illustrates an example of electrically connecting the image sensor 100 and the processor 200 by the control bus B2, the image sensor 100 and the processor 200 need not necessarily be connected by the control bus B2. For example, the image sensor 100 and the processor 200 may transmit and receive control information or the like by wireless communication using any transmission method.

Hereinafter, each of devices constituting the communication system 1000 illustrated in FIG. 1 will be described.

(Memory 800)

The memory 800 is a recording medium included in the communication system 1000. Examples of the memory 800 include volatile memory such as random access memory (RAM) and non-volatile memory such as flash memory. The memory 800 operates on electric power supplied from an internal power supply (not illustrated) such as a battery included in the communication system 1000, or electric power supplied from an external power supply of the communication system 1000.

The memory 800 store an image output from the image sensor 100 for example. Recording of an image to the memory 800 is controlled by the processor 200, for example.

(Display Device 900)

The display device 900 is a display device included in the communication system 1000. Examples of the display device 900 include a liquid crystal display and an organic electro-luminescence (EL) display (also referred to as an organic light emitting diode (OLED) display). The display device 900 operates on electric power supplied from an internal power supply (not illustrated) such as a battery included in the communication system 1000, or electric power supplied from an external power supply of the communication system 1000.

The display screen of the display device 900 is used to display, for example, various images and screens such as an image output from the image sensor 100, a screen related to an application executed on the processor 200, and a screen related to a user interface (UI). The display of an image or the like on the display screen of the display device 900 is controlled by the processor 200, for example.

(Processor 200 (Reception Device))

The processor 200 receives the data transmitted from the image sensor 100 and processes the received data. As described above, the processor 200 functions as a reception device in the communication system 1000. An example of a configuration related to processing of data transmitted from the image sensor 100 (configuration for functioning as a reception device) will be described below.

The processor 200 includes one or more processors having an arithmetic circuit such as a micro processing unit (MPU) and various processing circuits. The processor 200 operates on electric power supplied from an internal power supply (not illustrated) such as a battery included in the communication system 1000, or electric power supplied from an external power supply of the communication system 1000.

The processor 200 performs various processes such as a process related to the recording control of image data to a recording medium such as the memory 800, a process related to the display control of an image onto a display screen of the display device 900, and a process of executing arbitrary application software. Examples of the process related to recording control include a "process of transferring control data including a recording command and data to be recorded onto a recording medium to a recording medium such as the memory 800". Furthermore, examples of the process related to the display control include "a process of transferring control data including a display command and data to be displayed on the display screen to a display device such as the display device 900".

Furthermore, the processor 200 may control the function of the image sensor 100 by transmitting control information to the image sensor 100, for example. The processor 200 can also control the data transmitted from the image sensor 100 by transmitting region designation information to the image sensor 100, for example.

(Image Sensor 100 (Transmission Device))

The image sensor 100 has an imaging function and a transmission function and transmits data indicating an image generated by imaging. As described above, the image sensor 100 functions as a transmission device in the communication system 1000.

The image sensor 100 includes any type of image sensor device capable of generating an image, such as "an imaging device such as a digital still camera, a digital video camera, or a stereo camera", an "infrared sensor", or a "distance image sensor". The image sensor 100 has a function of transmitting the generated image. The image generated by the image sensor 100 corresponds to the data representing the sensing result obtained by the image sensor 100. An example of the configuration of the image sensor 100 will be described below.

The image sensor 100 transmits data (hereinafter, also referred to as "region data") corresponding to a region that is set for an image by a transmission method according to each of embodiments described below. The control regarding the transmission of the region data is performed by a component (described below) that functions as an image processing unit in the image sensor 100. The region that is set for an image is referred to as a region of interest (ROI) in some cases. In the following, the region that is set for an image is referred to as either a "region" or a "ROI". That is, a term simply described as "region" indicates a region (ROI) that is set in an image unless otherwise specified.

Examples of the process regarding the setting of a region for an image include arbitrary processes capable of specifying a partial region in an image (or arbitrary processes capable of cutting out a partial region from an image), such as "a process of detecting an object from an image and setting a region including the detected object", and "a process of setting a region designated by an operation onto an arbitrary operation device.

The process related to the setting of the region for the image may be performed by either the image sensor 100 or by an external device such as the processor 200. In a case where the image sensor 100 performs the process regarding the setting of the region for the image, the image sensor 100 specifies a region according to the result of the process regarding the setting of the region for the image. Furthermore, for example, in a case where the external device performs the process regarding the setting of the region for the image, the image sensor 100 specifies the region based on the region designation information acquired from the external device.

Transmission of the region data, that is, the data of a partial image by the image sensor 100 enables reduction of the amount of data related to the transmission compared with the case of transmitting an entire image. Accordingly, transmission of the region data by the image sensor 100 leads to various effects achieved by smaller data amount, such as reduction of the transmission time, reduction of the load related to the transmission in the communication system 1000, for example.

Note that the image sensor 100 can also transmit data representing an entire image.

In a case where the image sensor 100 has a function of transmitting region data as well as a function of transmitting data representing the entire image, the image sensor 100 is capable of selectively switching between transmission of region data and transmission of data representing the entire image.

The image sensor 100 transmits either region data or data representing the entire image, for example, according to the set operation mode. The operation mode is set by an operation on an arbitrary operation device, for example.

Furthermore, the image sensor 100 may selectively switch between transmission of region data and transmission of data representing the entire image, based on region designation information acquired from an external device. For example, the image sensor 100 transmits region data of the region corresponding to the region designation information when the region designation information is acquired from the external device; or transmits the data representing an entire image when the region designation information is not acquired from the external device.

The communication system 1000 has the configuration illustrated in FIG. 1, for example. Note that the configuration of the communication system according to the present embodiment is not limited to the example illustrated in FIG. 1.

For example, while FIG. 1 illustrates the image sensor 100 as an example of the device that functions as a transmission device, the device that functions as the transmission device is not limited to the image sensor 100. For example, in a case where the communication system according to the present embodiment has a configuration including an image sensor device such as an imaging device and a transmitter electrically connected to the image sensor device, the transmitter may function as a transmission device.

Furthermore, while FIG. 1 illustrates the processor 200 as an example of the device that functions as a reception device, the device that functions as the reception device is not limited to the processor 200. For example, in the communication system according to the present embodiment, any device having a function of receiving data can function as the reception device.

Furthermore, in cases where an image transmitted from the image sensor 100 is stored in a recording medium external to the communication system, where an image transmitted from the image sensor 100 is stored in the memory included in the processor 200, or where the image transmitted from the image sensor 100 is not to be recorded, the communication system according to the present embodiment need not include the memory 800.

Furthermore, the communication system according to the present embodiment can have a configuration not including the display device 900 illustrated in FIG. 1.

Furthermore, the communication system according to the present embodiment may have any configuration according to the function of an electronic device to which the communication system according to the present embodiment described below is applied.

Application Examples

Subsequently, an application example of the communication system according to the present embodiment will be described. Examples of the communication system 1000 include a communication device such as a smartphone, a drone (device capable of remote operation or autonomous operation), and a moving body such as an automobile. Furthermore, the application example of the communication system 1000 is not limited to the above example. That is, the present embodiment is applicable to various types of electronic devices such as a communication device such as a smartphone, a drone (devices capable of remote operation or autonomous operation), a moving body such as an automobile, a computer such as a personal computer (PC), a tablet devices and game machines.

2. PACKET STRUCTURE

Next, an example of the structure of a packet used for transmitting an image from the image sensor 100 (transmission device) to the processor 200 (reception device) in the communication system according to the present embodiment will be described. In the communication system according to the present embodiment, an image captured by the image sensor 100 is divided into partial images in units of lines, and the data of the partial image of each of the lines is transmitted using one or more packets. This similarly applies to the region data concerning the region that is set for the image (that is, image data of a portion for which the ROI is set).

Figure 2:
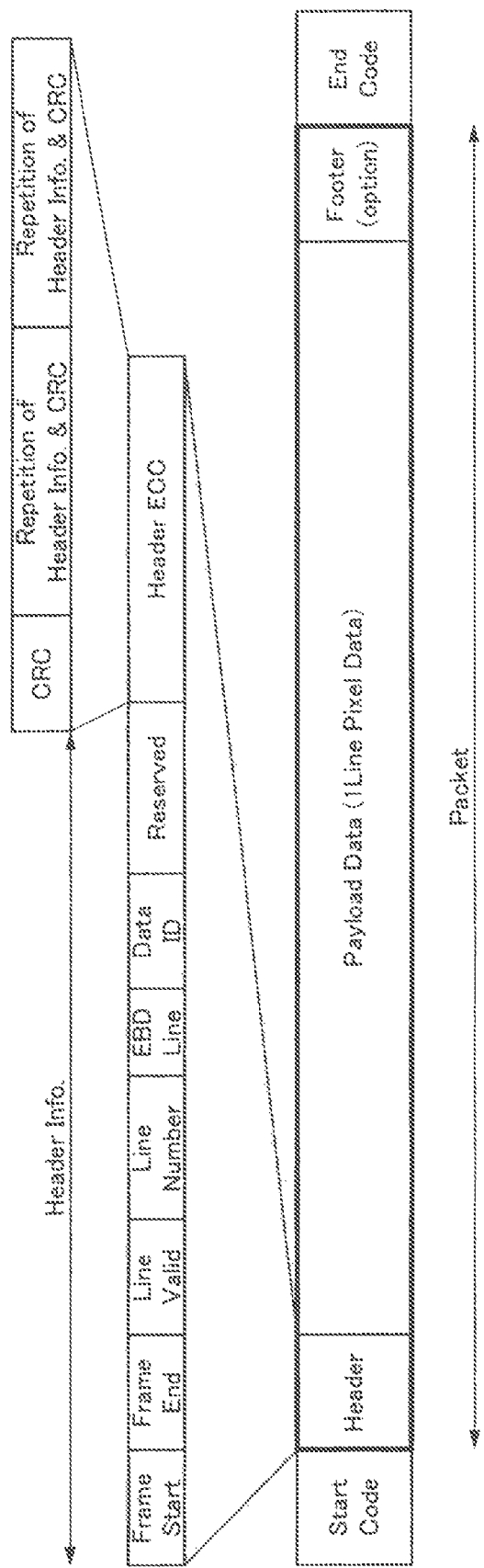
FIG. 2 is a diagram illustrating an example of a structure of a packet used for transmitting image data in the communication system according to the embodiment.

For example, FIG. 2 is a diagram illustrating an example of a structure of a packet used for transmitting image data in the communication system according to the present embodiment. As illustrated in FIG. 2, a packet (Packet) used for image transmission is defined as a series of data that starts with a start code (Start Code) and ends with an end code (End Code) in a data stream. Furthermore, the packet includes a header (Header) and payload data (Payload Data) arranged in this order. A footer (Footer) may be added after the payload data. The payload data (hereinafter, also simply referred to as "payload") includes pixel data of partial images in units of lines. The header includes various types of information regarding the line corresponding to the partial image included in the payload. The footer contains additional (optional) information.

Here, the information included in the header will be described. As illustrated in FIG. 2, the header includes items of "Frame Start", "Frame End", "Line Valid", "Line Number", "EBD Line", "Data ID", "Reserved", and "Header ECC" in this order.

Frame Start is 1-bit information indicating the top of the frame. For example, Frame Start of the header of the packet used for transmitting the pixel data of the first line out of the image data to be transmitted is set to value 1, while Frame Start of the header of the packet used to transmit the pixel data of another line is set to value 0. Note that Frame Start corresponds to an example of "information indicating a start of a frame".

Frame End is 1-bit information indicating the end of the frame. For example, Frame End of the header of the packet having a payload containing pixel data at the ending line of the valid pixel region out of the image data to be transmitted is set to value 1, while Frame End of the header of the packet used to transmit pixel data of another line of the pixel data is set to value 0. The Frame End corresponds to an example of "information indicating the end of the frame".

Frame Start and Frame End correspond to an example of frame information that is information regarding a frame.

Line Valid is 1-bit information indicating whether or not the line of pixel data stored in the payload is a line of valid pixels. Line Valid of the header of the packet used for transmitting the pixel data of a line within a valid pixel region is set to value 1, while Line Valid of the header of the packet used for transmitting the pixel data of another line is set to value 0. Note that Line Valid corresponds to an example of "information indicating whether or not the corresponding line is valid".

Line Number is 13-bit information indicating the line number of the line including the pixel data stored in the payload.

An EBD Line is 1-bit information indicating whether or not the line includes embedded data. That is, the EBD Line corresponds to an example of "information indicating whether or not the line includes embedded data".

Data ID is 4-bit information for identifying each of data (that is, the data included in the payload) when the data is transferred in a plurality of streams. Data ID corresponds to an example of "identification information of data included in payload".

Line Valid, Line Number, EBD Line, and Data ID correspond to line information that is information regarding a line.

"Reserved" is a 27-bit region for extension. In the following, the region indicated as "Reserved" will also be referred to as an "extension region". In addition, the entire header information has the data amount of 6 bytes.

As illustrated in FIG. 2, Header ECC that is arranged to follow the header information includes a cyclic redundancy check (CRC) code that is a 2-byte error detection code calculated based on the 6-byte header information. That is, the Header ECC corresponds to an example of "error correction code of information included in header". In addition, the Header ECC includes the CRC code followed by two pieces of information, each of which is identical to the 8-byte information that is a set of header information and a CRC code.

That is, the header of one packet includes three sets of the identical header information and CRC code. The entire header has the total data amount of 24 bytes, which is obtained by summing 8 bytes of the first set of header information and CRC code, 8 bytes of the second set of header information and CRC code, and 8 bytes of the third set of header information and CRC code.

Here, the extension region (Reserved) provided in the header of a packet will be described with reference to FIGS. 3 and 4. FIGS. 3 and 4 are diagrams illustrating an extension region provided in the header of a packet.

As illustrated in FIG. 3, an extension region is a region to which information indicating the type according to the information transmitted in the packet is set as the header information type (Header Info Type) for the top 3 bits. In accordance with the type of the header information, the format of the information set in the remaining 24-bit region of the extension region excluding the 3 bits for designating the type of the header information (that is, the type of information and a position at which the information is set) is determined. This allows the receiving side to confirm the type of the header information to recognize what type of information is set at which position in the region other than the region in the extension region designating the type of the header information and to read out the information.

For example, FIG. 4 illustrates an example of setting the type of header information and an example of the setting in a case where the payload length of a packet (in other words, line length) is set variable, as an example method of using an extension region according to the setting. Specifically, the example illustrated in FIG. 4 sets a value according to the type in the case where the payload length is set variable, for the type of header information. More specifically, the example illustrated in FIG. 4 sets "001" for the header information type, as a value different from "000" set in the header information type in the example illustrated in FIG. 3. That is, in this case, the type corresponding to "001" out of the types of header information means the type corresponding to the case where the payload length is variable. Furthermore, 14 bits in the extension region are assigned to "Line Length" in the example illustrated in FIG. 4. "Line Length" is information for notifying the payload length. This configuration allows the receiving side to recognize that the payload length is variable based on the value set as the type of header information and read the value set as "Line Length" in the extension region, thereby enabling the receiving side to recognize the payload length.

An example of the structure of a packet used for transmitting an image from the image sensor 100 (transmission device) to the processor 200 (reception device) in the communication system according to the present embodiment has been described as above with reference to FIGS. 2 to 4.

3. TECHNICAL FEATURES

Next, as a technical feature of the communication system according to the present disclosure, an example of a transmission method for transmitting region data of a region (ROI) that is set for an image will be individually described as a first transmission method to a fourth transmission method.

<3.1. First Transmission Method>

First, a first transmission method will be described. The image sensor 100 stores region data of the region set in the image into the payload of the packet and transmits the stored data for each of lines. Accordingly, in the following description, a portion corresponding to each of lines in the region set in the image is also referred to as a "partial region" for convenience.

(Data Format)

Figure 5:
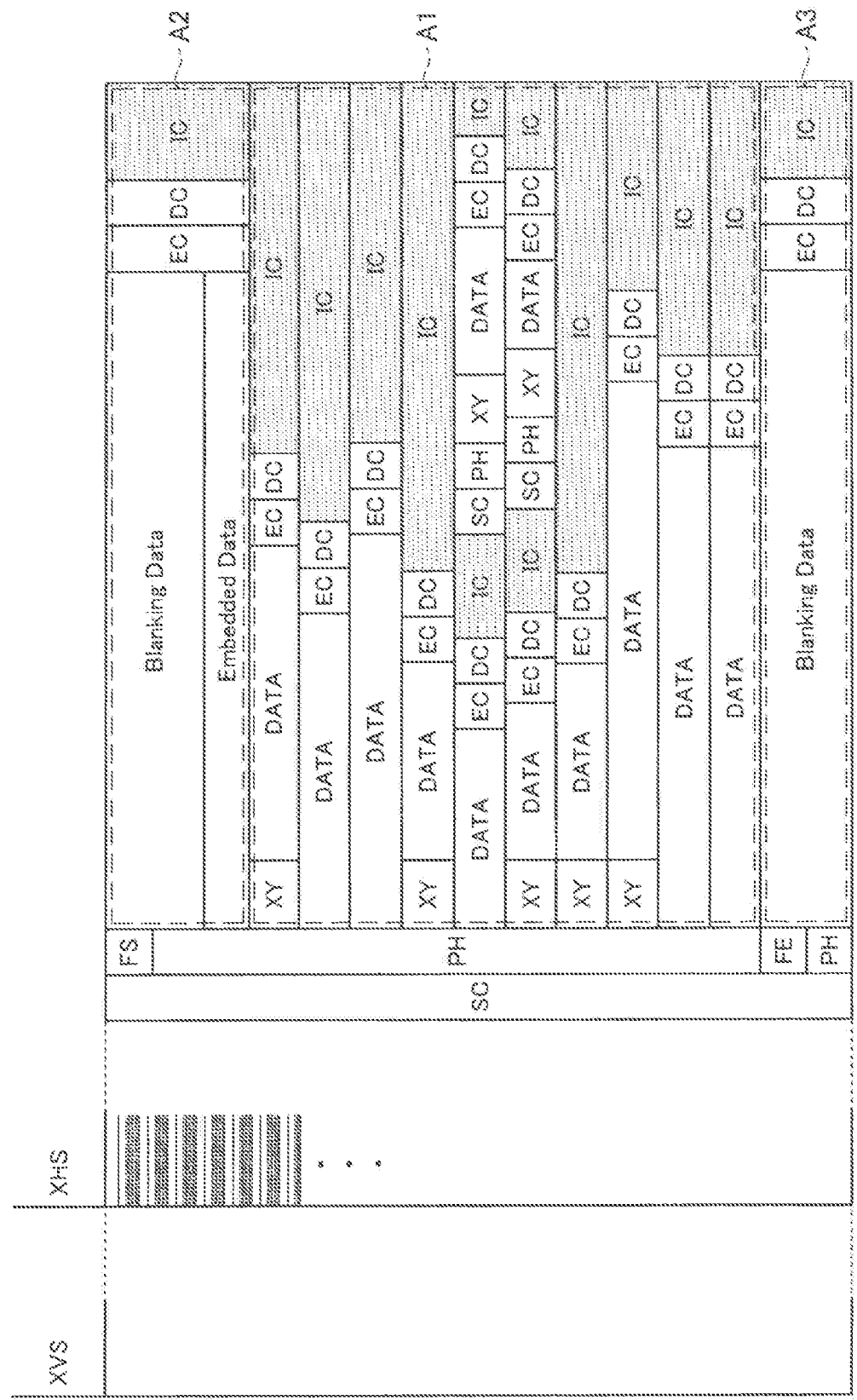
FIG. 5 is a diagram illustrating a format of data transmitted by a first transmission method.

First, the format of data transmitted by the first transmission method will be described. For example, FIG. 5 is a diagram illustrating the format of data transmitted by the first transmission method. In FIG. 5, a series of packets indicated by reference sign A1 schematically illustrates a packet used to transmit the region data concerning the region set in the image (in other words, a packet used for transmitting the data of the valid pixel region). The series of packets indicated by reference signs A2 and A3 correspond to packets different from the packet used for transmitting the region data. In the following description, when the packets indicated by reference signs A1, A2, and A3 are distinguished from each other, they are also referred to as "packet A1", "packet A2", and "packet A3" for convenience. That is, during the period in which data for one frame is transmitted, the series of packets A2 is transmitted before transmission of the series of packets A1. Furthermore, the series of packets A3 may be transmitted after transmission of the series of packets. Note that at least one of packets A2 and A3 corresponds to an example of the "first packet". The packet A1 corresponds to an example of the "second packet".

In the example illustrated in FIG. 5, at least a part of the series of packets A2 is used for transmitting Embedded Data. For example, Embedded Data may be transmitted in a state of being stored in the payload of packet A2. Furthermore, as another example, the embedded data may be transmitted in a state of being stored in a region other than the payload of packet A2.

Embedded Data corresponds to additional information transmitted by the image sensor 100 additionally (in other words, information embedded by the image sensor 100), and this corresponds to information regarding image capturing conditions or information regarding a region (ROI) for which region data is transmitted.

For example, FIG. 6 is a diagram illustrating an example of information included in Embedded Data in the first transmission method. As illustrated in FIG. 6, Embedded Data includes information such as "ROI ID", "upper left coordinate", "height", "width", "AD word length (AD bit)", "exposure", "gain", and sensing information, for example. The example illustrated in FIG. 6 also illustrates an example of the number of bytes of each of pieces of information described above.

The information of "ROI ID", "upper left coordinate", "height", and "width" corresponds to the information regarding the region (ROI) set in the image and used for restoring the image of the region on the receiving side. Specifically, the "ROI ID" is identification information for identifying each of regions. The "upper left coordinate" corresponds to the coordinate as an index of the position, within an image, of the region set for the image and indicates upper left vertex coordinate in a rectangular range in which the region is set. The "height" and the "width" indicate the height (length in the vertical direction) and width (length in the horizontal direction) of the rectangular region in which the region is set. Note that, among the embedded data, in particular, information regarding the region (ROI), such as the above-described "ROI ID", "upper left coordinate", "height", and "width" corresponds to an example of "region information" included in the first packet (for example, packet A2).

The "exposure" information indicates the exposure time regarding the imaging of the region (ROI). The "gain" information indicates the gain regarding the imaging of the region. The AD word length (AD bit) indicates the word length of data per pixel obtained by AD-conversion in the region. Examples of the sensing information include the details of calculation regarding an object (subject) included in the region or supplementary information for subsequent signal processing on the image in the region.

In the example illustrated in FIG. 5, at least a part of packet A2 is used for transmitting Embedded Data. However, at least a part of packet A3, instead of packet A2, may be used for transmitting Embedded Data. Furthermore, in the following description, Embedded Data is also referred to as "EBD".

In FIG. 5, "SC" represents "Start Code", which is a symbol group indicating the start of a packet. The Start Code is added before the packet. The Start Code is represented by, for example, four symbols of K28.5, K27.7, K28.2, and K27.7, which are combinations of three types of K Characters.

"EC" represents "End Code", which is a symbol group indicating the end of a packet. The End Code is added after the packet. The End Code is represented by, for example, four symbols of K28.5, K27.7, K30.7, and K27.7, which are combinations of three types of K Characters.

"PH" represents a "packet header", and corresponds to the header described with reference to FIG. 2, for example. "FS" represents a frame start (FS) packet. "FE" represents a frame end (FE) packet.

"DC" represents "Deskew Code", which is a symbol group used for correcting Data Skew between lanes, that is, a deviation in reception timing of data received in individual lanes on the receiving side. The Deskew Code is represented by four symbols of K28.5 and Any**, for example.

"IC" indicates "Idle Code", which is a symbol group repeatedly transmitted during a period other than the transmission time of packet data. The Idle Code is expressed in D00.0 (00000000) of the D Character which is the 8B10B Code, for example.

"DATA" indicates region data stored in the payload (that is, pixel data of a portion corresponding to the region set in the image).

"XY" corresponds to information indicating the position of the left end (the position in the image) of the partial region corresponding to the region data stored in the payload as the X coordinate and the Y coordinate. Hereinafter, the X coordinate and the Y coordinate indicating the position of the left end of the partial region, which is indicated by "XY", will also be simply referred to as the "XY coordinate of the partial region".

The XY coordinates of the partial region are stored at the top of the payload of packet A1. In addition, in a case where there is no change in the X coordinates of the corresponding partial regions between consecutively transmitted packets A1 and the Y coordinate is incremented by just 1, the XY coordinates of the partial regions may be omitted in packet A1 to be transmitted later. Note that this control will be described below separately with a specific example.

Furthermore, in the case of transmitting region data concerning a partial region corresponding to each of a plurality of region for a line in which a plurality of regions separated from each other in the horizontal direction are set in the first transmission method, packet A1 is generated individually for each of the plurality of regions and transmitted. That is, two packets A1 are generated and transmitted for a line in which two regions separated from each other in the horizontal direction are set.

Next, with reference to FIG. 7, an example of a configuration of the packet header of packet A1 used for transmitting the region data of the region (ROI) that is set in the image will be described, focusing particularly on the configuration of the extension region. FIG. 7 is a diagram illustrating an example of a configuration of the packet header in the first transmission method.

As illustrated in FIG. 7, in the case of transmitting the region data of the region (ROI) set in the image in the first transmission method, information indicating that the region information is to be transmitted (that is, the information corresponding to the type assuming the transmission of the region information) is set as a header information type in the packet header of packet A1 used for transmitting the region data. Furthermore, information indicating that the region data (that is, region data concerning the partial region) is to be transmitted using the payload is set to at least a part of the extension region. In addition, in the case of transmitting the coordinates of the region (that is, the XY coordinates of the partial region) using the payload, information indicating that the coordinates of the region are to be transmitted is set for at least a part of the extension region. In the case of transmitting the region data concerning the region (ROI) set in the image, the payload length of packet A1 can change according to the width of the region in the horizontal direction. Therefore, information indicating the payload length may be set in a part of the extension region, similarly to the example described with reference to FIG. 4.

Example of Data

Next, with reference to FIGS. 8 to 11, a specific example of data transmitted by the first transmission method will be described as an example in a case where the first transmission method is applied.

Figure 8:
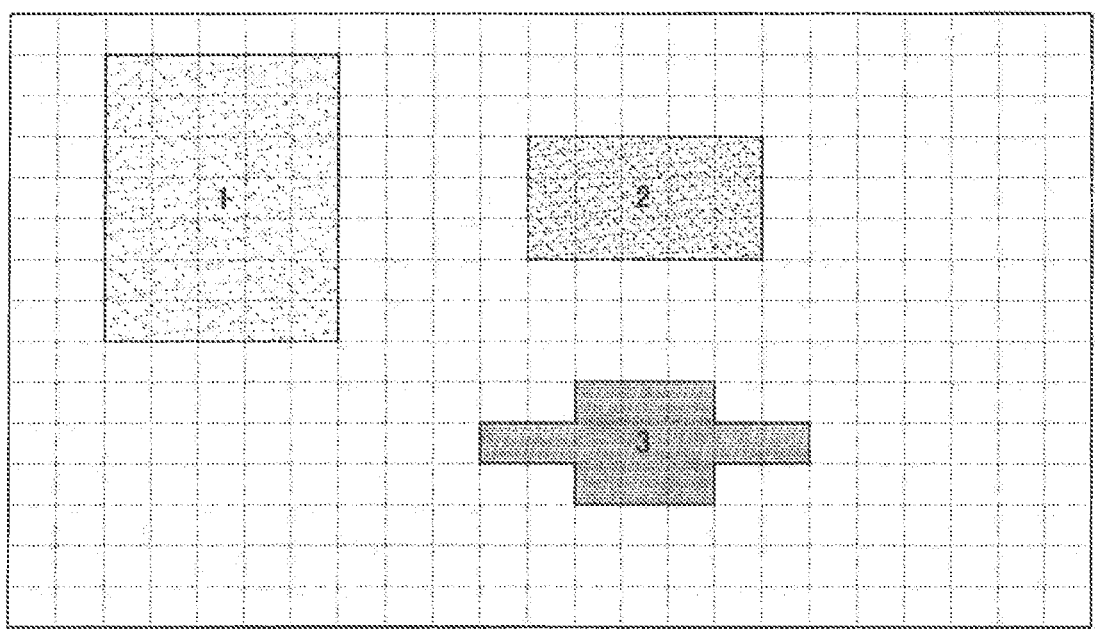
FIG. 8 is a diagram illustrating an example of a region that is set for an image.

For example, FIG. 8 is a diagram illustrating an example of a region (ROI) that is set for an image. In FIG. 8, three regions of region 1, region 2, and region 3 are illustrated as an example of regions set for an image. Furthermore, in FIG. 8, a grid divided by broken lines extending in the vertical direction and the horizontal direction schematically illustrates a piece of unit data (for example, pixel) forming the image. In the example illustrated in FIG. 8, the coordinates of the upper left vertex of each of grids are defined as the coordinates of the grid for convenience.

Figure 9:
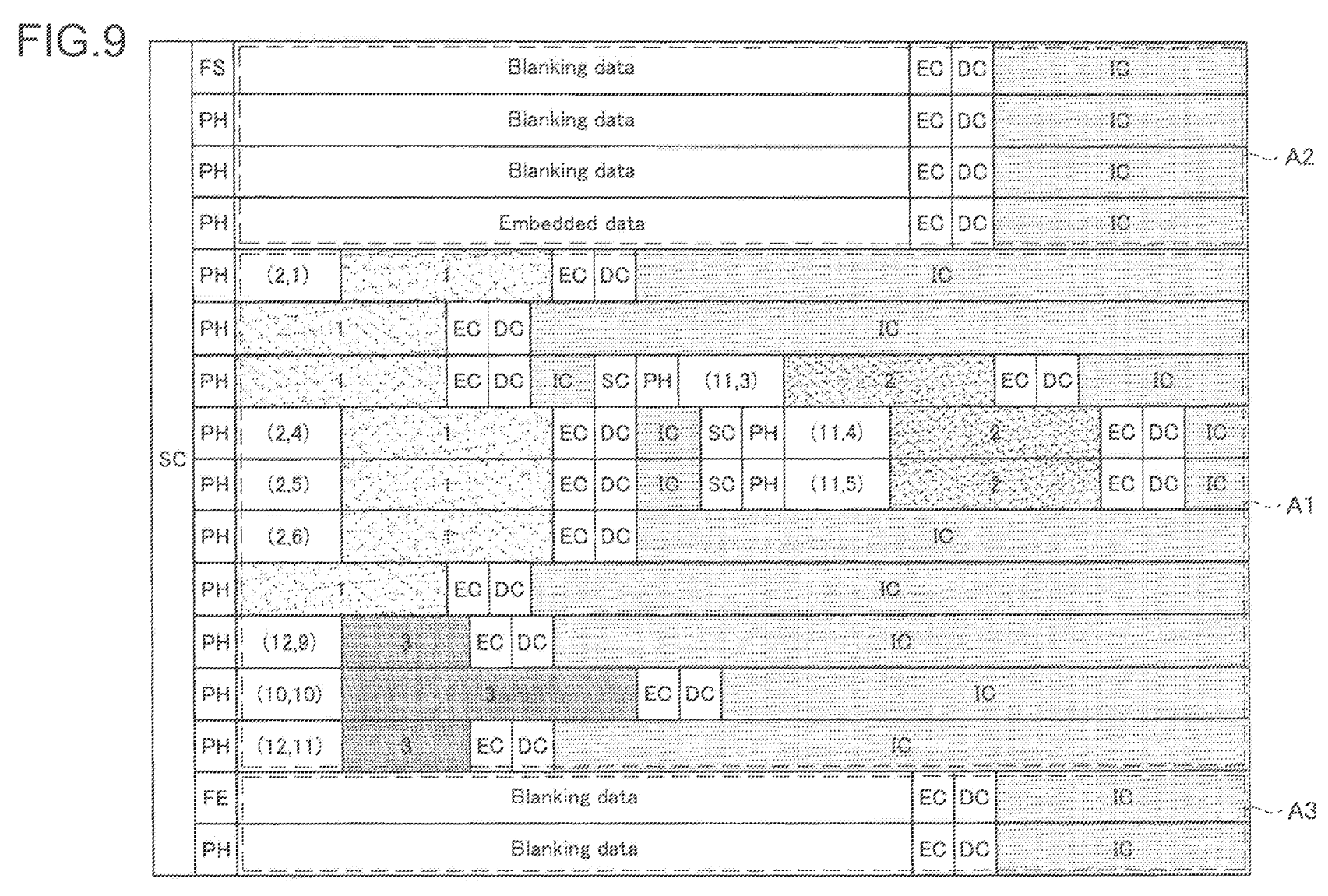

Furthermore, FIG. 9 is a diagram illustrating an example of data transmitted by the first transmission method, illustrating one-frame data in a case where the region data concerning each of the regions illustrated in FIG. 8 is transmitted by the first transmission method. Note that the configurations of packets A2 and A3 in FIG. 9 are substantially similar to the example described with reference to FIG. 5, and hence the following description will focus on the configuration of packet A1. Furthermore, each of "1", "2", and "3" illustrated in FIG. 9 corresponds to the data of region 1, the data of region 2, and the data of region 3 stored in the payload of packet A1.

For example, the payload of packet A1 used for transmitting the data of the partial region in the first line of region 1 stores, at its top, coordinates (x,y)=(2,1) of the left end of the partial region, and stores, at its succeeding portion, region data concerning the partial region. Moreover, in partial regions in the second and third lines of region 1 as a target of subsequent transmission of the region data, the X coordinates at the left end are similar to the partial region of the first line, with the Y coordinates being incremented by 1 from the immediately preceding line. Therefore, in the payload of packet A1 used for transmitting the data of the partial regions on the second and third lines of region 1, the XY coordinates of the partial regions are omitted.

Meanwhile, in the lines corresponding to the third to fifth lines of region 1, the partial regions of region 1 and region 2 are set to be separated in the horizontal direction. Accordingly, in transmission of these lines, packet A1 having the region data concerning the partial region of region 1 stored in the payload and packet A1 having the region data of the partial region of region 2 stored in the payload are alternately transmitted. That is, in these lines, the corresponding partial regions have mutually different X coordinates at the left end between packets A1 that are continuously transmitted. Therefore, for these lines, the XY coordinates of the partial region (that is, the coordinates (x, y) of the left end of the corresponding partial region) are stored at the top of the payload of each of packets A1.

Furthermore, region 3 is set to include three line regions in the horizontal direction, in which the X coordinate of the left end of the partial region corresponding to the first and third lines differs from the X coordinate of the left end of the partial region corresponding to the second line. That is, in the lines corresponding to the first to third lines of region 3, the corresponding partial regions have mutually different the X coordinate at the left end between packets A1 that are continuously transmitted. Therefore, for these lines, the XY coordinates of the partial region (that is, the coordinates (x, y) of the left end of the corresponding partial region) are stored at the top of the payload of each of packets A1.

Figure 10:
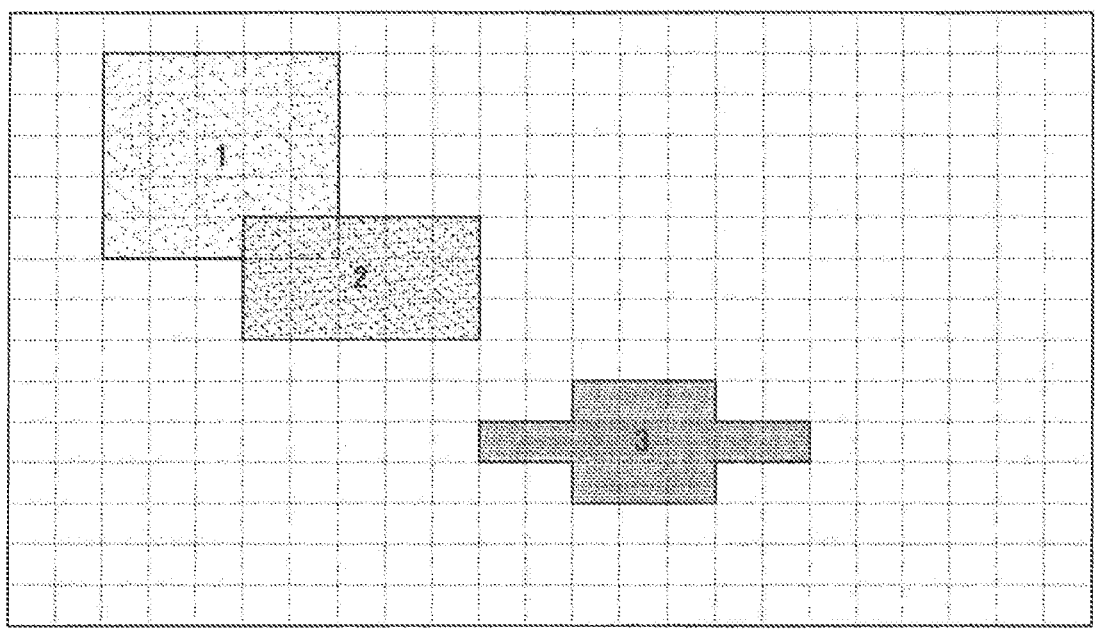
FIG. 10 is a diagram illustrating another example of a region that is set for an image.

Furthermore, FIG. 10 is a diagram illustrating another example of a region (ROI) that is set for an image. In FIG. 10, three regions of region 1, region 2, and region 3 are illustrated as an example of regions set for an image. Note that, in FIG. 10, a grid divided by broken lines extending in the vertical direction and the horizontal direction schematically illustrates a piece of unit data forming the image, similarly to the example described with reference to FIG. 8. Therefore, also in the example illustrated in FIG. 10, the coordinates of the upper left vertex of each of grids are defined as the coordinates of the grid for convenience.

Figure 11:
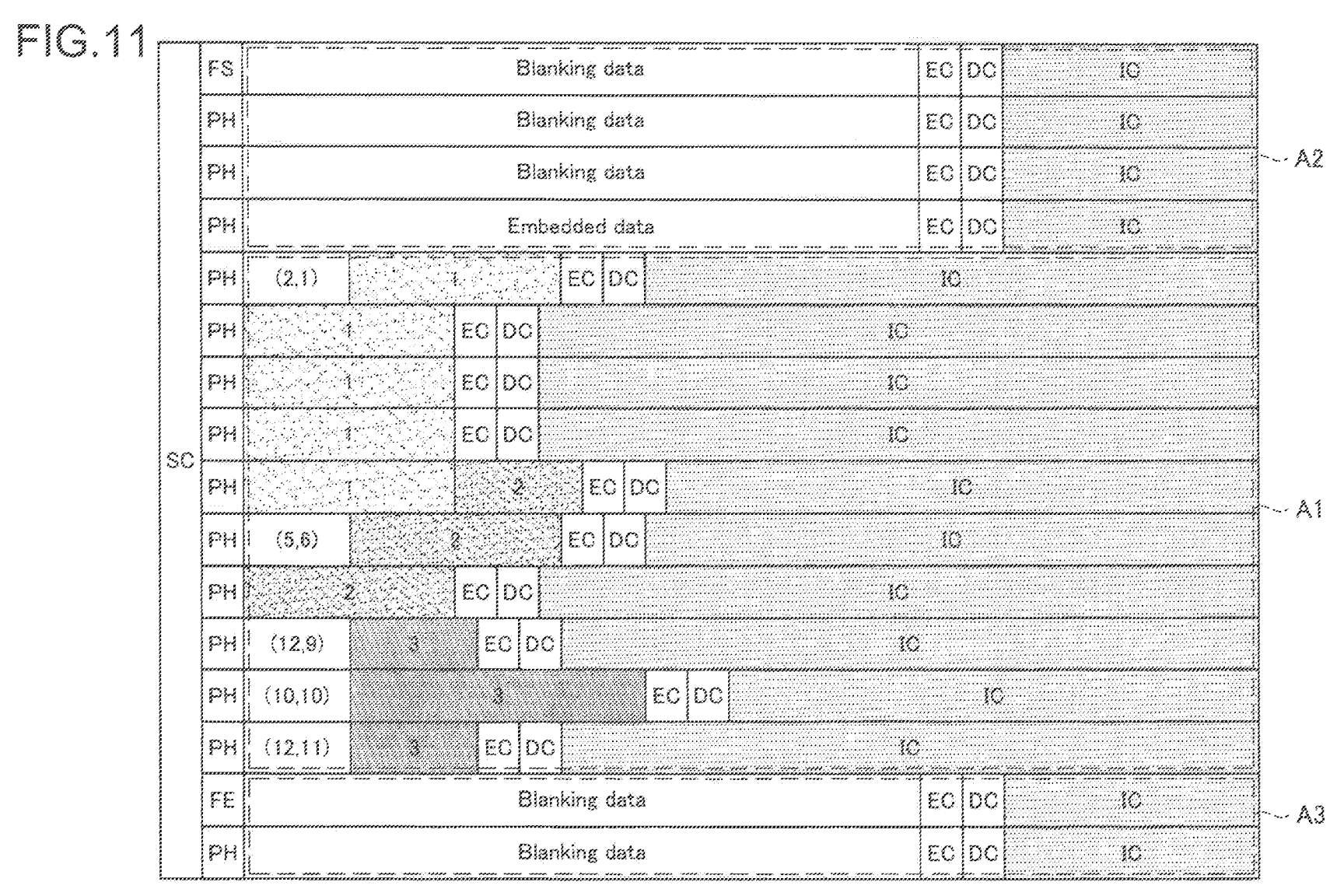

Furthermore, FIG. 11 is a diagram illustrating an example of data transmitted by the first transmission method, illustrating one-frame data in a case where the region data concerning each of the regions illustrated in FIG. 10 is transmitted by the first transmission method. Note that the configurations of packets A2 and A3 in FIG. 11 as well are substantially similar to the example described with reference to FIG. 5, and hence the description will focus on the configuration of packet A1. Furthermore, each of "1", "2", and "3" illustrated in FIG. 11 corresponds to the data of region 1, the data of region 2, and the data of region 3 stored in the payload of packet A1.

For example, the payload of packet A1 used for transmitting the data of the partial region in the first line of region 1 stores, at its top, coordinates (x,y)=(2,1) of the left end of the partial region, and stores, at its succeeding portion, region data concerning the partial region. Moreover, in partial regions in the second to fifth lines of region 1 as a target of subsequent transmission of the region data, the X coordinates at the left end are similar to the partial region of the first line, with the Y coordinates being incremented by 1 from the immediately preceding line. Therefore, in the payload of packet A1 used for transmitting the data of the partial regions on the second to fifth lines of region 1, the XY coordinates of the partial regions are omitted.

Furthermore, a portion on the right end side of the partial region on the fifth line of region 1 overlaps a portion on the left end side of the partial region on the first line of region 2. Therefore, the payload of packet A1 used for transmitting the data in the partial region in the fifth line of region 1 stores the region data concerning the partial region in the first line of region 2 following the region data concerning the partial region in the fifth line in region 1. Note that it is allowable to arbitrarily set whether the overlapping portion between the partial region of region 1 and the partial region of region 2 is to be transmitted either as the region data concerning the partial region of region 1 or the region data concerning the partial region of region 2. For example, in the example illustrated in FIG. 11, the overlapping portion between the partial region of region 1 and the partial region of region 2 is transmitted as region data concerning the partial region of region 1.

Region 3 is similar to the example described with reference to FIGS. 8 and 9, and thus detailed description thereof will be omitted.

Example of Configuration of Image Sensor 100 (Transmission Device)

Figure 12:
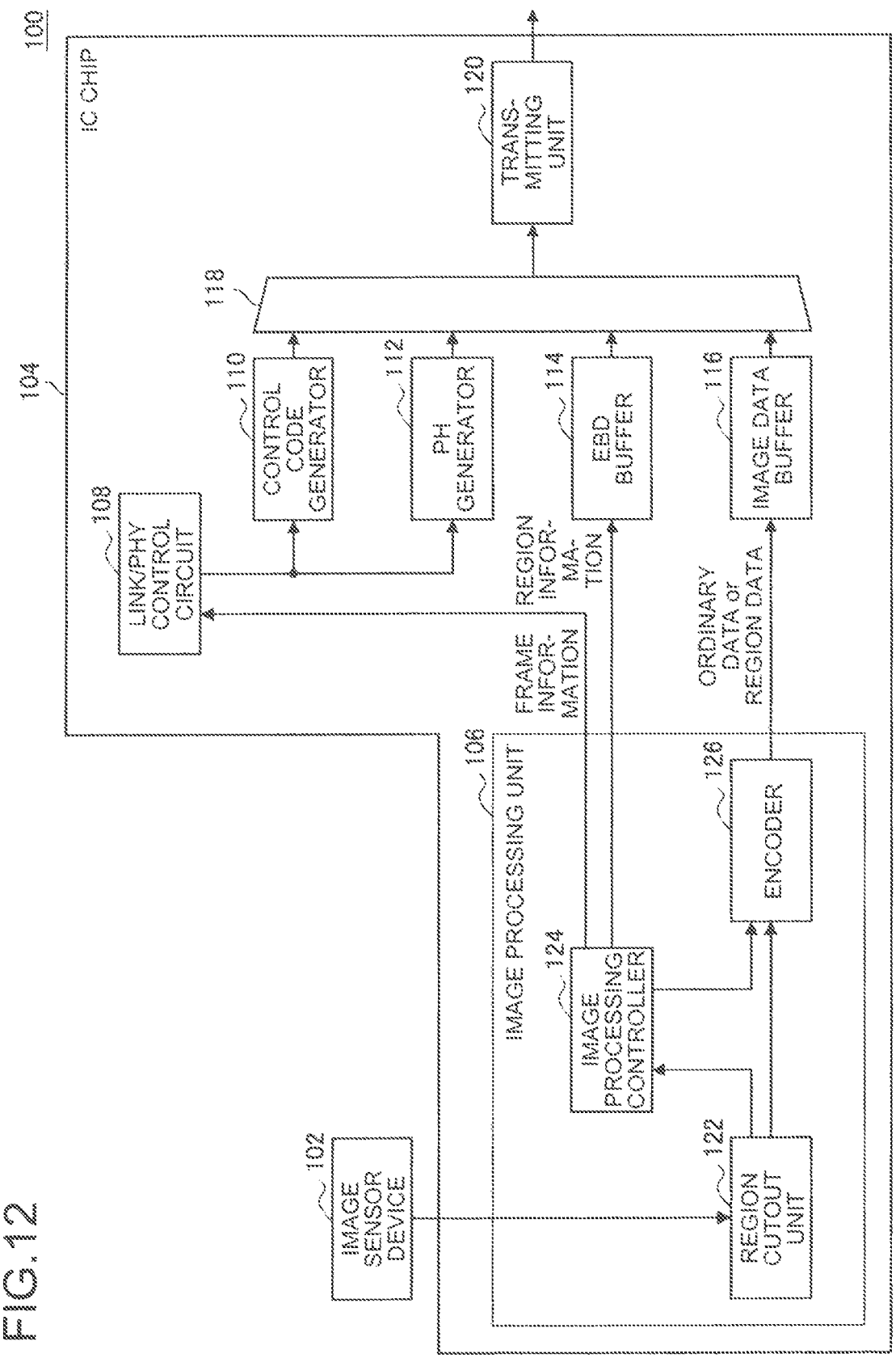
FIG. 12 is a block diagram illustrating an example of a functional configuration of an image sensor in the case of applying the first transmission method.

Next, an example of a functional configuration of the image sensor 100 (transmission device) in the case of applying the first transmission method will be described. For example, FIG. 12 is a block diagram illustrating an example of a functional configuration of the image sensor 100 in the case of applying the first transmission method. As illustrated in FIG. 12, the image sensor 100 includes an image sensor device 102 and an IC chip 104, for example. The image sensor 100 in FIG. 12 operates on electric power supplied from an internal power supply (not illustrated) such as a battery included in the communication system 1000, or electric power supplied from an external power supply of the communication system 1000.

Examples of the image sensor device 102 include image sensor devices of any method capable of generating an image, such as "an imaging device including a digital still camera", "an infrared sensor", or "a distance image sensor".

As an example, an imaging device that functions as the image sensor device 102 includes a lens, an imaging element, and a signal processing circuit.

The lens and the imaging element include, for example, an optical system lens and an image sensor using a plurality of imaging elements, such as a complementary metal oxide semiconductor (CMOS) and a charge coupled device (CCD).

The signal processing circuit includes an automatic gain control (AGC) circuit and an analog to digital converter (ADC), and converts an analog signal generated by the imaging element into a digital signal (image data). The signal processing circuit also performs various processes related to RAW development, for example. The signal processing circuit may further perform various signal processing such as a white balance correction process, a color tone correction process, a gamma correction process, a YCbCr conversion process, and an edge enhancement process.

Furthermore, the signal processing circuit may also perform processing related to the setting of the region for an image and may transfer the region designation information to the IC chip 104. Furthermore, the signal processing circuit may transfer various data such as exposure information and gain information to the IC chip 104.

The signal representing the image generated by the image sensor device 102 is transferred to the IC chip 104. When the signal representing the image transferred from the image sensor device 102 to the IC chip 104 is an analog signal, the IC chip 104 converts the analog signal into a digital signal by an ADC provided and processes the image data obtained by the conversion. The following is a case where image data is transferred from the image sensor device 102 to the IC chip 104 as an example.

The IC chip 104 is a chip formed with an integrated circuit (IC) in which a circuit related to the data transmission function using the first transmission method is integrated. The IC chip 104 is used to process image data transferred from the image sensor device 102 and transmit the data corresponding to the generated image. The data corresponding to an image is either image data transferred from the image sensor device 102 (that is, data representing the entire image) or region data concerning a region that is set in the image. The circuit related to the data transmission function according to the first transmission method is not limited to the implementation in the form of one IC chip, and may be formed of a plurality of IC chips.

The IC chip 104 includes an image processing unit 106, a LINK/PHY controller 108, a control code generator 110, a PH generator 112, an EBD buffer 114, an image data buffer 116, a combining unit 118, and a transmitting unit 120.

The image processing unit 106 can be formed as one circuit having a function of performing processes related to the transmission method according to the present embodiment. When performing the process related to the transmission method according to the present embodiment, the image processing unit 106 controls, for each of lines in the image, to transmit region data corresponding to the region that is set in the image, through the LINK/PHY controller 108, the control code generator 110, the PH generator 112, the EBD buffer 114, the image data buffer 116, the combining unit 118, and the transmitting unit 120, using the first transmission method. The image processing unit 106 can also control to transmit the image data transferred from the image sensor device 102 (that is, the data representing the entire image) for each of lines.

The image processing unit 106 can be formed by a processor such as an MPU, for example.

The function of the image processing unit 106 will be described in the form of functional blocks. As illustrated in FIG. 10, the image processing unit 106 includes a region cutout unit 122, an image processing controller 124, and an encoder 126, for example.

The region cutout unit 122 has a function of performing a process related to the setting of a region for an image and thus sets a region (ROI) for the image represented by the image data transferred from the image sensor device 102. The region cutout unit 122 performs a process related to region setting for an image, for example, according to the set operation mode. For example, the region cutout unit 122 performs the process related to the region setting for an image in a case where the operation mode is an operation mode of transmitting region data. Furthermore, in a case where the operation mode is an operation mode of transmitting data representing an entire image, the region cutout unit 122 would not perform the process related to the region setting for the image.

The region cutout unit 122 detects an object by performing an arbitrary object detection process on an image and sets a region including the detected object for each of the detected objects. Furthermore, the region cutout unit 122 may set a region designated by an operation on an arbitrary operation device or the like. The region that is set by the region cutout unit 122 can include a rectangular region such as the regions 1 and 2 in FIGS. 8 and 10 or a region of any shape other than rectangular to be set to an image such as region 3 illustrated in FIGS. 8 and 10.

In a case where the region is set, the region cutout unit 122 transfers region designation information indicating the set region to the image processing controller 124, for example. In a case where the region is not set, the region cutout unit 122 would not transfer the region designation information to the image processing controller 124.

The region cutout unit 122 also transfers image data transferred from the image sensor device 102 to the encoder 126.

The image processing controller 124 has a function of performing a process related to the transmission method according to the present embodiment, and thus transfers the region information concerning the region set for the image to the encoder 126 and the EBD buffer 114. At this time, the image processing controller 124 may set the additional information other than the region information and may transfer the region information and the other additional information to the EBD buffer 114 as a series of additional information. Note that examples of the series of additional information including the region information include information defined in Embedded Data described with reference to FIG. 6, for example.

An example of the process of setting additional information can be a process of generating additional information. Examples of the process of generating additional information include one or two or more of the processes, namely, a process of generating information indicating the amount of data in the region, a process of generating information indicating the size of the region, and a process of generating information indicating the priority of the region.

Note that the process of setting additional information is not limited to the process of generating the additional information. For example, the image processing controller 124 may set information acquired from the image sensor device 102, such as exposure information and gain information, as additional information. Furthermore, the image processing controller 124 may set, as additional information, data concerning various regions, such as data indicating a physical region length, data indicating an output region length, data indicating an image format, and data indicating the total amount of data. Examples of the physical region length include the number of pixels of the image sensor device 102. Examples of the output region length include the number of pixels of the image (length on the image) output from the image sensor device 102.

The image processing controller 124 specifies a region included in each of lines of the image on the basis of the region designation information acquired from the region cutout unit 122 or region designation information (not illustrated) acquired from an external device, for example. Subsequently, the image processing controller 124 sets the region information based on the specified region.

In addition, the image processing controller 124 sets information (that is, XY coordinates of the partial region) indicating the position, within the image, of the region included in each of lines (that is, the partial region for each of lines). At this time, in a case where there is no change from the previous position for transmission of the region data of the partial region in the horizontal direction (for example, the X coordinate at the left end), the image processing controller 124 does not need to set information (that is, the XY coordinates of the partial region) indicating the position for the partial region for which transmission of the region data is to be performed. Subsequently, the image processing controller 124 transfers information indicating the position, within the image, of the region included in each of lines to the encoder 126.

In addition, in a case where the region designation information is not acquired, the image processing controller 124 would not set the region information.

Furthermore, the image processing controller 124 may generate frame information and transfer the generated frame information to the LINK/PHY controller 108, for example. Examples of the frame information include the above-described Frame Start, Frame End, or the like, which are assigned to each of frames. Furthermore, frame information may include data indicating data type such as YUV data, RGB data, or RAW data.

The encoder 126 encodes image data transferred from the image sensor device 102 using a predetermined method such as a method corresponding to the joint photographic experts group (JPEG) standard, for example.

In a case where the region information is not acquired from the image processing controller 124, the encoder 126 transfers the encoded image data to the image data buffer 116. Hereinafter, encoded image data, that is, data indicating the entire encoded image will be referred to as "ordinary data" in some cases.

In addition, in a case where the region information is acquired from the image processing controller 124, the encoder 126 transfers the encoded region data corresponding to the region to the image data buffer 116 according to the acquired region information. At this time, the encoder 126 may associate each of pieces of region data with information indicating the position, within the image, of the region (that is, the partial region for each of lines) corresponding to the region data. Furthermore, at this time, in a case where the position of the target partial region in the horizontal direction (for example, the X coordinate of the left end) has not changed from the previous region data transmission position of the partial region in the horizontal direction, the encoder 126 does not need to associate the region data concerning the target partial region with the information indicating the position of the partial region. More specifically, the encoder 126 may insert information indicating the position of the corresponding partial region at the top of the region data, as indicated by "XY" in the examples illustrated in FIGS. 9 and 11.

The image processing unit 106 includes the region cutout unit 122, the image processing controller 124, and the encoder 126, for example, and thereby performs the process related to the transmission method according to the present embodiment. Note that the functional blocks of the image processing unit 106 illustrated in FIG. 12 are obtained by dividing the functions of the image processing unit 106 for convenience, and how to divide the functions in the image processing unit 106 is not limited to the example illustrated in FIG. 12.

The LINK/PHY controller 108 transfers frame information to the control code generator 110 and the PH generator 112 for each of lines, for example. Furthermore, at this time, the LINK/PHY controller 108 may control the protocol and the transmission path related to the data transmission and may transfer a result of the control to the control code generator 110 and the PH generator 112.

The control code generator 110 sets an error correction code for each of lines. The control code generator 110 generates an error correction code for a line on the basis of data (for example, Frame Start or Frame End) for the line in the frame information. The control code generator 110 transfers the generated error correction code to the combining unit 118, for example. Furthermore, the control code generator 110 may generate an error correction code in cooperation with the PH generator 112.

The PH generator 112 uses the frame information to generate a packet header for each of lines. At this time, in the case of transmitting region data, the PH generator 112 sets information indicating that the region information (for example, region data) is to be transmitted as the header information type to the extension region of the packet header as described above. Thereafter, the PH generator 112 sets information indicating that the region data is to be transmitted using the payload, for at least a part of the extension region. Furthermore, regarding a packet in which the coordinates of the region are inserted to the payload, the PH generator 112 sets, on at least a part the extension region, information indicating that the coordinates of the region are to be transmitted using the payload.

The EBD buffer 114 is a buffer that temporarily holds additional information transferred from the image processing unit 106 (the image processing controller 124 in the example of FIG. 12). The EBD buffer 114 outputs additional information to the combining unit 118 as "Embedded Data" at a predetermined timing. The "Embedded Data" output from the EBD buffer 114 may be transferred to the combining unit 118 via the image data buffer 116 described below.

The image data buffer 116 is a buffer that temporarily holds data (ordinary data or region data) transferred from the image processing unit 106 (encoder 126 in the example of FIG. 12). The image data buffer 116 outputs the held data to the combining unit 118 for each of lines at a predetermined timing.

The combining unit 118 generates a packet to be transmitted on the basis of the data acquired individually from the control code generator 110, the PH generator 112, the EBD buffer 114, and the image data buffer 116, for example.

The transmitting unit 120 transmits the packets transferred from the combining unit 118 via the data bus B1 (an example of a signal transmission path; similar applies hereinafter) for each of lines.

For example, in a case where region 1, region 2, and region 3 illustrated in FIG. 8 are set, the transmitting unit 120 transmits the region information concerning each of regions as a part of additional information (Embedded Data) using packet A2 while transmitting region data corresponding to each of regions using packet A1 for each of lines as illustrated in FIG. 9. Moreover, as another example, in a case where region 1, region 2, and region 3 illustrated in FIG. 10 are set, the transmitting unit 120 transmits the region information concerning each of regions as a part of additional information (Embedded Data) using packet A2 while transmitting region data corresponding to each of regions using packet A1 for each of lines as illustrated in FIG. 11.

In addition, in a case where there is no region setting, that is, where ordinary data is output from the image data buffer 116, the transmitting unit 120 transmits, for each of lines, a packet having data corresponding to each of lines being stored in the payload. Even in this case, the transmitting unit 120 can also transmit the additional information as "Embedded Data".

The above-described configuration is merely an example, and the functional configuration of the image sensor 100 is not limited to this. For example, the device or electronic device that executes each of the above functions is not limited as long as each of the functions can be realized. As a more specific example, some of the functions of the IC chip 104 may be provided outside the IC chip 104.

Furthermore, additional functions may be added as long as the functions of the image sensor 100 described above are not hindered.

As a specific example, an error correction code used for error correction of the data may be calculated based on the data stored in the payload of the packet (for example, the region data described above) and the error correction code may be inserted as parity into the payload. In this manner, insertion of the parity into the payload enables the receiving side to perform error correction calculation based on the parity so as to detect an error in the data stored in the payload and correct the detected error. Examples of the applicable error correction code include a Reed-Solomon code.

Hereinabove, an example of the functional configuration of the image sensor 100 (transmission device) in the case of applying the first transmission method has been described with reference to FIG. 12.

Configuration Example of Processor 200
(Reception Device)

Figure 13:
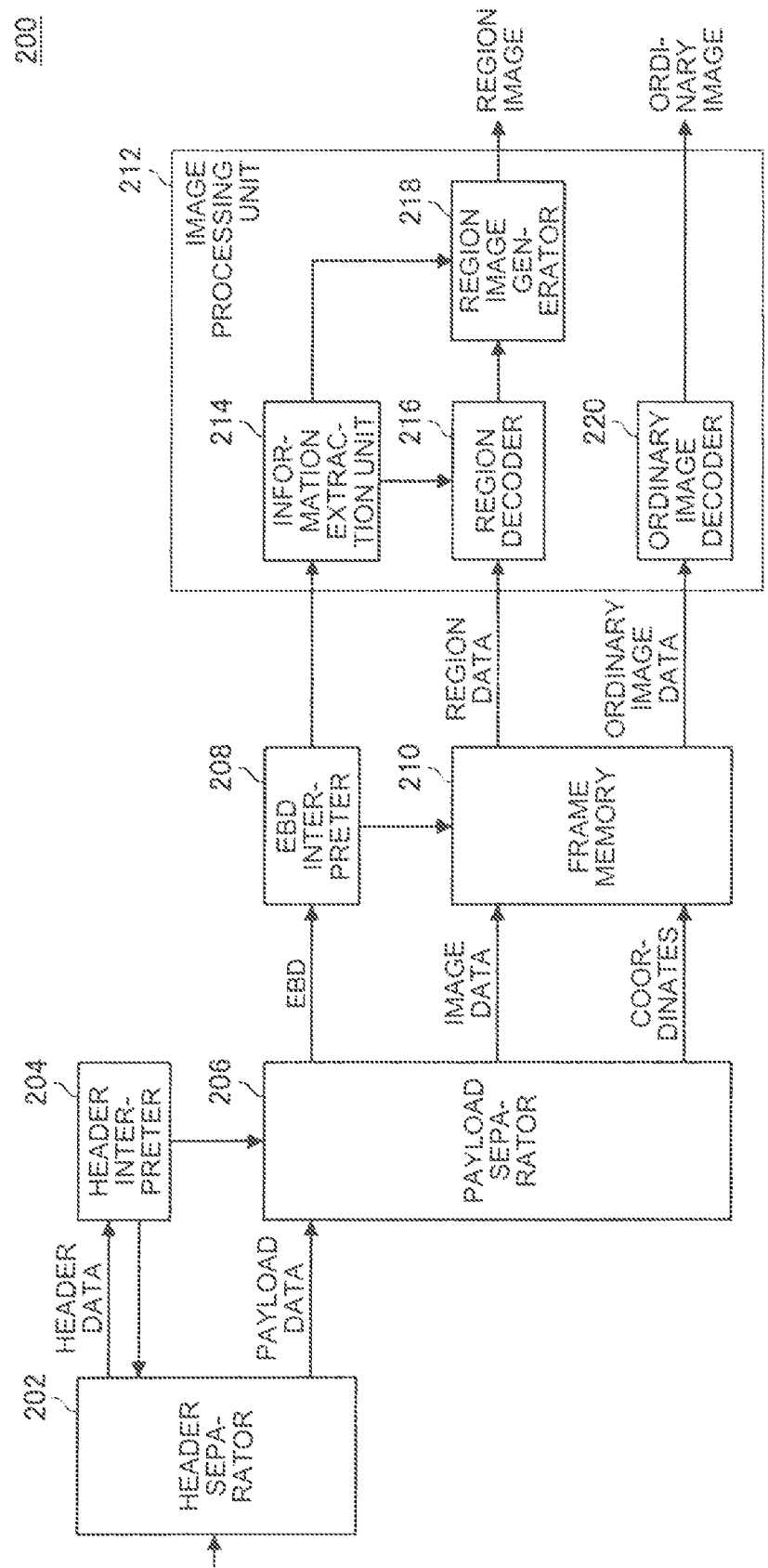
FIG. 13 is a block diagram illustrating an example of a functional configuration of a processor in the case of applying the first transmission method.

Next, an example of the functional configuration of the processor 200 (reception device) in the case of applying the first transmission method will be described. For example, FIG. 13 is a block diagram illustrating an example of the functional configuration of the processor 200 in the case of applying the first transmission method. As illustrated in FIG. 13, the processor 200 includes a header separator 202, a header interpreter 204, a payload separator 206, an EBD interpreter 208, frame memory 210, and an image processing unit 212.

The header separator 202 separates the header data corresponding to a header portion and the payload data corresponding to the payload portion from the received data. The header separator 202 separates the header data from the received data according to a rule preliminarily defined by a standard or the like, for example. Furthermore, the header separator 202 may separate the payload data from the received data according to a rule preliminarily defined by the standard, for example, or may separate the payload data from the received data based on the result of the processing performed by the header interpreter 204.

The header interpreter 204 interprets the content indicated by the header data.

As a specific example, the header interpreter 204 recognizes the format of the information that is set in a region other than top three bits of the extension region according to the header information type set in the top three bits of the extension region of a packet header. Subsequently, the header interpreter 204 reads out various types of information set in the extension region according to the recognition result of the format. This enables the header interpreter 204 to recognize transmission of region (ROI) information (for example, region data) or transmission of coordinates of the region using the payload on the basis of the information set in the extension region, for example. Subsequently, the header interpreter 204 notifies the payload separator 206 of the setting recognized according to a result of reading out various types of information set in the extension region. Specifically, in a case where the header interpreter 204 has recognized transmission of the region (ROI) information (for example, region data) or transmission of the coordinates of the region using the payload, the header interpreter 204 notifies the payload separator 206 of the recognition result.

The example of the process performed on the header interpreter 204 is not limited to the above example. For example, the header interpreter 204 may specify the payload data position and transfer the specified position to the header separator 202. The header interpreter 204 can also distinguish between packet A2 that transmits "Embedded Data" and packet A1 that transmits region data.

The payload separator 206 separates the additional information and the image data (ordinary data or region data) from the payload data based on the interpretation result from the header interpreter 204.

For example, in a case where the packet as a processing target is packet A2 or A3, the payload separator 206 may separate additional information (Embedded Data) from the packet.

Furthermore, as another example, in a case where the packet as a processing target is packet A1, the payload separator 206 separates the image data from the payload data. For example, in a case where region data is stored in the payload, the payload separator 206 may separate the region data from the payload data according to the packet header interpretation result. Furthermore, at this time, the payload separator 206 may separate the coordinates of the region inserted into the top part of the payload (that is, the XY coordinates of the partial region) according to the packet header interpretation result. In addition, in a case where ordinary data is stored in the payload, the payload separator 206 may separate the ordinary data from the payload data according to the packet header interpretation result.

The payload separator 206 transmits additional information out of various types of data separated from the payload data, to the EBD interpreter 208. Furthermore, the payload separator 206 causes the frame memory 210 to hold image data (region data or ordinary data) out of various type of data separated from the payload data. Furthermore, at this time, the payload separator 206 may cause the frame memory 210 to hold the region data in association with the coordinates of the region corresponding to the region data (that is, the XY coordinates of the partial region).

The EBD interpreter 208 interprets the content of additional information (Embedded Data) and then outputs the interpretation result of the additional information to the image processing unit 212. Furthermore, the EBD interpreter 208 may cause the frame memory 210 to hold a result of interpretation of the additional information. The format of the additional information (Embedded Data) is as described above with reference to FIG. 6.

The image processing unit 212 includes an information extraction unit 214, a region decoder 216, a region image generator 218, and an ordinary image decoder 220.

The information extraction unit 214 extracts various types of information (particularly region information) included in the additional information on the basis of a result of interpretation of the additional information (Embedded Data). Subsequently, the information extraction unit 214 outputs various types of information extracted from the additional information to the region decoder 216 and the region image generator 218.

The region decoder 216 discriminates whether the image data held in the frame memory 210 is region data or ordinary data on the basis of the additional information (Embedded Data) held in the frame memory 210. In a case where the image data held in the frame memory 210 is region data, the region decoder 216 decodes the region data by a predetermined method corresponding to the encoding in the image sensor 100. At this time, the region decoder 216 may change the content of the process based on various types of information extracted from the additional information (Embedded Data).

The region image generator 218 generates data representing an image corresponding to a region from region data for each of lines decoded by the region decoder 216, based on various types of information (for example, region information) extracted from the additional information (Embedded Data) and on the coordinates of the region associated with at least a part of the region data.

For example, the region image generator 218 discriminates which region (ROI) includes each of pieces of region data corresponding to partial region for each of lines, which is region data held in the frame memory 210 corresponds, based on the region information included in the additional information (Embedded Data). Furthermore, the region image generator 218 recognizes the position, within the image, of each of regions set in the image and the size of the region based on the region information included in the additional information (Embedded Data). Subsequently, while adjusting the position of each of pieces of region data in the horizontal direction according to the coordinates of a region associated with at least a part of the region data out of the region data corresponding to each of the partial regions for each of lines in each of the regions, the region image generator 218 combines a series of region data corresponding to the region. As described above, the region image generator 218 combines a series of region data corresponding to each of regions, thereby generating a partial image corresponding to the region set in the image (hereinafter, also referred to as a "region image"). The region image corresponds to the "ROI image".

As described above, the region image generator 218 generates a region image for each of regions set in the image and outputs the generated region image to a predetermined output destination.

The ordinary image decoder 220 discriminates whether the image data held in the frame memory 210 is region data or ordinary data on the basis of the additional information (Embedded Data) held in the frame memory 210. In a case where the image data held in the frame memory 210 is ordinary data, the ordinary image decoder 220 decodes the ordinary data by a predetermined method corresponding to the encoding in the image sensor 100 to generate an ordinary image and then outputs the generated ordinary image to a predetermined output destination.

The above-described configuration is merely an example, and the functional configuration of the processor 200 is not limited to this. For example, the device or electronic device that executes each of the above functions is not limited as long as each of the functions can be realized. As a more specific example, some of the functions of the processor 200 may be provided outside the processor 200.

Furthermore, additional functions may be added as long as the functions of the processor 200 described above are not hindered.

For example, in a case where an error correction code has been added to a part of the data of the packet, various processes may be executed based on the error correction code. As a specific example, an error correction code calculated from the data stored in the payload of the packet may be inserted as parity into the packet load. In this case, it is possible to detect an error in the data stored in the payload (for example, the above-described region data) and correct the detected error based on the error correction calculation based on the parity.

(Evaluation)

As described above, in the first transmission method, the region information of each of regions set in the image is transmitted in packet A2 as a part of additional information (Embedded Data), and the region data corresponding to each of regions is transmitted for each of lines in packet A1. Furthermore, in a case of transmitting the data of the region set in the image, information indicating that the region information (for example, region data) is to be transmitted is set in the extension region of the header of each of packets. For a packet in which the coordinates of the region are inserted in the payload, information indicating that the coordinates of the region are to be transmitted using the payload is set in at least a part of the extension region. With the above configuration, the receiving side combines region data stored in the payload of each of packets A1 based on the additional information (Embedded Data) and the coordinates of the region inserted in at least part of the payload of packet A1, making it possible to easily restore the region image of the region set in the image.

<3.2. Second Transmission Method>

Next, a second transmission method will be described. Similarly to the first transmission method, the image sensor 100 in the second transmission method stores region data concerning the region set in the image in the payload of the packet and transmits the data for each of lines. Therefore, in the following, the second transmission method will be described focusing on the part different from the first transmission method, and the detailed description of the parts that are substantially similar to the first transmission method will be omitted.

(Data Format)

Figure 14:
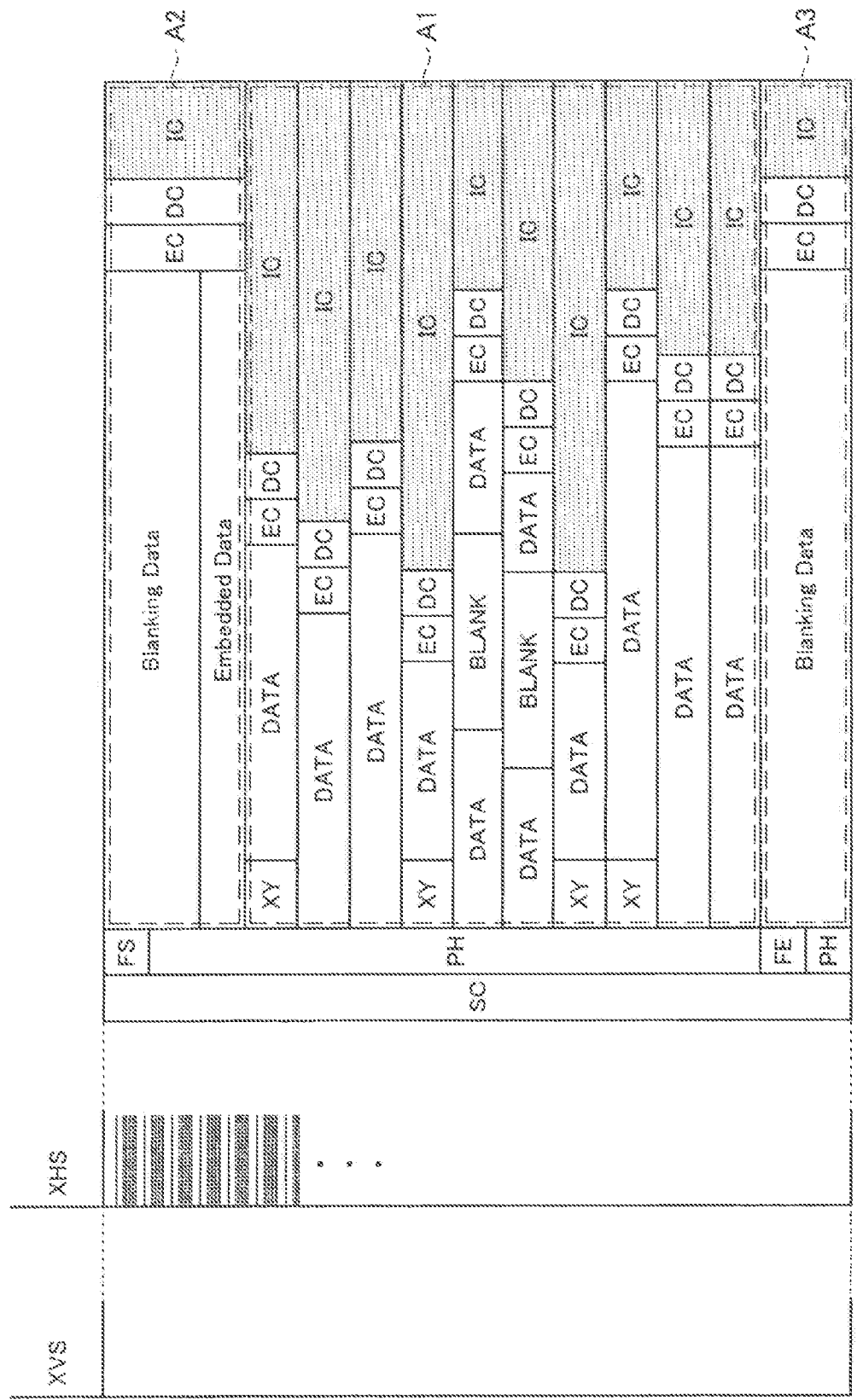
FIG. 14 is a diagram illustrating a format of data transmitted by a second transmission method.

First, the format of data transmitted by the second transmission method will be described. For example, FIG. 14 is a diagram illustrating the format of data transmitted by the second transmission method. Note that, in FIG. 14, the similar reference numerals as those in FIG. 5 denote the similar objects as those in the example illustrated in FIG. 5.

In the example illustrated in FIG. 14, at least a part of the series of packets A2 is used for transmitting Embedded Data. For example, Embedded Data may be transmitted in a state of being stored in the payload of packet A2. Furthermore, as another example, the embedded data may be transmitted in a state of being stored in a region other than the payload of packet A2. Note that the Embedded Data in the second transmission method corresponds to additional information (in other words, information embedded by the image sensor 100) additionally transmitted by the image sensor 100, similarly to the first transmission method.

For example, FIG. 15 is a diagram illustrating an example of information included in Embedded Data in the second transmission method. In addition, as illustrated in FIG. 15, each of items, the "ROI ID", "upper left coordinate", "height", "width", "AD word length (AD bit)", "exposure", "gain", and "sensing information" illustrates information similar to the example illustrated in FIG. 6.

In addition, the second transmission method differs from the first transmission method in that region data concerning a partial region corresponding to each of a plurality of regions in a line in which the plurality of regions separated from each other in the horizontal direction is set is transmitted in one packet A1. Therefore, in this case, the payload of packet A1 stores the region data of the partial regions corresponding to each of the plurality of regions. Furthermore, at this time, arbitrary data corresponding to an interval between the partial regions in the horizontal direction is inserted between the pieces of region data corresponding to the partial regions of each of the plurality of regions separated from each other in the horizontal direction. Note that, hereinafter, the arbitrary data is also referred to as "blank data". For example, "BLANK" illustrated in FIG. 14 indicates blank data.

The data inserted as blank data is not particularly limited. For example, image data between the partial regions may be inserted as blank data. Furthermore, data other than the image data (for example, data have a setting of a value that cannot be image data) may be inserted as blank data.

Furthermore, in the second transmission method, XY coordinates of the partial region can be inserted at the top of the payload of packet A1 as indicated by "XY". Note that in a case where the payload stores region data corresponding to a partial region of each of a plurality of regions, the X and Y coordinates indicating the position of the left end of the top partial region (partial region of the left end) are inserted as the above-described XY coordinates of the partial region. In addition, in a case where there is no change in the X coordinates of the corresponding partial regions between consecutively transmitted packets A1 and the Y coordinate is incremented by just 1, the XY coordinates of the partial regions may be omitted.

Next, with reference to FIG. 16, an example of a configuration of the packet header of packet A1 used for transmitting the region data of the region (ROI) set in the image will be described, focusing particularly on the configuration of the extension region. FIG. 16 is a diagram illustrating an example of a configuration of the packet header in the second transmission method.

As illustrated in FIG. 16, in the case of transmitting the region data of the region (ROI) set in the image in the second transmission method, information indicating that the region information is to be transmitted (that is, the information corresponding to the type assuming the transmission of the region information) is set as a header information type in the packet header of packet A1 used for transmitting the region data. Furthermore, information indicating that the region data (that is, region data concerning the partial region) is to be transmitted using the payload is set to at least a part of the extension region. In addition, in the case of transmitting the coordinates of the region (that is, the XY coordinates of the partial region) using the payload, information indicating that the coordinates of the region are to be transmitted is set for at least a part of the extension region. In the case of transmitting the region data concerning the region (ROI) set in the image, the payload length of packet A1 can change according to the width of the region in the horizontal direction. Therefore, information indicating the payload length may be set in a part of the extension region, similarly to the example described with reference to FIG. 4.

Example of Data

Next, with reference to FIGS. 17 and 18, a specific example of data transmitted by the first transmission method will be described as an example in a case where the second transmission method is applied.

Figure 17:
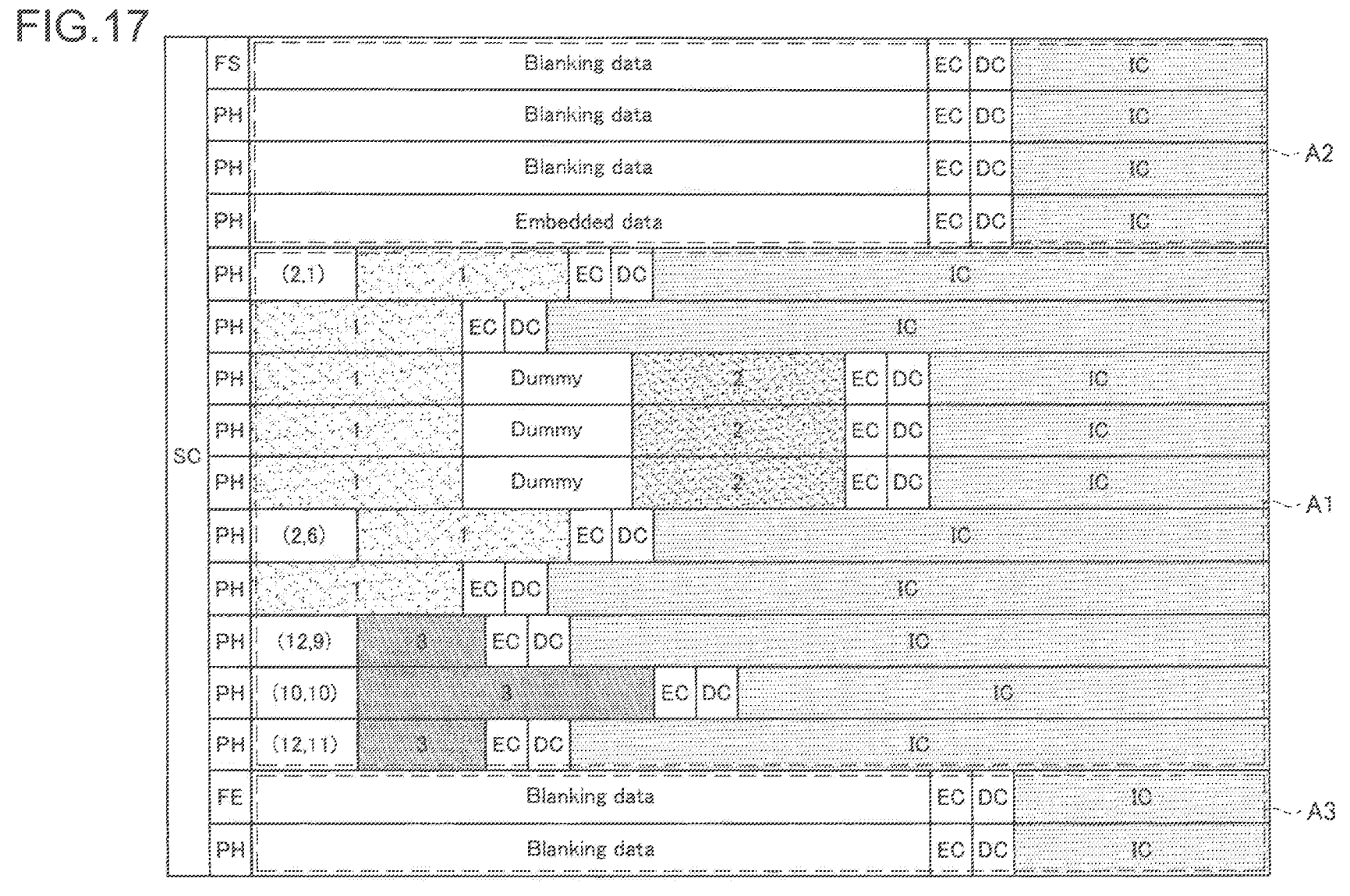

For example, FIG. 17 is a diagram illustrating an example of data transmitted by the second transmission method, illustrating one-frame data in a case where the region data concerning each of the regions illustrated in FIG. 8 is transmitted by the second transmission method. Note that the configurations of packets A2 and A3 in FIG. 17 are substantially similar to the example described with reference to FIG. 5, and hence the following description will focus on the configuration of packet A1. Furthermore, each of "1", "2", and "3" illustrated in FIG. 17 corresponds to the data of region 1, the data of region 2, and the data of region 3 stored in the payload of packet A1.

As described above, the second transmission method differs from the first transmission method in that region data concerning a partial region corresponding to each of a plurality of regions in a line in which the plurality of regions separated from each other in the horizontal direction is set is transmitted in one packet A1. Therefore, like the lines corresponding to the third to fifth lines of region 1, there is a difference from the example described with reference to FIG. 9 in the data stored in the payload of packet A1 transmitted for the line set so that the partial region of region 1 and the partial region of region 2 are horizontally separated from each other. That is, the payload of packet A1 corresponding to the line stores region data of the partial regions of individual regions of region 1 and region 2. Furthermore, in the payload, blank data corresponding to an interval in the horizontal direction between the partial regions is inserted between pieces of region data of the partial regions of region 1 and region 2. For example, the portion illustrated as "Dummy" in FIG. 17 corresponds to blank data.

Furthermore, with the above configuration, regarding packet A1 transmitted for each of lines corresponding to the first to fifth lines of the first region, the X coordinate of the left end of the top region data out of the region data stored in the payload indicates a same value, with the Y coordinate incremented by 1 from the immediately preceding line. Therefore, regarding packet A1 transmitted for each of lines corresponding to the second to fifth lines of the first region, the insertion of the XY coordinates of the partial region indicated by "XY" to the top of the payload is omitted.

Figure 18:
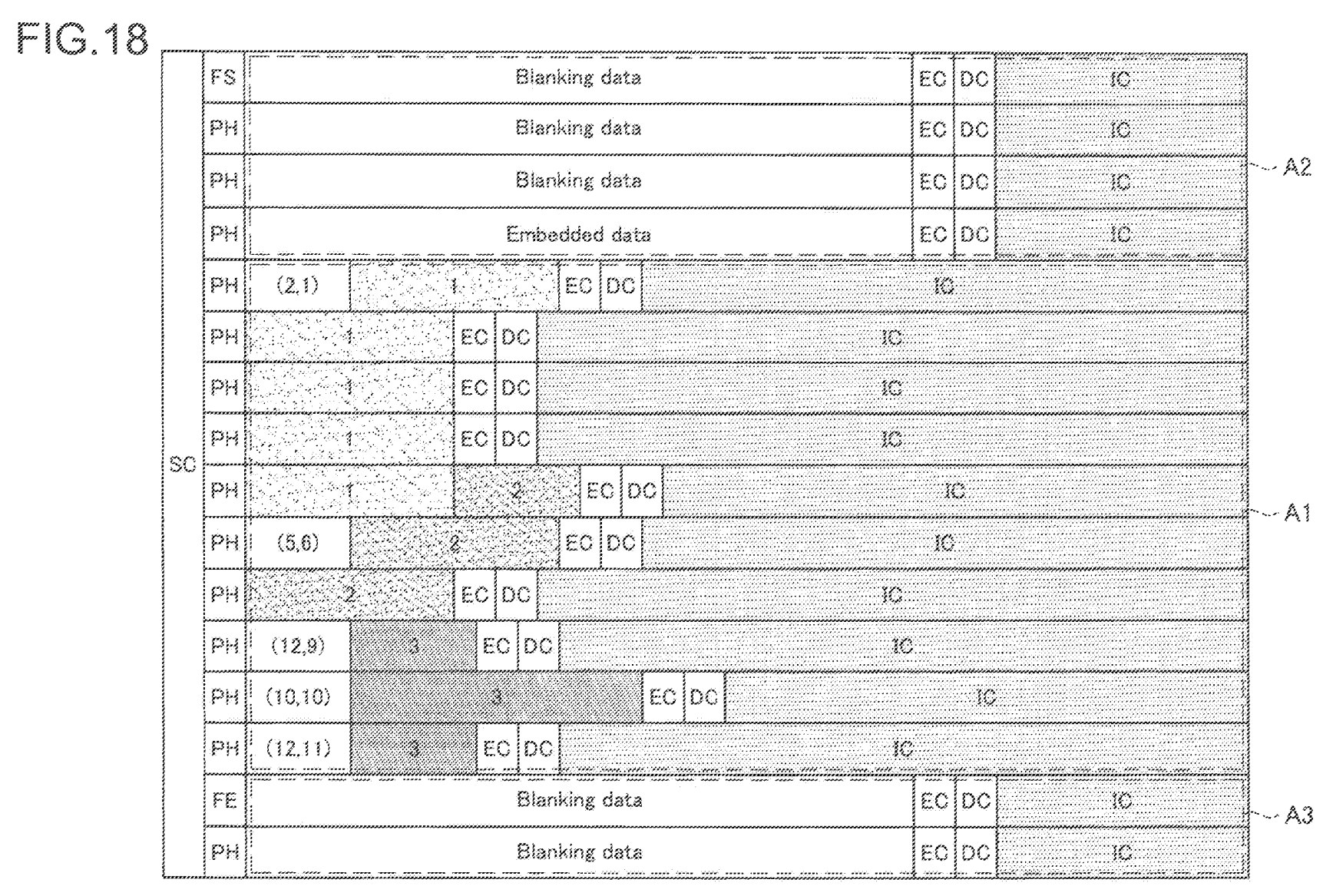

Furthermore, FIG. 18 is a diagram illustrating an example of data transmitted by the second transmission method, illustrating one-frame data in a case where the region data concerning each of the regions illustrated in FIG. 10 is transmitted by the second transmission method. Note that the configurations of packets A2 and A3 in FIG. 18 as well are substantially similar to the example described with reference to FIG. 5, and hence the description will focus on the configuration of packet A1. Furthermore, each of "1", "2", and "3" illustrated in FIG. 18 corresponds to the data of region 1, the data of region 2, and the data of region 3 stored in the payload of packet A1.

In the example illustrated in FIG. 10, there is no line in which a plurality of regions separated from each other in the horizontal direction is set. Therefore, the data illustrated in FIG. 18 is substantially similar to the data when the first transmission method illustrated in FIG. 11 is applied.

Example of Configuration of Image Sensor 100 (Transmission Device)

Figure 19:
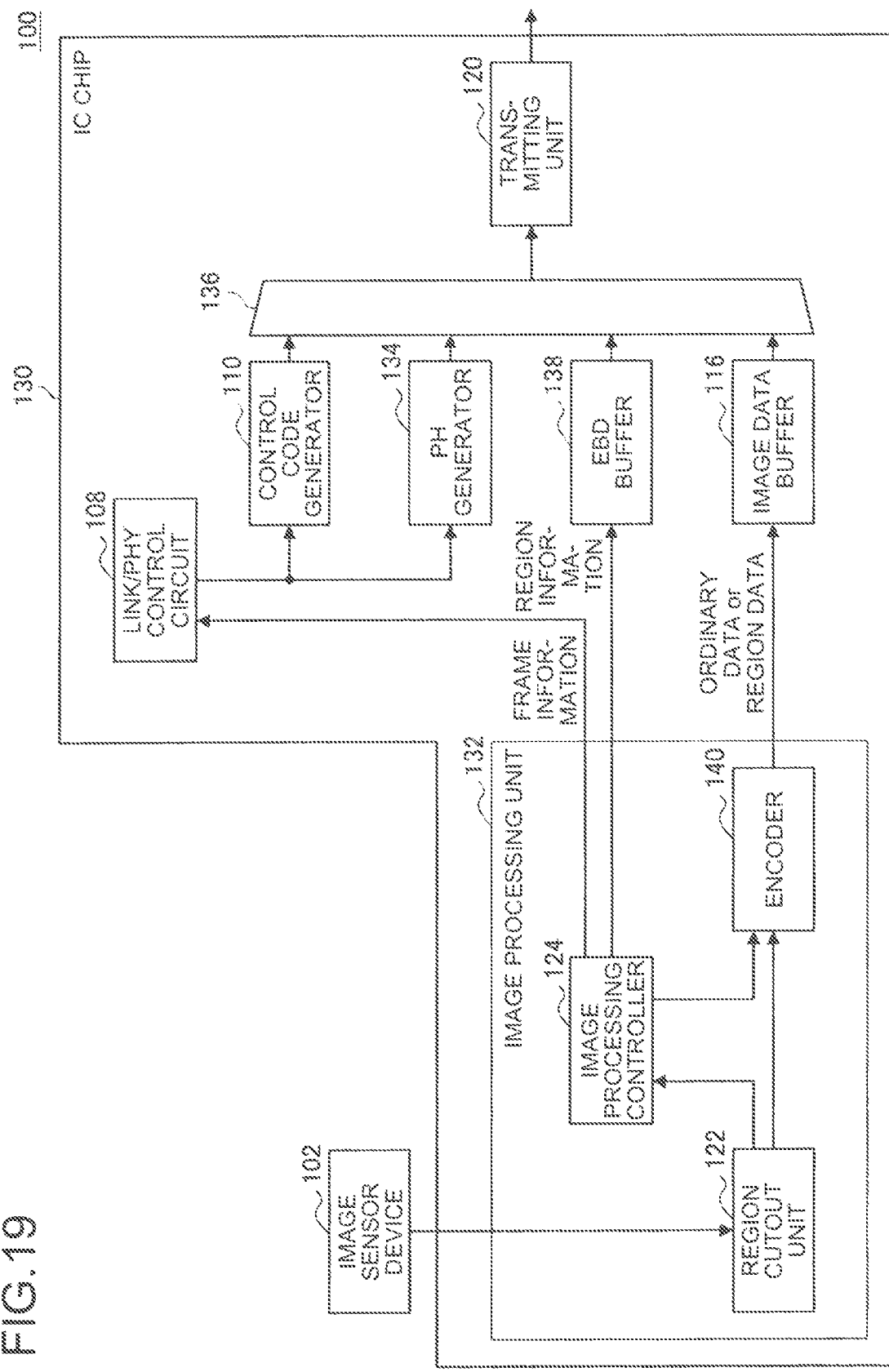
FIG. 19 is a block diagram illustrating an example of a functional configuration of an image sensor in the case of applying the second transmission method.

Next, an example of a functional configuration of the image sensor 100 (transmission device) in the case of applying the second transmission method will be described. For example, FIG. 19 is a block diagram illustrating an example of a functional configuration of the image sensor 100 in the case of applying the second transmission method. As illustrated in FIG. 19, the image sensor 100 includes an image sensor device 102 and an IC chip 130, for example. The image sensor 100 in FIG. 19 operates on electric power supplied from an internal power supply (not illustrated) such as a battery included in the communication system 1000, or electric power supplied from an external power supply of the communication system 1000.

The image sensor device 102 illustrated in FIG. 19 is substantially similar to the image sensor device 102 illustrated in FIG. 12.

The IC chip 130 is a chip formed with an IC in which a circuit related to the data transmission function using the second transmission method is integrated and is used to process image data transferred from the image sensor device 102 and transmit the data corresponding to the generated image. The circuit related to the data transmission function according to the second transmission method is not limited to the implementation in the form of one IC chip, and may be formed of a plurality of IC chips.

The IC chip 130 includes an image processing unit 132, a LINK/PHY controller 108, a control code generator 110, a PH generator 134, an EBD buffer 138, an image data buffer 116, a combining unit 136, and a transmitting unit 120.

The LINK/PHY controller 108, the control code generator 110, the image data buffer 116, and the transmitting unit 120 illustrated in FIG. 19 are respectively substantially similar to the LINK/PHY controller 108, the control code generator 110, the image data buffer 116, and the transmitting unit 120 illustrated in FIG. 12.

The image processing unit 132 can be formed as one circuit having a function of performing processes related to the transmission method according to the present embodiment. When performing the process related to the transmission method according to the present embodiment, the image processing unit 132 controls, for each of lines in the image, to transmit region data corresponding to the region set in the image, through the LINK/PHY controller 108, the control code generator 110, the PH generator 134, the EBD buffer 138, the image data buffer 116, the combining unit 136, and the transmitting unit 120, using the second transmission method. The image processing unit 132 can also control to transmit the image data transferred from the image sensor device 102 (that is, the data representing the entire image) for each of lines.

The image processing unit 132 can be formed by a processor such as an MPU, for example.

The function of the image processing unit 106 will be described in the form of functional blocks. As illustrated in FIG. 10, the image processing unit 106 includes a region cutout unit 122, an image processing controller 124, and an encoder 140, for example.

The region cutout unit 122 and the image processing controller 124 illustrated in FIG. 19 are respectively substantially similar to the region cutout unit 122 and the image processing controller 124 illustrated in FIG. 12.

Similar to the encoder 126 illustrated in FIG. 12, the encoder 140 encodes image data transferred from the image sensor device 102 by a predetermined method.

In a case where the region information is not acquired from the image processing controller 124, the encoder 140 transfers the encoded image data to the image data buffer 116, similarly to the encoder 126 illustrated in FIG. 12.

In addition, in a case where the region information is acquired from the image processing controller 124, the encoder 140 transfers the encoded region data corresponding to the region to the image data buffer 116 according to the acquired region information. At this time, the encoder 140 may associate each of pieces of region data with information indicating the position, within the image, of the region (that is, the partial region for each of lines) corresponding to the region data. Furthermore, at this time, in a case where the position of the target partial region in the horizontal direction (for example, the X coordinate of the left end) has not changed from the previous region data transmission position of the partial region in the horizontal direction, the encoder 140 does not need to associate the region data concerning the target partial region with the information indicating the position of the partial region. More specifically, the encoder 140 may insert information indicating the position of the corresponding partial region at the top of the region data, as indicated by "XY" in the examples illustrated in FIGS. 17 and 18.

Furthermore, the encoder 140 encodes the region data concerning the partial regions corresponding to each of the plurality of regions as a series of data for a line in which a plurality of regions separated from each other in the horizontal direction is set. Subsequently, the encoder 140 transfers the data obtained by encoding the series of region data included in the line to the image data buffer 116. In this case, the encoder 140 may associate the data obtained by encoding the series of region data included in the line with information indicating the position in the image of the partial region corresponding to the top region data out of the series of region data.

The image processing unit 132 includes the region cutout unit 122, the image processing controller 124, and the encoder 140, for example, and thereby performs the process related to the transmission method according to the present embodiment. Note that the functional blocks of the image processing unit 132 illustrated in FIG. 19 are obtained by dividing the functions of the image processing unit 132 for convenience, and how to divide the functions in the image processing unit 132 is not limited to the example illustrated in FIG. 19.

The PH generator 134 uses the frame information to generate a packet header for each of lines. At this time, in the case of transmitting region data, the PH generator 134 sets information indicating that the region information (for example, region data) is to be transmitted as the header information type to the extension region of the packet header as described above. Thereafter, the PH generator 134 sets information indicating that the region data is to be transmitted using the payload, for at least a part of the extension region. Furthermore, regarding a packet in which the coordinates of the region are inserted to the payload, the PH generator 134 sets, on at least a part the extension region, information indicating that the coordinates of the region are to be transmitted using the payload.

The EBD buffer 138 is a buffer that temporarily holds additional information transferred from the image processing unit 132 (the image processing controller 124 in the example of FIG. 19). The EBD buffer 138 outputs additional information to the combining unit 136 as "Embedded Data" at a predetermined timing. The "Embedded Data" output from the EBD buffer 138 may be transferred to the combining unit 136 via the image data buffer 116.

The combining unit 136 generates a packet to be transmitted, based on the data acquired individually from the control code generator 110, the PH generator 134, the EBD buffer 138, and the image data buffer 116, for example.

The transmitting unit 120 transmits the packet transferred from the combining unit 136 for each of lines via the data bus B1.

For example, in a case where region 1, region 2, and region 3 illustrated in FIG. 8 are set, the transmitting unit 120 transmits the region information concerning each of regions as a part of additional information (Embedded Data) using packet A2 while transmitting region data corresponding to each of regions using packet A1 for each of lines as illustrated in FIG. 17. Moreover, as another example, in a case where region 1, region 2, and region 3 illustrated in FIG. 10 are set, the transmitting unit 120 transmits the region information concerning each of regions as a part of additional information (Embedded Data) using packet A2 while transmitting region data corresponding to each of regions using packet A1 for each of lines as illustrated in FIG. 18.

In addition, in a case where there is no region setting, that is, where ordinary data is output from the image data buffer 116, the transmitting unit 120 transmits, for each of lines, a packet having data corresponding to each of lines being stored in the payload. Even in this case, the transmitting unit 120 can also transmit the additional information as "Embedded Data".

The above-described configuration is merely an example, and the functional configuration of the image sensor 100 is not limited to this. For example, the device or electronic device that executes each of the above functions is not limited as long as each of the functions can be realized. As a more specific example, some of the functions of the IC chip 130 may be provided outside the IC chip 130.

Furthermore, additional functions may be added as long as the functions of the image sensor 100 described above are not hindered, similarly to the above-described first transmission method.

Hereinabove, an example of the functional configuration of the image sensor 100 (transmission device) in the case of applying the second transmission method has been described with reference to FIG. 19.

Configuration Example of Processor 200
(Reception Device)

Figure 20:
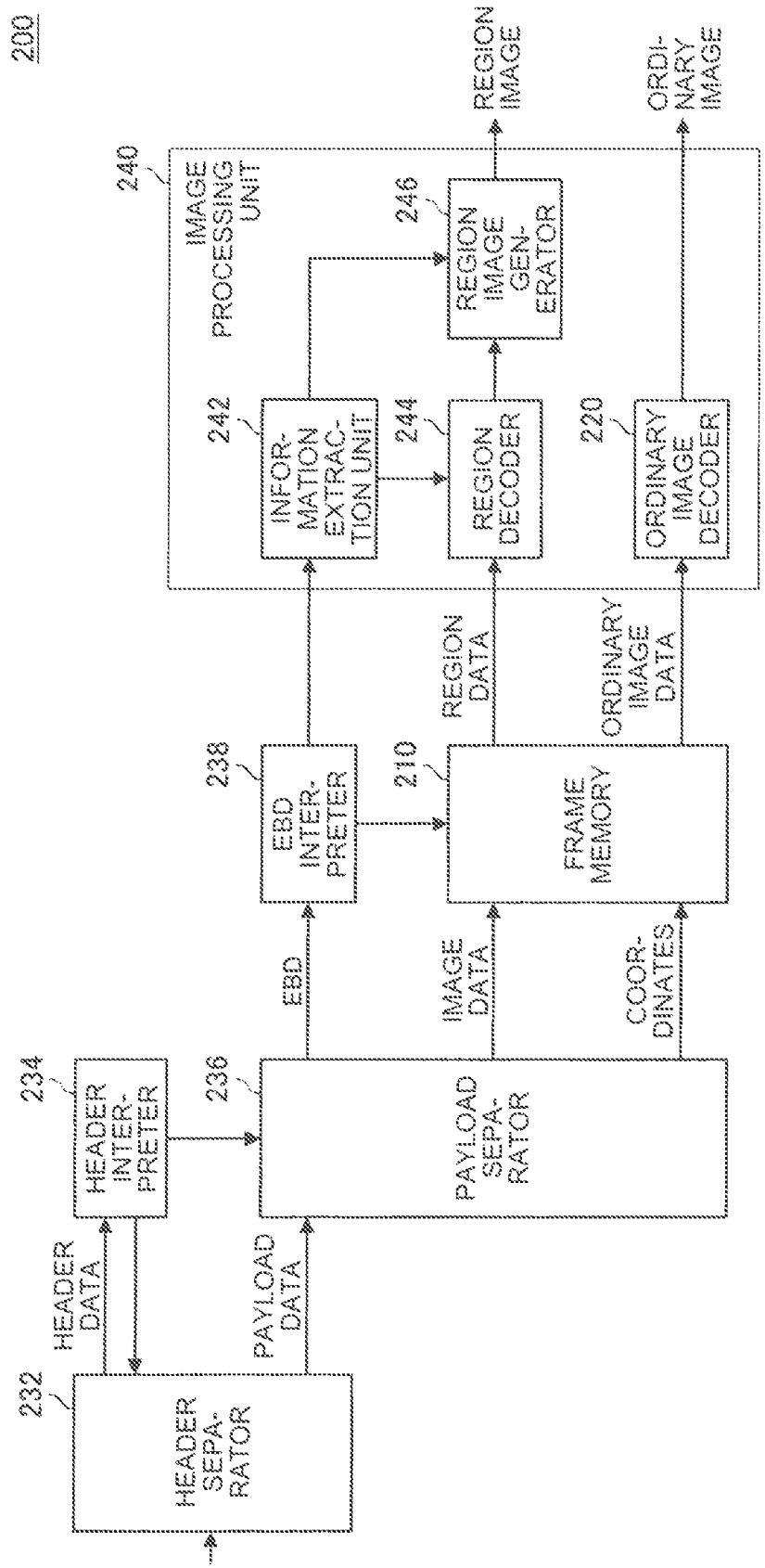
FIG. 20 is a block diagram illustrating an example of a functional configuration of a processor in the case of applying the second transmission method.

Next, an example of the functional configuration of the processor 200 (reception device) in the case of applying the second transmission method will be described. For example, FIG. 20 is a block diagram illustrating an example of the functional configuration of the processor 200 in the case of applying the second transmission method. As illustrated in FIG. 20, the processor 200 includes, for example, a header separator 232, a header interpreter 234, a payload separator 236, an EBD interpreter 238, frame memory 210, and an image processing unit 240.

The header separator 232 separates the header data corresponding to a header portion and the payload data corresponding to the payload portion from the received data. The header separator 232 separates the header data from the received data according to a rule preliminarily defined by a standard or the like, for example. Furthermore, the header separator 232 may separate the payload data from the received data according to a rule preliminarily defined by the standard, for example, or may separate the payload data from the received data based on the result of the processing performed by the header interpreter 234.

The header interpreter 234 interprets the content indicated by the header data.

As a specific example, the header interpreter 234 recognizes the format of the information that is set in a region other than top three bits of the extension region according to the header information type set in the top three bits of the extension region of a packet header. Subsequently, the header interpreter 234 reads out various types of information set in the extension region according to the recognition result of the format. This enables the header interpreter 234 to recognize transmission of region (ROI) information (for example, region data) or transmission of coordinates of the region using the payload, based on the information set in the extension region, for example. Subsequently, the header interpreter 234 notifies the payload separator 236 of the setting recognized according to a result of reading out various types of information set in the extension region. Specifically, in a case where the header interpreter 234 has recognized transmission of the region (ROI) information (for example, region data) or transmission of the coordinates of the region using the payload, the header interpreter 234 notifies the payload separator 236 of the recognition result.

The example of the process performed on the header interpreter 234 is not limited to the above example. For example, the header interpreter 234 may specify the position of the payload data and may transfer the specified position to the header separator 232. The header interpreter 234 can also distinguish between packet A2 that transmits "Embedded Data" and packet A1 that transmits region data.

The payload separator 236 separates the additional information and the image data (ordinary data or region data) from the payload data based on the interpretation result from the header interpreter 234.

For example, in a case where the packet as a processing target is packet A2 or A3, the payload separator 236 may separate additional information (Embedded Data) from the packet.

Furthermore, as another example, in a case where the packet as a processing target is packet A1, the payload separator 236 separates the image data from the payload data. For example, in a case where region data is stored in the payload, the payload separator 236 may separate the region data from the payload data according to the packet header interpretation result. Furthermore, at this time, the payload separator 236 may separate the coordinates of the region inserted into the top part of the payload (that is, the XY coordinates of the partial region) according to the packet header interpretation result. In addition, in a case where ordinary data is stored in the payload, the payload separator 236 may separate the ordinary data from the payload data according to the packet header interpretation result.

The payload separator 236 transmits additional information out of various types of data separated from the payload data, to the EBD interpreter 238. Furthermore, the payload separator 236 causes the frame memory 210 to hold image data (region data or ordinary data) out of various type of data separated from the payload data. Furthermore, at this time, the payload separator 236 may cause the frame memory 210 to hold the region data in association with the coordinates of the region corresponding to the region data (that is, the XY coordinates of the partial region).

The EBD interpreter 238 interprets the content of additional information (Embedded Data) and then outputs the interpretation result of the additional information to the image processing unit 240. Furthermore, the EBD interpreter 238 may cause the frame memory 210 to hold a result of interpretation of the additional information. The format of the additional information (Embedded Data) is as described above with reference to FIG. 15.

The image processing unit 240 includes an information extraction unit 242, a region decoder 244, a region image generator 246, and an ordinary image decoder 220.

The information extraction unit 242 extracts various types of information (particularly region information) included in the additional information on the basis of a result of interpretation of the additional information (Embedded Data). Subsequently, the information extraction unit 242 outputs various types of information extracted from the additional information to the region decoder 244 and the region image generator 246.

The region decoder 244 discriminates whether the image data held in the frame memory 210 is region data or ordinary data on the basis of the additional information (Embedded Data) held in the frame memory 210. In a case where the image data held in the frame memory 210 is region data, the region decoder 244 decodes the region data by a predetermined method corresponding to the encoding in the image sensor 100. At this time, the region decoder 244 may change the content of the process based on various types of information extracted from the additional information (Embedded Data).

The region image generator 246 generates data representing an image corresponding to a region from region data for each of lines decoded by the region decoder 244, based on various types of information (for example, region information) extracted from the additional information (Embedded Data) and on the coordinates of the region associated with at least a part of the region data.

For example, the region image generator 246 discriminates which region (ROI) includes each of pieces of region data corresponding to partial region for each of lines, which is region data held in the frame memory 210, based on the region information included in the additional information (Embedded Data). Furthermore, the region image generator 246 recognizes the position, within the image, of each of regions set in the image and the size of the region, based on the region information included in the additional information (Embedded Data). Subsequently, while adjusting the position of each of pieces of region data in the horizontal direction according to the coordinates of a region associated with at least a part of the region data out of the region data corresponding to each of the partial regions for each of lines in each of the regions, the region image generator 246 combines a series of region data corresponding to the region. As described above, the region image generator 246 combines a series of region data corresponding to each of regions, thereby generating a region image corresponding to the region set in the image.

In addition, regarding a line in which a plurality of regions separated from each other in the horizontal direction is set, the region image generator 246 recognizes the position of another region other than the top region as a relative position with respect to the top region, based on the blank data inserted between the pieces of region data corresponding to each of regions. Subsequently, while adjusting position of each of pieces of the region data of the region in the horizontal direction based on the recognition result for the position of each of regions, the region image generator 246 combines the series of region data corresponding to the region, thereby generating a region image corresponding to the region.

As described above, the region image generator 246 generates a region image for each of regions set in the image and outputs the generated region image to a predetermined output destination.

The ordinary image decoder 220 illustrated in FIG. 20 is substantially similar to the ordinary image decoder 220 illustrated in FIG. 13.

The above-described configuration is merely an example, and the functional configuration of the processor 200 is not limited to this. For example, the device or electronic device that executes each of the above functions is not limited as long as each of the functions can be realized. As a more specific example, some of the functions of the processor 200 may be provided outside the processor 200.

Furthermore, additional functions may be added as long as the functions of the processor 200 described above are not hindered, similarly to the above-described first transmission method.

(Evaluation)

As described above, in the second transmission method, the region information of each of regions set in the image is transmitted in packet A2 as a part of additional information (Embedded Data), and the region data corresponding to each of regions is transmitted for each of lines in packet A1.

Furthermore, in a case of transmitting the data of the region set in the image, information indicating that the region information (for example, region data) is to be transmitted is set in the extension region of the header of each of packets. For a packet in which the coordinates of the region are inserted in the payload, information indicating that the coordinates of the region are to be transmitted using the payload is set in at least a part of the extension region. In addition, regarding a line in which a plurality of regions separated from each other in the horizontal direction is set, the position of another region other than the top region is recognized as a relative position with respect to the top region, based on the blank data inserted between the pieces of region data corresponding to each of regions. With the above configuration, the receiving side combines region data stored in the payload of each of packets A1 based on the additional information (Embedded Data), coordinates of the region inserted in at least part of the payload of packet A1, and a detection result of the blank data, making it possible to easily restore the region image of the region set in the image. In the second transmission method, the region data included in one line is transmitted in one packet A1. This makes it possible to easily calculate the maximum length of the data for one line.

<3.3. Third Transmission Method>

Next, a third transmission method will be described. Similarly to the above-described transmission methods, the image sensor 100 in the third transmission method stores region data concerning the region set in the image in the payload of the packet and transmits the data for each of lines. Therefore, in the following, the third transmission method will be described focusing on the part different from the first transmission method, and the detailed description of the parts that are substantially similar to the first transmission method will be omitted.

(Data Format)

Figure 21:
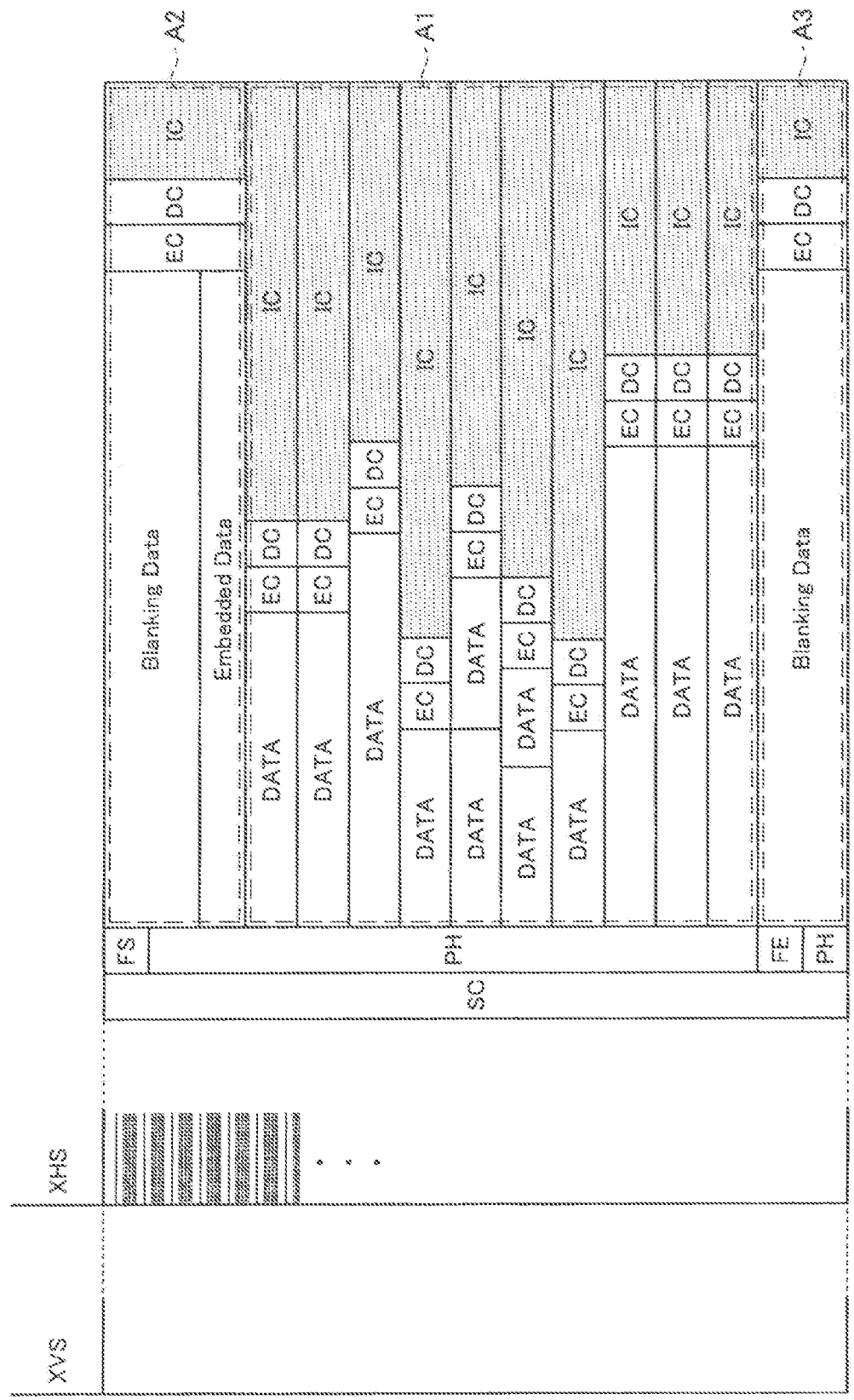
FIG. 21 is a diagram illustrating a format of data transmitted by a third transmission method.

First, the format of data transmitted by the third transmission method will be described. For example, FIG. 21 is a diagram illustrating the format of data transmitted by the third transmission method. Note that, in FIG. 21, the similar reference numerals as those in FIG. 5 denote the similar objects as those in the example illustrated in FIG. 5.

In the example illustrated in FIG. 21, at least a part of the series of packets A2 is used for transmitting Embedded Data. For example, Embedded Data may be transmitted in a state of being stored in the payload of packet A2. Furthermore, as another example, the embedded data may be transmitted in a state of being stored in a region other than the payload of packet A2. Note that the Embedded Data in the third transmission method corresponds to additional information (in other words, information embedded by the image sensor 100) additionally transmitted by the image sensor 100, similarly to the first transmission method.

For example, FIG. 22 is a diagram illustrating an example of information included in Embedded Data in the third transmission method. In addition, as illustrated in FIG. 22, each of items, the "ROI ID", "upper left coordinate", "height", "width", "AD word length (AD bit)", "exposure", "gain", and "sensing information" illustrates information similar to the example illustrated in FIG. 6.

The third transmission method differs from the above-described first transmission method in that the information indicating the position of the partial region corresponding to the region data stored in the payload (that is, the XY coordinates of the partial region) is not inserted in the payload. Furthermore, even when one line includes a plurality of regions, the region data of the partial regions corresponding to each of the plurality of regions is defined as a series of data, and the series of data is transmitted in one packet A1.

Next, with reference to FIG. 23, an example of a configuration of the packet header of packet A1 used for transmitting the region data of the region (ROI) set in the image will be described, focusing particularly on the configuration of the extension region. FIG. 23 is a diagram illustrating an example of a configuration of the packet header in the third transmission method.

As illustrated in FIG. 23, in the case of transmitting the region data of the region (ROI) set in the image in the third transmission method, information indicating that the region information is to be transmitted (that is, the information corresponding to the type assuming the transmission of the region information) is set as a header information type in the packet header of packet A1 used for transmitting the region data. Furthermore, information indicating that the region data (that is, region data concerning the partial region) is to be transmitted using the payload is set to at least a part of the extension region. In the case of transmitting the region data concerning the region (ROI) set in the image, the payload length of packet A1 can change according to the width of the region in the horizontal direction. Therefore, information indicating the payload length may be set in a part of the extension region, similarly to the example described with reference to FIG. 4.

Example of Data

Next, with reference to FIGS. 24 and 25, a specific example of data transmitted by the first transmission method will be described as an example in a case where the second transmission method is applied.

Figure 24:
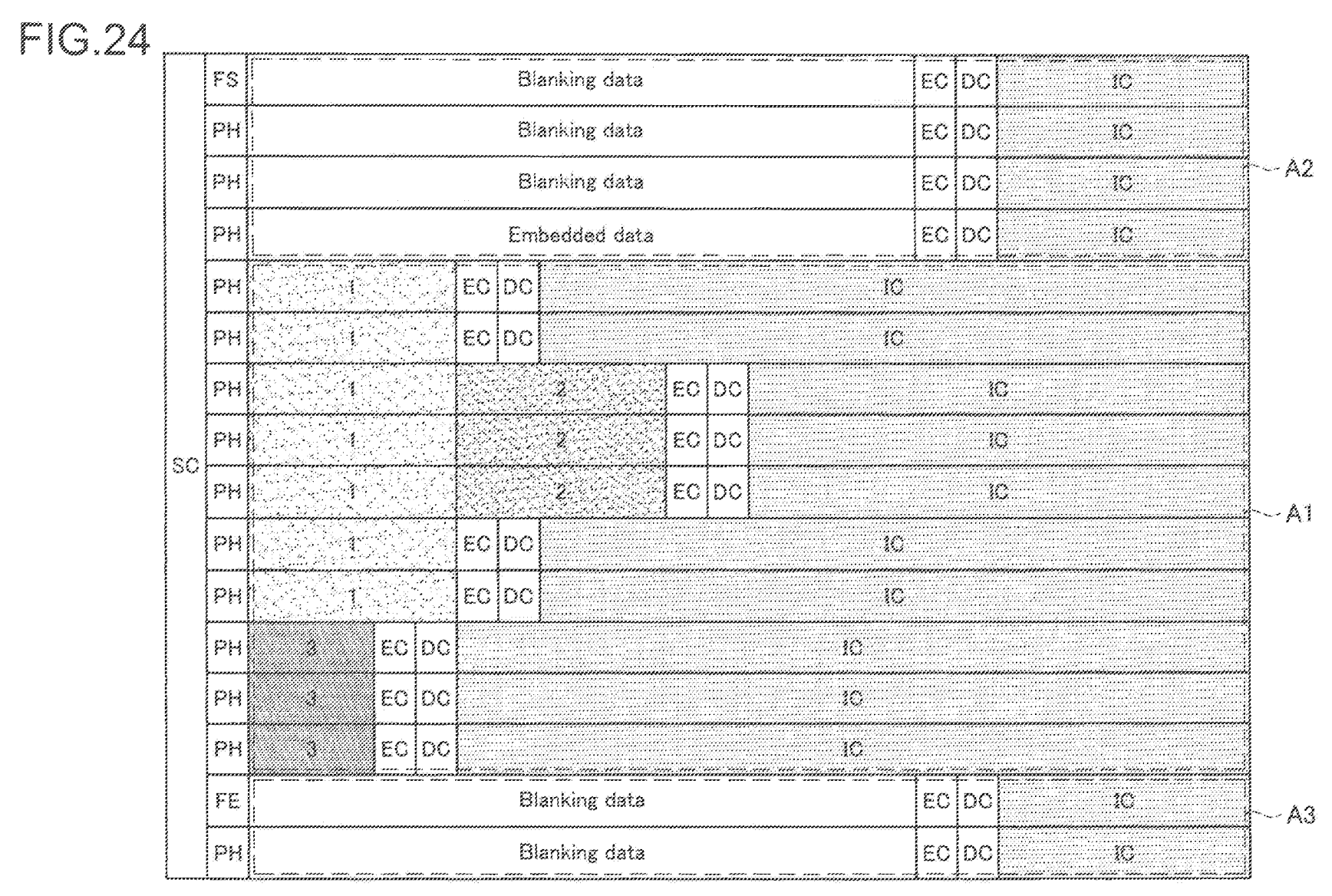

For example, FIG. 24 is a diagram illustrating an example of data transmitted by the third transmission method, illustrating one-frame data in a case where the region data concerning each of the regions illustrated in FIG. 8 is transmitted by the third transmission method. Note that the configurations of packets A2 and A3 in FIG. 24 are substantially similar to the example described with reference to FIG. 5, and hence the following description will focus on the configuration of packet A1. Furthermore, each of "1", "2", and "3" illustrated in FIG. 24 corresponds to the data of region 1, the data of region 2, and the data of region 3 stored in the payload of packet A1.

As described above, unlike the above-described first transmission method, information indicating the position of the partial region corresponding to the region data stored in the payload (that is, XY coordinates of partial region) will not be inserted to the payload of packet A1 in the third transmission method. Furthermore, even when one line includes a plurality of regions, the region data of the partial regions corresponding to each of the plurality of regions is defined as a series of data, and the series of data is stored in the single payload of packet A1. Having such characteristics, in the example illustrated in FIG. 24, the payload of packet A1 stores only the region data corresponding to the partial region of the region included in each of lines.

Figure 25:
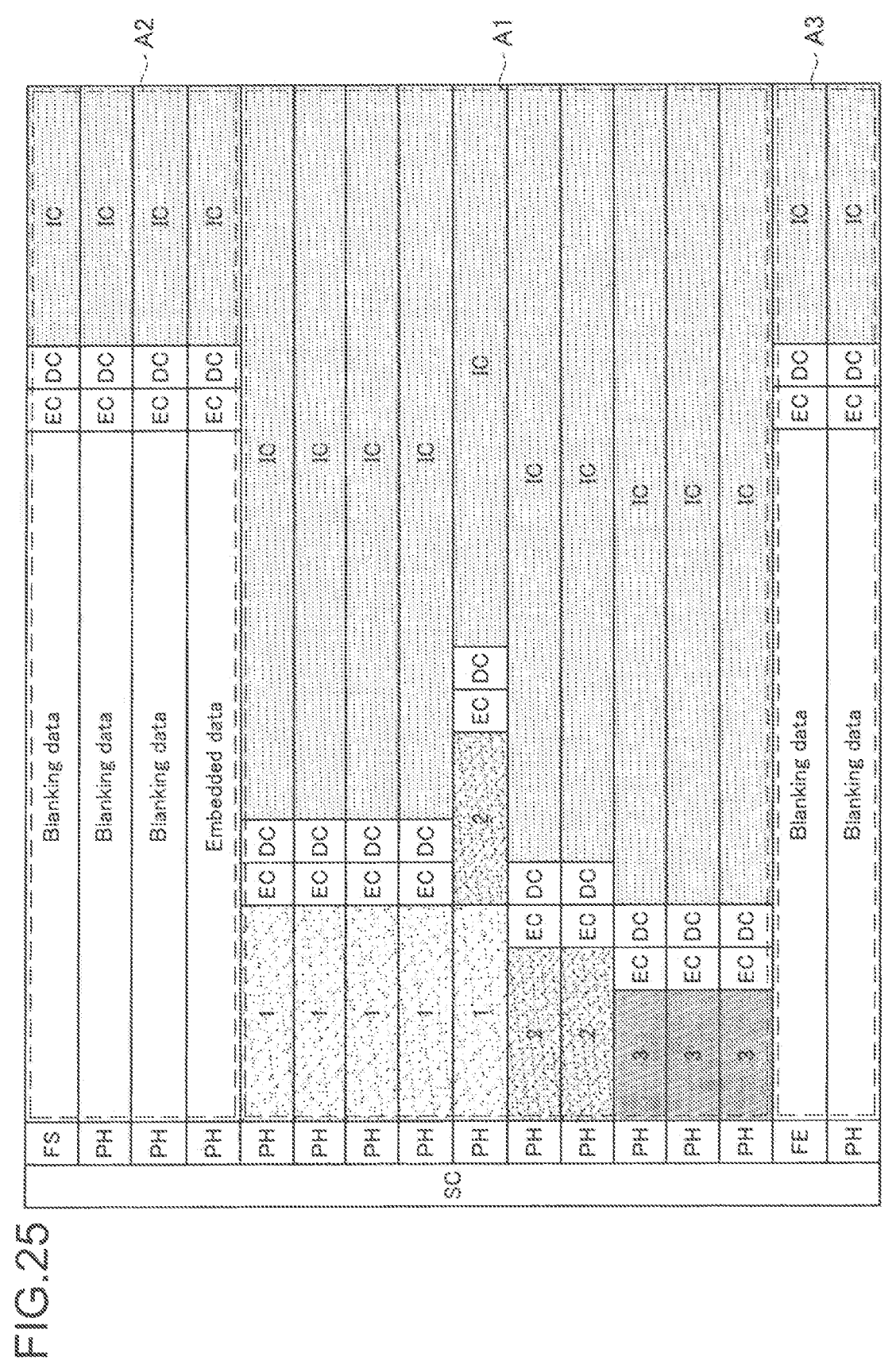

Furthermore, FIG. 25 is a diagram illustrating an example of data transmitted by the third transmission method, illustrating one-frame data in a case where the region data concerning each of the regions illustrated in FIG. 10 is transmitted by the third transmission method. Note that the configurations of packets A2 and A3 in FIG. 25 as well are substantially similar to the example described with reference to FIG. 5, and hence the description will focus on the configuration of packet A1. Furthermore, each of "1", "2", and "3" illustrated in FIG. 25 corresponds to the data of region 1, the data of region 2, and the data of region 3 stored in the payload of packet A1.

In the example illustrated in FIG. 25, it is also known that the payload of packet A1 stores only the region data corresponding to the partial region of the region included in each of lines.

Example of Configuration of Image Sensor 100 (Transmission Device)

Figure 26:
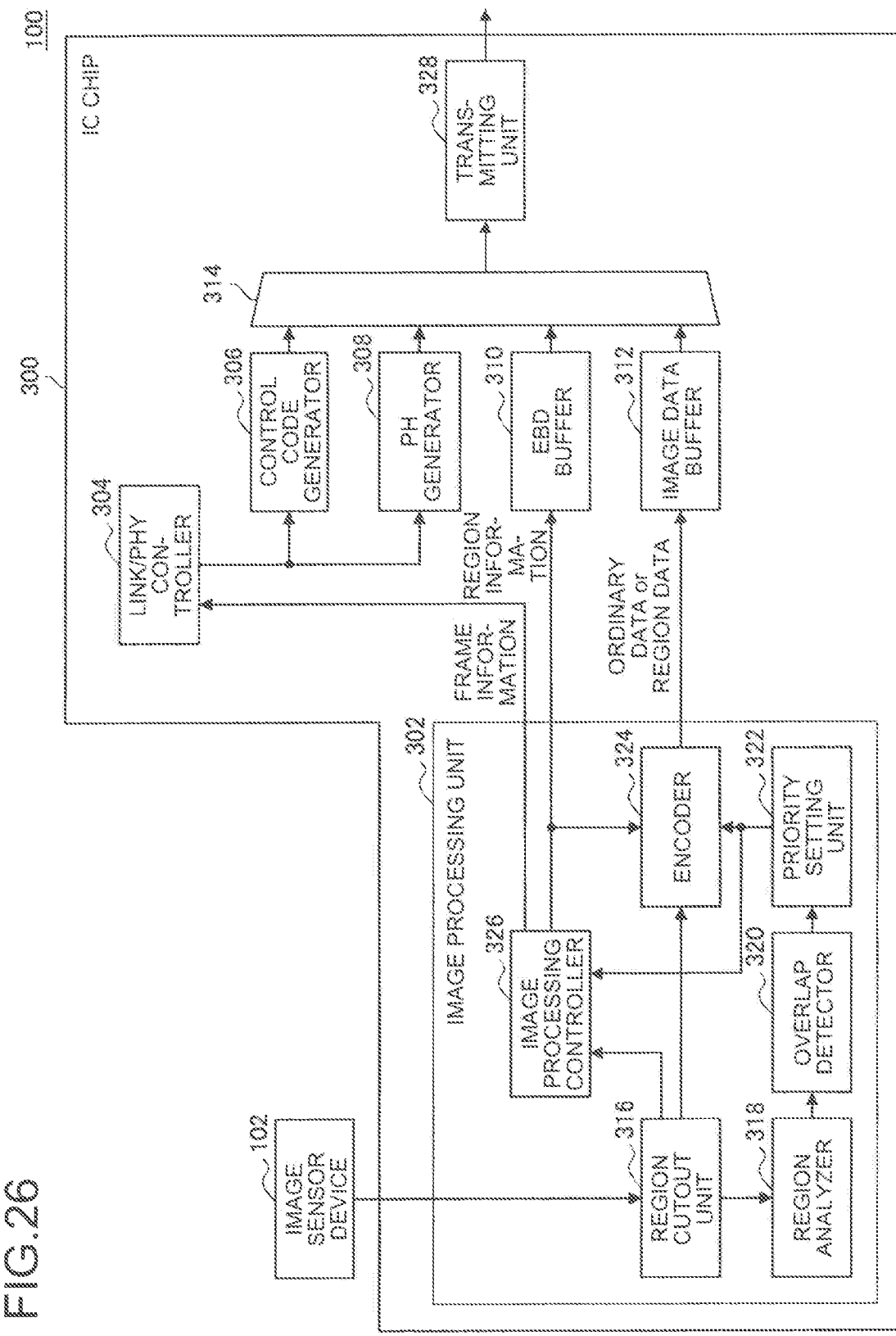
FIG. 26 is a block diagram illustrating an example of a functional configuration of an image sensor in the case of applying the third transmission method.

Next, an example of a functional configuration of the image sensor 100 (transmission device) in the case of applying the third transmission method will be described. For example, FIG. 26 is a block diagram illustrating an example of a functional configuration of the image sensor 100 in the case of applying the third transmission method. As illustrated in FIG. 26, the image sensor 100 includes an image sensor device 102 and an IC chip 300, for example. The image sensor 100 in FIG. 26 operates on electric power supplied from an internal power supply (not illustrated) such as a battery included in the communication system 1000, or electric power supplied from an external power supply of the communication system 1000.

The image sensor device 102 illustrated in FIG. 26 is substantially similar to the image sensor device 102 illustrated in FIG. 12.

The IC chip 300 is a chip formed with an IC in which a circuit related to the data transmission function using the third transmission method is integrated and is used to process image data transferred from the image sensor device 102 and transmit the data corresponding to the generated image. The circuit related to the data transmission function according to the third transmission method is not limited to the implementation in the form of one IC chip, and may be formed of a plurality of IC chips.

The IC chip 300 includes an image processing unit 302, a LINK/PHY controller 304, a control code generator 306, a PH generator 308, an EBD buffer 310, an image data buffer 312, a combining unit 314, and a transmitting unit 328.

The image processing unit 302 can be formed as one circuit having a function of performing processes related to the transmission method according to the present embodiment. When performing the process related to the transmission method according to the present embodiment, the image processing unit 302 controls, for each of lines in the image, to transmit region data corresponding to the region set in the image, through the LINK/PHY controller 304, the control code generator 306, the PH generator 308, the EBD buffer 310, the image data buffer 312, the combining unit 314, and the transmitting unit 328, using the third transmission method. The image processing unit 302 can also control to transmit the image data transferred from the image sensor device 102 (that is, the data representing the entire image) for each of lines.

The image processing unit 302 can be formed by a processor such as an MPU, for example.

The function of the image processing unit 302 will be described in the form of functional blocks. As illustrated in FIG. 26, the image processing unit 302 includes a region cutout unit 316, a region analyzer 318, an overlap detector 320, a priority setting unit 322, an image processing controller 326, and an encoder 324, for example.

The region cutout unit 316 has a function of performing a process related to the setting of a region for an image, and thus sets a region (ROI) for an image indicated by the image data transferred from the image sensor device 102. The region cutout unit 316 performs a process related to region setting for an image, for example, according to the set operation mode. For example, the region cutout unit 316 performs the process related to the region setting for an image in a case where the operation mode is an operation mode of transmitting region data. Furthermore, in a case where the operation mode is an operation mode of transmitting data representing an entire image, the region cutout unit 316 would not perform the process related to the region setting for the image.

The region cutout unit 316 specifies one or more objects (subjects) as an imaging target included in the image represented by the image data transferred from the image sensor device 102 (hereinafter, also referred to as "captured image") and then sets a region (ROI) for each of the specified objects. The region that is set by the region cutout unit 316 can include a rectangular region such as the regions 1 and 2 in FIGS. 8 and 10 or a region of any shape other than rectangular to be set to an image such as region 3 illustrated in FIGS. 8 and 10.

The region cutout unit 316 cuts out an image of each of regions (that is, a region image) from the image sensor device 102. The region cutout unit 316 further assigns a region number (ROI ID) as an identifier to each of the set regions. For example, in a case where two regions are set in the image sensor device 102, the region cutout unit 316 assigns region number 1 to one region and assigns region number 2 to the other region.

In a case where the region is set, the region cutout unit 316 transfers region designation information indicating the set region to the image processing controller 326 or the region analyzer 318, for example. In a case where the region is not set, the region cutout unit 316 would not transfer the region designation information to the image processing controller 326 or the region analyzer 318.

The region cutout unit 316 also transfers image data transferred from the image sensor device 102 to the encoder 324.

The region analyzer 318 derives the position of the region in an image for each of regions (ROI) set in the image. The position of the region is defined by upper left corner coordinates (Xa, Ya) of the region, a length (that is, a width) of the region in the horizontal direction (x direction), and a length (that is, a height) of the region in the vertical direction (y direction). An example of the length of the region in the horizontal direction is a physical region length XLa in the x direction of the region. An example of the length of the region in the Y-axis direction is a physical region length YLa of the region in the Y-axis direction. The physical region length refers to the physical length (data length) of the region. The position information may include coordinates of a position different from the upper left end of the region. The region analyzer 318 stores the derived position information in the storage unit, for example. The region analyzer 318 stores the information in the storage unit in association with an identifier (region number) assigned to the region, for example.

The region analyzer 318 may further derive, as position information, an output region length XLc in the horizontal direction (x direction) of the region and an output region length YLc in the vertical direction (y direction) of the region, for each of regions, for example. An example of the output region length is a physical length (data length) of a region (ROI) after the resolution is changed by thinning processing or pixel addition. In addition to position information, the region analyzer 318 may derive "AD word length", "exposure", "gain", "sensing information", "image format", or the like for each of regions, so as to be stored in the storage unit. The image format refers to the format of the region image. The region analyzer 318 may derive, for example, the number of regions (ROIs) included in the captured image (ROI number) and store the derived number in the storage unit.

In a case where a plurality of objects as an imaging target is specified in a captured image, the overlap detector 320 detects an overlapping region where two or more regions overlap (region of overlap (ROO)) on the basis of the position information of the plurality of regions in the captured image. That is, the overlap detector 320 derives the position information of the overlapping region ROO in the captured image for each of the overlapping regions ROO. The overlap detector 320 stores, for example, the derived position information of the overlapping region ROO in the storage unit. The overlap detector 320 stores the derived position information of the overlapping region ROO in the storage unit in association with the overlapping region ROO, for example. The overlapping region ROO is, for example, a region having the same size as or smaller than a smallest region in two or more regions (ROI) overlapping each other or a region smaller than this (for example, a rectangular region). The position information of the overlapping region ROO is defined by upper left corner coordinates (Xb, Yb) of the overlapping region ROO, a length (that is, a width) of the overlapping region ROO in the horizontal direction (x direction), and a length (that is, a height) of the overlapping region ROO in the vertical direction (y direction). An example of the length of the overlapping region ROO in the horizontal direction is a physical region length XLb. An example of the length of the overlapping region ROO in the vertical direction is a physical region length YLb. The position information of the overlapping region ROO may include coordinates of a position different from the upper left end of the region (ROI).

The priority setting unit 322 assigns a priority to each of regions (ROI) in a captured image. The priority setting unit 322 stores the assigned priority in the storage unit, for example. The priority setting unit 322 stores the assigned priority in the storage unit in association with the region, for example. The priority setting unit 322 may assign a priority to each of regions in addition to the region number (ROI ID) assigned to each of the regions or may use the region number (ROI ID) assigned to each of regions instead of priority. The priority setting unit 322 may store the priority in the storage unit in association with the region or may store the region number assigned to each of regions in the storage unit in association with the region.

The priority is an identifier of each of regions (ROI) and is discrimination information capable of discriminating which of a plurality of regions in the captured image has undergone omission of the overlapping region ROO. For example, of the two regions each including the overlapping region ROO, the priority setting unit 322 gives priority 1 to one region and priority 2 to the other region. In this case, for example, omission of the overlapping region ROO is performed onto the region having a larger priority value. Note that the priority setting unit 322 may assign the same number as the region number assigned to each of regions as a priority to the region. The priority setting unit 322 stores the priority assigned to each of regions in the storage unit in association with the region image, for example.

The image processing controller 326 has a function of performing a process related to the transmission method according to the present embodiment and thus transfers region information concerning the region set for the image to the encoder 324 and the EBD buffer 310. In addition, the image processing controller 326 may set the additional information other than the region information and may transfer the region information and the other additional information to the EBD buffer 310 as a series of additional information. Note that examples of the series of additional information including the region information includes information defined in Embedded Data described with reference to FIG. 22, for example.

An example of the process of setting additional information can be a process of generating additional information. Examples of the process of generating additional information include one or two or more of the processes, namely, a process of generating information indicating the amount of data in the region, a process of generating information indicating the size of the region, and a process of generating information indicating the priority of the region. As a specific example, the image processing controller 326 may execute the various processes for setting the additional information described above based on the result of the processing by the region analyzer 318, the overlap detector 320, and the priority setting unit 322 (that is, the result of the processes stored in the storage unit).

Note that the process of setting additional information is not limited to the process of generating the additional information. For example, the image processing controller 326 may set information acquired from the image sensor device 102, such as exposure information and gain information, as additional information. Furthermore, the image processing controller 326 may set, as additional information, data concerning various regions, such as data indicating a physical region length, data indicating an output region length, data indicating an image format, and data indicating the total amount of data.

The image processing controller 326 specifies a region included in each of lines of an image on the basis of region designation information acquired from the region cutout unit 316, the result of the processing by the region analyzer 318, the overlap detector 320, and the priority setting unit 322 (that is, result of the processing stored in the storage unit). In addition, as another example, the image processing controller 326 may specify the region included in each of lines of the image on the basis of region designation information (not illustrated) acquired from an external device. Subsequently, the image processing controller 326 sets the region information based on the specified region. The image processing controller 326 then transfers the region information set for each of regions to the encoder 354.

In addition, in a case where the region designation information is not acquired, the image processing controller 326 would not set the region information.

Furthermore, the image processing controller 326 may generate frame information and transfer the generated frame information to the LINK/PHY controller 304, for example. The frame information is similar to the example described above in the first transmission method.

The encoder 324 encodes the image data transferred from the image sensor device 102 by a predetermined method such as a method corresponding to the JPEG standard, for example.

In a case where the region information is not acquired from the image processing controller 326, the encoder 324 transfers the encoded image data (that is, ordinary data) to the image data buffer 312.

In addition, in a case where the region information is acquired from the image processing controller 326, the encoder 324 transfers the encoded region data corresponding to the region to the image data buffer 312 according to the acquired region information.

The image processing unit 302 includes a region cutout unit 316, a region analyzer 318, an overlap detector 320, a priority setting unit 322, an encoder 324, and an image processing controller 326, for example, and thereby performs processing according to the transmission method of the present embodiment. Note that the functional blocks of the image processing unit 302 illustrated in FIG. 26 are obtained by dividing the functions of the image processing unit 106 for convenience, and how to divide the functions in the image processing unit 302 is not limited to the example illustrated in FIG. 26.

The LINK/PHY controller 304 transfers frame information to the control code generator 306 and the PH generator 308 for each of lines, for example. Furthermore, at this time, the LINK/PHY controller 304 may control the protocol and the transmission path related to the data transmission and may transfer a result of the control to the control code generator 306 and the PH generator 308.

The control code generator 306 sets an error correction code for each of lines. The control code generator 306 generates an error correction code for a line on the basis of data for the line in the frame information. The control code generator 306 transfers the generated error correction code to the combining unit 314, for example. Furthermore, the control code generator 306 may generate an error correction code in cooperation with the PH generator 308.

The PH generator 308 uses the frame information to generate a packet header for each of lines. At this time, in the case of transmitting region data, the PH generator 112 sets information indicating that the region information (for example, region data) is to be transmitted as the header information type to the extension region of the packet header as described above. Thereafter, the PH generator 308 sets information indicating that the region data is to be transmitted using the payload, for at least a part of the extension region.

The EBD buffer 310 is a buffer that temporarily holds additional information transferred from the image processing unit 302 (the image processing controller 326 in the example of FIG. 26). The EBD buffer 310 outputs additional information to the combining unit 314 as "Embedded Data" at a predetermined timing. The "Embedded Data" output from the EBD buffer 310 may be transferred to the combining unit 314 via the image data buffer 312 described below.

The image data buffer 312 is a buffer that temporarily holds data (ordinary data or region data) transferred from the image processing unit 302 (encoder 324 in the example of FIG. 26). The image data buffer 312 outputs the held data to the combining unit 314 for each of lines at a predetermined timing.

The combining unit 314 generates a packet to be transmitted, based on the data acquired individually from the control code generator 306, the PH generator 308, the EBD buffer 310, and the image data buffer 312, for example.

The transmitting unit 328 transmits the packet transferred from the combining unit 314 for each of lines via the data bus B1.

For example, in a case where region 1, region 2, and region 3 illustrated in FIG. 8 are set, the transmitting unit 328 transmits the region information concerning each of regions as a part of additional information (Embedded Data) using packet A2 while transmitting region data corresponding to each of regions using packet A1 for each of lines as illustrated in FIG. 24. Moreover, as another example, in a case where region 1, region 2, and region 3 illustrated in FIG. 10 are set, the transmitting unit 328 transmits the region information concerning each of regions as a part of additional information (Embedded Data) using packet A2 while transmitting region data corresponding to each of regions using packet A1 for each of lines as illustrated in FIG. 25.

In addition, in a case where there is no region setting, that is, where ordinary data is output from the image data buffer 312, the transmitting unit 328 transmits, for each of lines, a packet having data corresponding to each of lines being stored in the payload. Even in this case, the transmitting unit 328 can also transmit the additional information as "Embedded Data".

The above-described configuration is merely an example, and the functional configuration of the image sensor 100 is not limited to this. For example, the device or electronic device that executes each of the above functions is not limited as long as each of the functions can be realized. As a more specific example, some of the functions of the IC chip 300 may be provided outside the IC chip 300.

Furthermore, additional functions may be added as long as the functions of the image sensor 100 described above are not hindered, similarly to the above-described first transmission method.

Hereinabove, an example of the functional configuration of the image sensor 100 (transmission device) in the case of applying the third transmission method has been described with reference to FIG. 26.

Configuration Example of Processor 200
(Reception Device)

Figure 27:
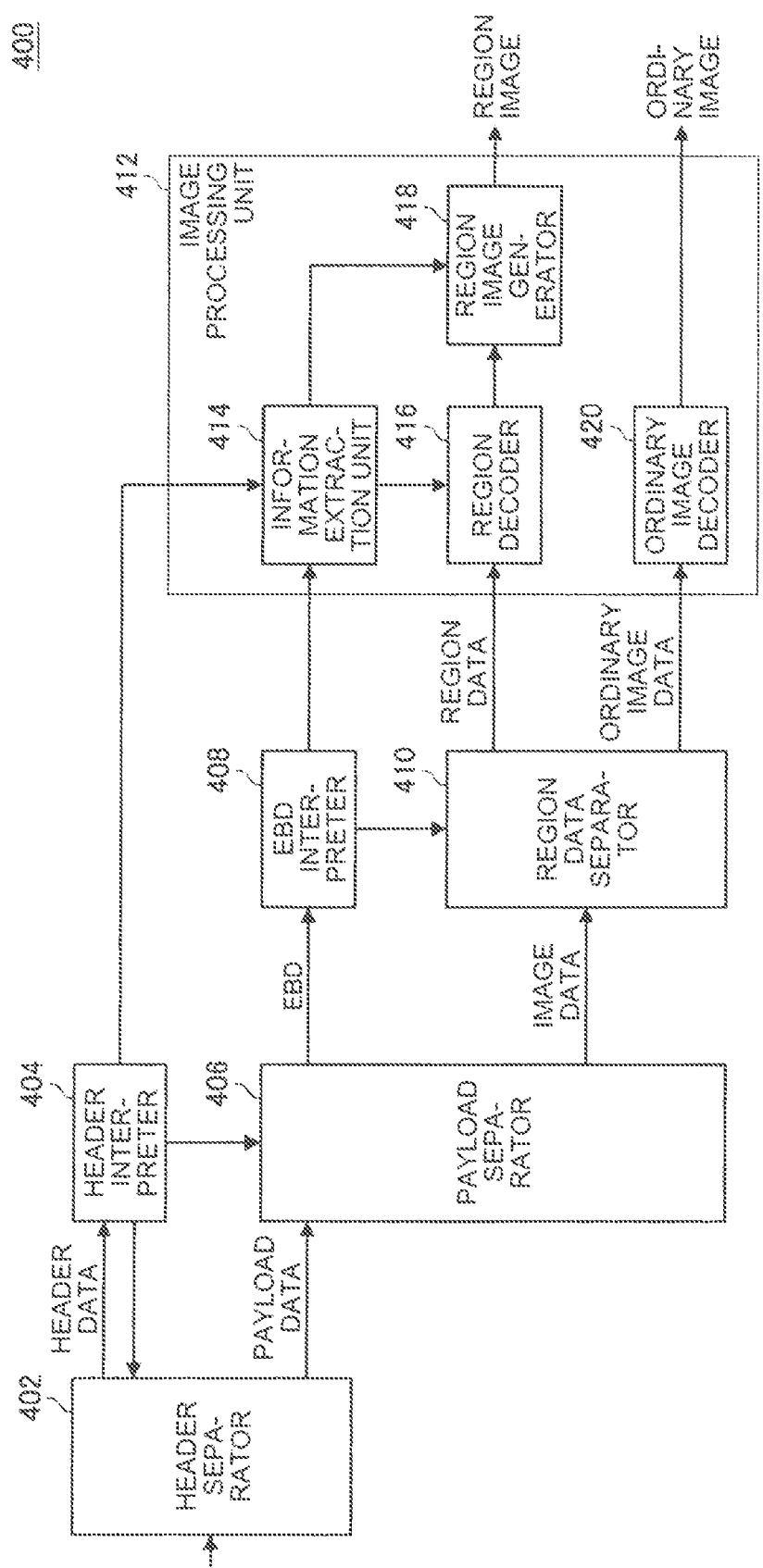
FIG. 27 is a block diagram illustrating an example of a functional configuration of a processor in the case of applying the third transmission method.

Next, an example of the functional configuration of the processor 200 (reception device) in the case of applying the third transmission method will be described. For example, FIG. 27 is a block diagram illustrating an example of the functional configuration of the processor 200 when the third transmission method is applied. As illustrated in FIG. 27, the processor 200 includes, for example, a header separator 402, a header interpreter 404, a payload separator 406, an EBD interpreter 408, a region data separator 410, and an image processing unit 412.

The header separator 402 separates the header data corresponding to a header portion and the payload data corresponding to the payload portion from the received data. The header separator 402 separates the header data from the received data according to a rule defined in advance by a standard or the like, for example. Furthermore, the header separator 402 may separate the payload data from the received data according to a rule preliminarily defined by the standard, for example, or may separate the payload data from the received data based on the result of the processing performed by the header interpreter 404.

The header interpreter 404 interprets the content indicated by the header data.

As a specific example, the header interpreter 404 recognizes the format of the information that is set in a region other than top three bits of the extension region according to the header information type set in the top three bits of the extension region of a packet header. Subsequently, the header interpreter 404 reads out various types of information set in the extension region according to the recognition result of the format. This enables the header interpreter 404 to recognize transmission of region (ROI) information (for example, region data) based on the information set in the extension region, for example. Subsequently, the header interpreter 404 notifies the payload separator 406 and the image processing unit 412 (an information extraction unit 414, which will be described below) of the setting recognized according to the read result of various types of information set in the extension region. Specifically, in a case where the header interpreter 404 has recognized transmission of the region (ROI) information (for example, region data), the header interpreter 404 notifies the payload separator 406 and the image processing unit 412 of the recognition result.

The example of the process performed on the header interpreter 404 is not limited to the above example. For example, the header interpreter 404 may specify the position of the payload data and may transfer the specified position to the header separator 402. The header interpreter 404 can also distinguish between packet A2 that transmits "Embedded Data" and packet A1 that transmits region data.

The payload separator 406 separates the additional information and the image data (ordinary data or region data) from the payload data based on the interpretation result from the header interpreter 404.

For example, in a case where the packet as a processing target is packet A2 or A3, the payload separator 406 may separate additional information (Embedded Data) from the packet.

Furthermore, as another example, in a case where the packet as a processing target is packet A1, the payload separator 406 separates the image data from the payload data.

The payload separator 406 transmits additional information out of various types of data separated from the payload data, to the EBD interpreter 408. Furthermore, the payload separator 406 transmits image data (region data or ordinary data) out of various data separated from the payload data to the region data separator 410.

The EBD interpreter 238 interprets the content of additional information (Embedded Data) and then outputs the interpretation result of the additional information to the region data separator 410 and the image processing unit 412. The format of additional information (Embedded Data) is as described above with reference to FIG. 22.

The region data separator 410 discriminates whether the image data stored in the payload is region data or ordinary data on the basis of the interpretation result of the additional information (Embedded Data). For example, in a case where region data is stored in the payload, the region data separator 410 separates the region data from the payload data according to the interpretation result of the additional information and then transmits the separated region data to the image processing unit 412 (a region decoder 416, which will be described below). In a case where ordinary data is stored in the payload, the region data separator 410 separates the ordinary data from the payload data according to the interpretation result of the packet header and then transmits the separated ordinary data to the image processing unit 412 (an ordinary image decoder 420, which will be described below).

The image processing unit 412 includes an information extraction unit 414, a region decoder 416, a region image generator 418, and an ordinary image decoder 420.

In a case where the information extraction unit 414 has recognized transmission of region (ROI) information based on the interpretation result on the header interpreter 404, the information extraction unit 414 extracts various types of information (particularly region information) included in the additional information on the basis of the interpretation result of the additional information (Embedded Data). Subsequently, the information extraction unit 214 outputs various types of information extracted from the additional information to the region decoder 416 and the region image generator 418.

The region decoder 416 separates the region data corresponding to each of regions from the series of region data transmitted from the region data separator 410 based on the interpretation result of the additional information (Embedded Data). The region decoder 416 decodes the separated region data of each of regions by a predetermined method corresponding to the encoding in the image sensor 100. At this time, the region decoder 416 may change the content of the process based on various types of information extracted from the additional information (Embedded Data).

The region image generator 418 generates data representing an image corresponding to the region from region data for each of regions decoded by the region decoder 416, based on various types of information (for example, region information) extracted from the additional information (Embedded Data).

For example, the region image generator 418 discriminates which region includes each of pieces of region data corresponding to partial region for each of lines, which is region data separated for each of regions, based on the region information included in the additional information (Embedded Data). Furthermore, the region image generator 418 recognizes the position, within the image, of each of regions set in the image and the size of the region based on the region information included in the additional information (Embedded Data). Subsequently, the region image generator 418 combines a series of region data corresponding to the region based on the position in the image of each of regions set in the image and based on the recognition result of the region size. As described above, the region image generator 418 combines the series of region data corresponding to each of regions to generate a region image corresponding to the region set in the image.

As described above, the region image generator 418 generates a region image for each of regions set in the image and outputs the generated region image to a predetermined output destination.

The ordinary image decoder 420 decodes the ordinary data transmitted from the region data separator 410 by a predetermined method corresponding to the encoding in the image sensor 100 to generate an ordinary image and then outputs the generated ordinary image to a predetermined output destination.

The above-described configuration is merely an example, and the functional configuration of the processor 200 is not limited to this. For example, the device or electronic device that executes each of the above functions is not limited as long as each of the functions can be realized. As a more specific example, some of the functions of the processor 200 may be provided outside the processor 200.

Furthermore, additional functions may be added as long as the functions of the processor 200 described above are not hindered, similarly to the above-described first transmission method.

(Evaluation)

As described above, in the third transmission method, the region information of each of regions set in the image is transmitted in packet A2 as a part of additional information (Embedded Data), and the region data corresponding to each of regions is transmitted for each of lines in packet A1. Furthermore, in a case of transmitting the data of the region set in the image, information indicating that the region information (for example, region data) is to be transmitted is set in the extension region of the header of each of packets. With the above configuration, the receiving side combines region data stored in the payload of each of packets A1 based on the additional information (Embedded Data), making it possible to easily restore the region image of the region set in the image. Furthermore, in the third transmission method, the region-related information other than region data, such as the coordinates of the regions in the first transmission method and the second transmission method, is not inserted in the payload. Therefore, the third transmission method makes it possible to further reduce the overhead when transmitting region-related information (for example, region data), as compared with other transmission methods.

<3.4. Fourth Transmission Method>

Next, a fourth transmission method will be described. Similarly to the above-described transmission methods, the image sensor 100 in the fourth transmission method stores region data concerning the region set in the image in the payload of the packet and transmits the data for each of lines. Therefore, in the following, the fourth transmission method will be described focusing on the part different from the first transmission method, and the detailed description of the parts that are substantially similar to the first transmission method will be omitted.

(Data Format)

Figure 28:
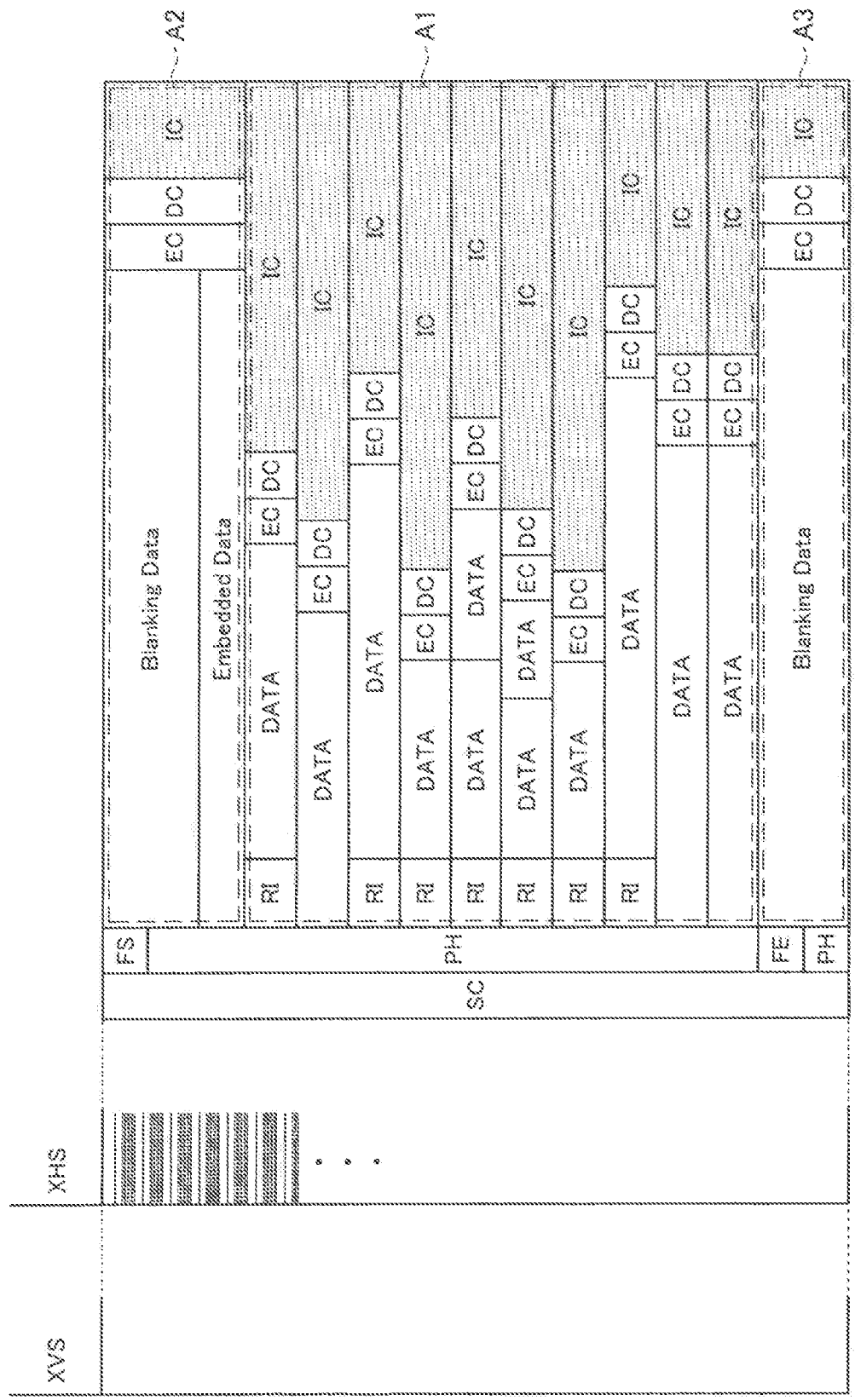
FIG. 28 is a diagram illustrating a format of data transmitted by a fourth transmission method.

First, the format of data transmitted by the fourth transmission method will be described. For example, FIG. 28 is a diagram illustrating the format of data transmitted by the fourth transmission method. Note that, in FIG. 28, the similar reference numerals as those in FIG. 5 denote the similar objects as those in the example illustrated in FIG. 5.

In the example illustrated in FIG. 28, at least a part of the series of packets A2 is used for transmitting Embedded Data. For example, Embedded Data may be transmitted in a state of being stored in the payload of packet A2. Furthermore, as another example, the embedded data may be transmitted in a state of being stored in a region other than the payload of packet A2. Note that the Embedded Data in the fourth transmission method corresponds to additional information (in other words, information embedded by the image sensor 100) additionally transmitted by the image sensor 100, similarly to the first transmission method.

For example, FIG. 29 is a diagram illustrating an example of information included in Embedded Data in the fourth transmission method. In addition, as illustrated in FIG. 29, each of items, the "ROI ID", "upper left coordinate", "height", "width", "AD word length (AD bit)", "exposure", "gain", and "sensing information" illustrates information similar to the example illustrated in FIG. 6.

In FIG. 28, "RI" represents region information (ROI Information) regarding the partial region corresponding to each of regions data stored in the payload. For example, "RI" can include the number of partial regions included in the corresponding line or at least a part of information of various types of information (for example, identification information, coordinates, length, or the like) regarding each of partial regions. Note that, hereinafter, the information indicated by "RI" in FIG. 28 is also referred to as "information regarding partial regions".

Information regarding the partial region is stored at the top of the payload of packet A1. In addition, information having no change out of other information excluding Y coordinate of each of partial regions among information included in the information regarding partial regions between continuously transmitted packets A1 may be omitted in packet A1 to be transmitted later. Furthermore, in a case where Y coordinate is incremented as 1 between continuously transmitted packets A1, the Y coordinate may be omitted in packet A1 to be transmitted later. In addition, in a case where there is no change in any of the information other than the Y coordinate of each of partial regions out of information regarding the partial region between the continuously transmitted packets A1 and where the Y coordinate is incremented by 1, even the information regarding the partial region may be omitted in packet A1 transmitted later. Note that this control will be described below separately with a specific example.

Next, with reference to FIG. 30, an example of a configuration of the packet header of packet A1 used for transmitting the region data concerning the region (ROI) set in the image will be described, particularly focusing on the configuration of the extension region. FIG. 30 is a diagram illustrating an example of a configuration of the packet header in the fourth transmission method.

As illustrated in FIG. 30, in the case of transmitting the region data of the region (ROI) set in the image in the fourth transmission method, information indicating that the region information is to be transmitted (that is, the information corresponding to the type assuming the transmission of the region information) is set as a header information type in the packet header of packet A1 used for transmitting the region data. Furthermore, information indicating the type according to the type of information related to the partial region to be transmitted using the payload (hereinafter, also referred to as "region type (ROI Info Type)") is set for at least a part of the extension region. That is, the information indicating the region type (ROI Info Type) corresponds to an example of "information indicating the type of information regarding the partial region". An example of the information indicating the region type will be described below. In addition, in the case of transmitting the region data concerning the region (ROI) set in the image, the payload length of packet A1 can change according to the horizontal width of the region. Therefore, information indicating the payload length may be set in a part of the extension region, similarly to the example described with reference to FIG. 4.

Subsequently, an example of information indicating a region type (ROI Info Type) will be described with reference to FIG. 31. FIG. 31 is a diagram illustrating an example of information indicating a region type (ROI Info Type). As described above, there is a case, in the fourth transmission method, where the information regarding the partial region is inserted at the top of the payload. The type of various types of information included as the information regarding the partial region varies depending on the difference of setting of the partial region between the continuously transmitted packets A1. Therefore, in the packet header, information indicating the region type is set according to the type of information inserted as the information on the partial region at the top of the payload. Therefore, as illustrated in FIG. 31, the following will individually describe an example of a value that can be set as the information indicating the region type and an example of information that is transmitted as the information indicating the region type in the case where the value is set.

The value "4'b0000" is set in a case where there is no change in any of the information other than the Y coordinate of each of partial regions out of the information regarding the partial region and where the Y coordinate is incremented by 1. That is, in this case, the insertion of the information regarding the partial region in the payload is omitted.

The value "4'b0100" is set in a case where the number of partial regions included in the corresponding line and the identification information of each of the partial regions are transmitted as the information regarding the partial regions. In this case, as information regarding the partial region, the number of partial regions (Num of ROI) included in the line corresponding to the top is stored, and thereafter, the identification information (ROI ID) for each of partial regions is stored in the order in which each of the partial regions have been set to the corresponding line.

The value "4'b0101" is set in a case where the number of partial regions included in the corresponding line, and the identification information and a width (length in horizontal direction) of each of the partial regions, are transmitted as the information regarding the partial regions. In this case, as information regarding the partial region, the number of partial regions (Num of ROI) included in the line corresponding to the top is stored, and thereafter, the identification information (ROI ID) and the width (ROI LEN) for each of partial regions is stored in the order in which each of the partial regions have been set to the corresponding line.

The value "4'b0110" is set in a case where the number of partial regions included in the corresponding line, and the identification information and X coordinate (position in horizontal direction) of each of the partial regions, are transmitted as the information regarding the partial regions. In this case, as information regarding the partial region, the number of partial regions (Num of ROI) included in the line corresponding to the top is stored, and thereafter, the identification information (ROI ID) and the X coordinate (ROI X) for each of partial regions is stored in the order in which each of the partial regions have been set to the corresponding line.

The value "4'b0111" is set in a case where the number of partial regions included in the corresponding line, and the identification information, X coordinate (position in horizontal direction), and a width (length in horizontal direction) of each of the partial regions, are transmitted as the information regarding the partial regions. In this case, as information regarding the partial region, the number of partial regions (Num of ROI) included in the line corresponding to the top is stored, and thereafter, the identification information (ROI ID), X coordinate (ROI X) and the width (ROI LEN) for each of partial regions is stored in order in which each of the partial regions have been set to the corresponding line.

The value "4'b1000" is set in a case where the Y coordinate of a partial region included in the corresponding line (in other words, Y coordinate of the line) is transmitted as the information regarding the partial regions. In this case, the Y coordinate (Y) of the line corresponding to the top is stored as the information regarding the partial region.

The value "4'b1100" is set in a case where the Y coordinate of a partial region included in the corresponding line (in other words, Y coordinate of the line), the number of partial regions included in the line, and identification information of each of the partial regions are transmitted as the information regarding the partial regions. In this case, as information regarding the partial region, the Y coordinate (Y) of the line corresponding to the top and the number of partial regions (Num of ROI) included in the line are stored in this order, and thereafter, the identification information (ROI ID) for each of partial regions is stored in the order in which each of the partial regions have been set to the corresponding line.

The value "4'b1101" is set in a case where the Y coordinate of a partial region included in the corresponding line (in other words, Y coordinate of the line), the number of partial regions included in the line, identification information and a width (length in horizontal direction) of each of the partial regions are transmitted as the information regarding the partial regions. In this case, as information regarding the partial region, the Y coordinate (Y) of the line corresponding to the top and the number of partial regions (Num of ROI) included in the line are stored in this order, and thereafter, the identification information (ROI ID) and the width (ROI LEN) for each of partial regions is stored in the order in which each of the partial regions have been set to the corresponding line.

The value "4'b1110" is set in a case where the Y coordinate of a partial region included in the corresponding line (in other words, Y coordinate of the line), the number of partial regions included in the line, identification information and X coordinate (position in horizontal direction) of each of the partial regions are transmitted as the information regarding the partial regions. In this case, as information regarding the partial region, the Y coordinate (Y) of the line corresponding to the top and the number of partial regions (Num of ROI) included in the line are stored in this order, and thereafter, the identification information (ROI ID) and the X coordinate (ROI X) for each of partial regions are stored in the order in which each of the partial regions have been set to the corresponding line.

The value "4'b1111" is set in a case where the Y coordinate of a partial region included in the corresponding line (in other words, Y coordinate of the line), the number of partial regions included in the line, and identification information, X coordinate (position in horizontal direction), and a width (length in horizontal direction) of each of the partial regions, are transmitted as the information regarding the partial regions. In this case, as information regarding the partial region, the Y coordinate (Y) of the line corresponding to the top and the number of partial regions (Num of ROI) included in the line are stored in this order, and thereafter, the identification information (ROI ID), X coordinate (ROI X), and the width (ROI LEN) for each of partial regions is stored in the order in which each of the partial regions have been set to the corresponding line.

Example of Data

Next, with reference to FIG. 32 to FIG. 35, a specific example of data transmitted by the fourth transmission method will be described as an example in a case where the fourth transmission method is applied.

Figure 32:
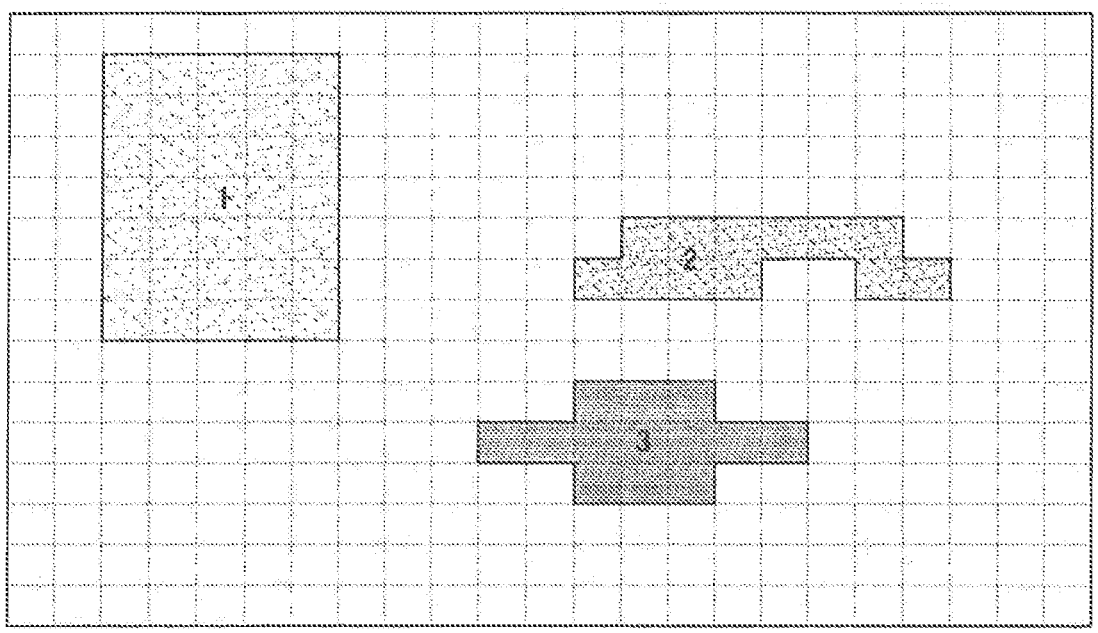
FIG. 32 is a diagram illustrating an example of a region that is set for an image.

For example, FIG. 32 is a diagram illustrating an example of a region (ROI) that is set for an image. In FIG. 32, three regions, region 1, region 2, and region 3, are illustrated as an example of regions set for an image. Furthermore, in FIG. 32, a grid divided by broken lines extending in the vertical direction and the horizontal direction schematically illustrates a piece of unit data (for example, pixel) forming the image. In the example illustrated in FIG. 32, the coordinates of the upper left vertex of each of grids are defined as the coordinates of the grid, for convenience.

Figure 33:
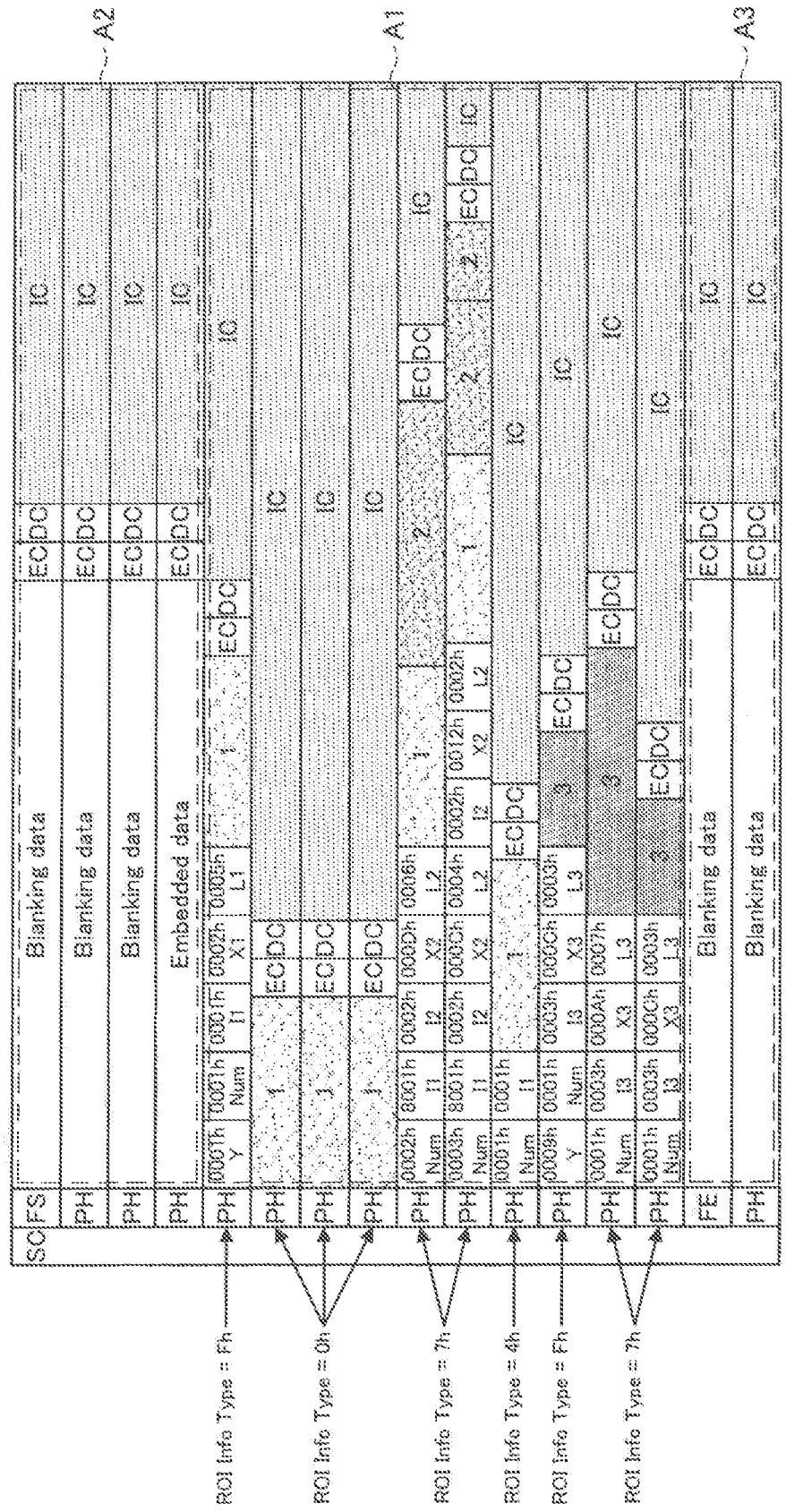
FIG. 33 is a diagram illustrating an example of data transmitted by the fourth transmission method.

Furthermore, FIG. 33 is a diagram illustrating an example of data transmitted by the fourth transmission method, illustrating one-frame data in a case where the region data concerning each of the regions illustrated in FIG. 32 is transmitted by the fourth transmission method. Note that the configurations of packets A2 and A3 in FIG. 33 are substantially similar to the example described with reference to FIG. 5, and hence the following description will focus on the configuration of packet A1. Furthermore, each of "1", "2", and "3" illustrated in FIG. 33 corresponds to the data of region 1, the data of region 2, and the data of region 3 stored in the payload of packet A1.

For example, only the partial region of region 1 is set in the first line of region 1. Therefore, region data of the partial region of region 1 is stored in the payload of packet A1, for this line. Furthermore, at the top of the payload, Y coordinate (Y) of the partial region, the number of partial regions (Num of ROI), and identification information (I1), X coordinate (X1), and a width (L1) of region 1, are inserted as information regarding the partial region. Therefore, "Fh (=4'b1111)" is set as the region type (ROI Info Type) in the packet header of packet A1. Furthermore, regarding the second line to the fourth line of region 1 to which the region data is transmitted next, there is no change from the first line of region 1 except for the Y coordinate (Y) of the partial region in the information regarding the partial region. Therefore, in the payload of packet A1 used for transmitting the data of the partial regions in the second to fourth lines of region 1, information regarding the partial regions is not inserted at the top. Therefore, "0h (=4'b0000)" is set as the region type (ROI Info Type) in the packet header of packet A1.

In addition, the partial region of region 1 and the partial region of region 2 are set in the line corresponding to the fifth line of region 1. Therefore, for this line, the payload of packet A1 stores the region data of the partial region of region 1 and the region data of the partial region of region 2. Furthermore, at the top of the payload, Y coordinate (Y) of the partial region, the number of partial regions (Num of ROI), identification information (I1), X coordinate (X1), and the width (L1) of region 1, identification information (I2), X coordinate (X2), and a width (L2) of region 2, are inserted as information regarding the partial region. Therefore, "Fh (=4'b1111)" is set as the region type (ROI Info Type) in the packet header of packet A1. Furthermore, in the line corresponding to the sixth line of region 1 for which the region data is transmitted next, the information of the partial region corresponding to region 2 has been changed from the fifth line, that is, two independent regions are set as the partial regions of region 2. Therefore, for this line, the payload of packet A1 stores the region data of the partial region of region 1 and the region data of the two partial regions of region 2. Furthermore, at the top of the payload, Y coordinate (Y) of the partial region, the number of partial regions (Num of ROI), identification information (I1), X coordinate (X1), and the width (L1) of region 1, and identification information (I2), X coordinate (X2), and the width (L2) of the two partial regions of region 2, are inserted as information regarding the partial region. Therefore, "Fh (=4'b1111)" is set as the region type (ROI Info Type) in the packet header of packet A1.

In addition, only the partial region of region 1 is set in the line corresponding to the seventh line of region 1. Therefore, region data of the partial region of region 1 is stored in the payload of packet A1, for this line. Note that the line is similar to the immediately preceding line except that the partial region of region 2 does not exist, that is, the number of regions (Num of ROI) and the identification information (I1) of region 1 are inserted at the top of the payload, as information regarding the partial region. Therefore, "4h (=4'b0100)" is set as the region type (ROI Info Type) in the packet header of packet A1.

Furthermore, region 3 is set to include three line regions in the horizontal direction, in which the X coordinate of the left end of the partial region corresponding to the first and third lines differs from the X coordinate of the left end of the partial region corresponding to the second line.

Specifically, only the partial region of region 3 is set in the first line of region 3. Therefore, region data of the partial region of region 3 is stored in the payload of packet A1, for this line. Furthermore, at the top of the payload, Y coordinate (Y) of the partial region and the number of partial regions (Num of ROI), and identification information (I3), X coordinate (X3), and a width (L3) of region 3, are inserted as information regarding the partial region. Therefore, "Fh (=4'b1111)" is set as the region type (ROI Info Type) in the packet header of packet A1. The second line of region 3 is similar to the immediately preceding line except that the X coordinate and the width of the partial region are different, that is, the number of regions (Num of ROI), and the identification information (I3), the X coordinate (X3), and the width (L3) of region 3, are inserted at the top of the payload, as information regarding the partial region. Therefore, "7h (=4'b0111)" is set as the region type (ROI Info Type) in the packet header of packet A1. Similarly, the third line of region 3 is similar to the immediately preceding line except that the X coordinate and the width of the partial region are different, that is, the number of regions (Num of ROI), and the identification information (I3), the X coordinate (X3), and the width (L3) of region 3, are inserted at the top of the payload, as information regarding the partial region. Therefore, "7h (=4'b0111)" is set as the region type (ROI Info Type) in the packet header of packet A1.

Figure 34:
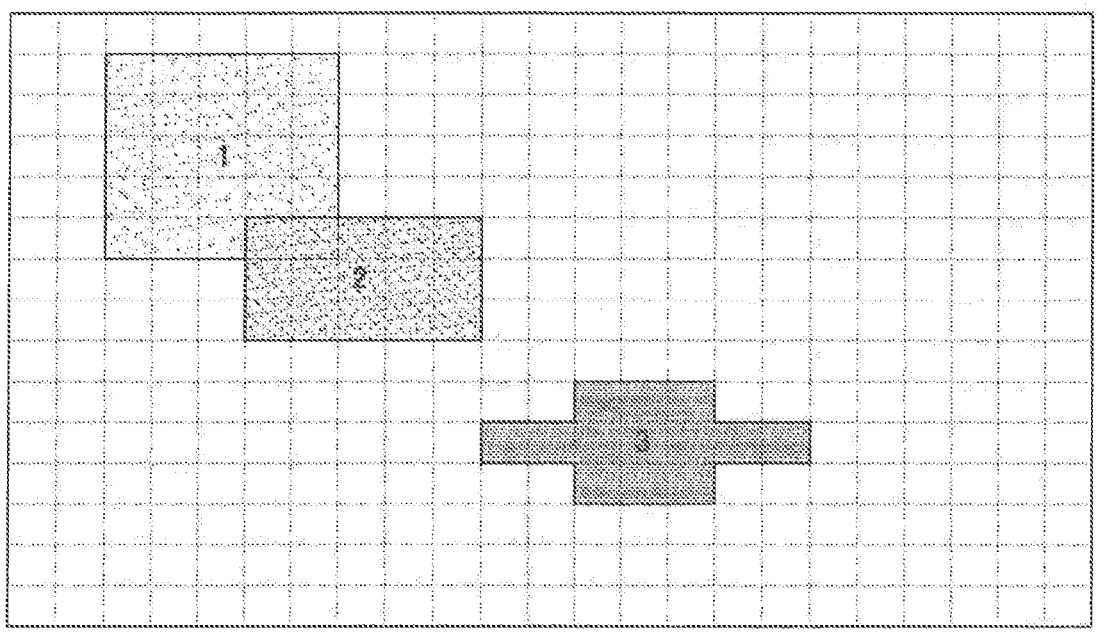
FIG. 34 is a diagram illustrating another example of a region that is set for an image.

In addition, FIG. 34 is a diagram illustrating another example of a region (ROI) that is set for an image. In FIG. 34, three regions, region 1, region 2, and region 3, are illustrated as an example of regions set for an image. Note that, in FIG. 34, a grid divided by broken lines extending in the vertical direction and the horizontal direction schematically illustrates a piece of unit data forming the image, similarly to the example described with reference to FIG. 8. Therefore, also in the example illustrated in FIG. 34, the coordinates of the upper left vertex of each of grids are defined as the coordinates of the grid, for convenience.

Figure 35:
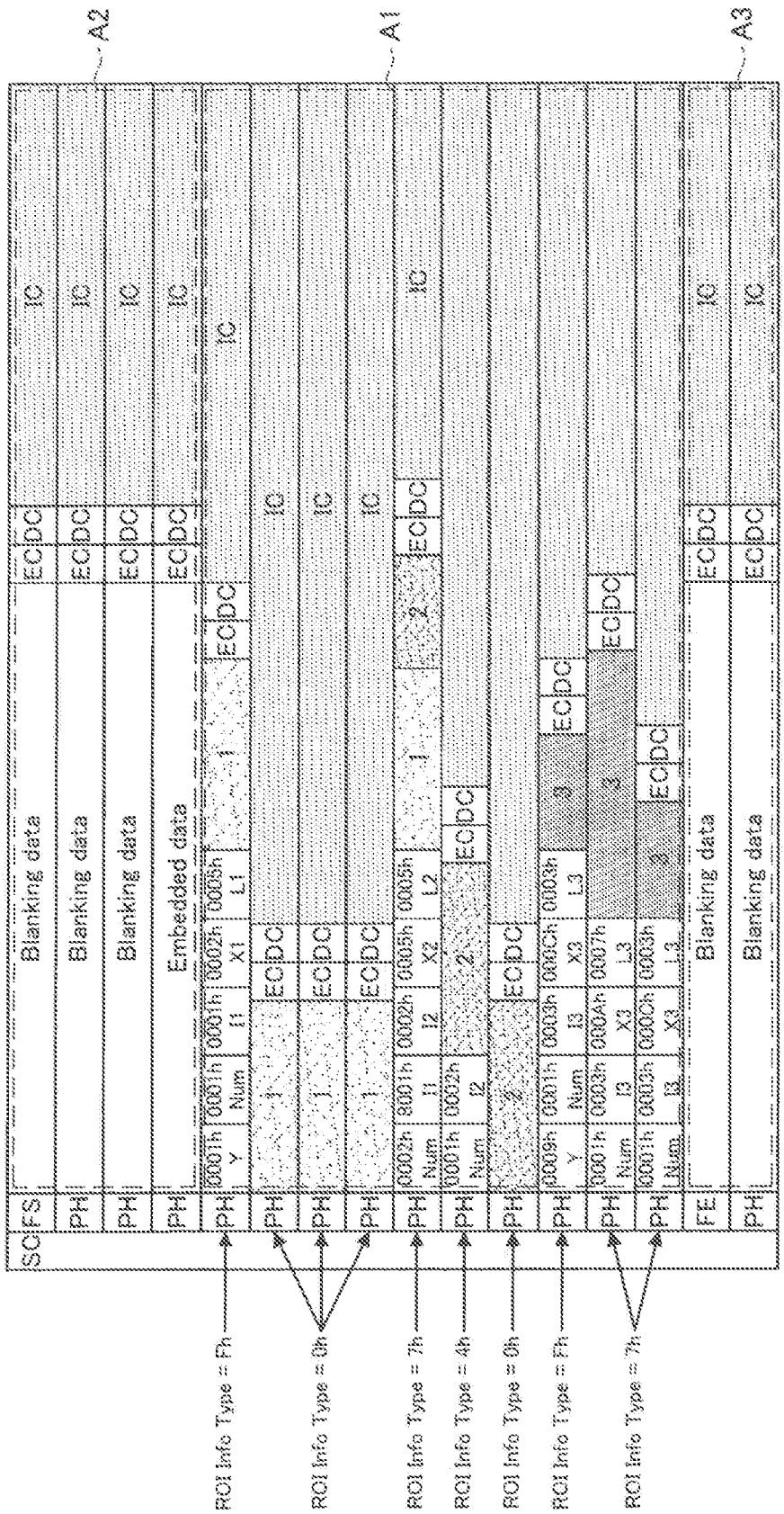
FIG. 35 is a diagram illustrating another example of data transmitted by the fourth transmission method.

Furthermore, FIG. 35 is a diagram illustrating another example of data transmitted by the fourth transmission method, illustrating one-frame data in a case where the region data concerning each of the regions illustrated in FIG. 34 is transmitted by the fourth transmission method. Note that the configurations of packets A2 and A3 in FIG. 35 as well are substantially similar to the example described with reference to FIG. 5, and hence the description will focus on the configuration of packet A1. Furthermore, each of "1", "2", and "3" illustrated in FIG. 35 corresponds to the data of region 1, the data of region 2, and the data of region 3 stored in the payload of packet A1.

For example, only the partial region of region 1 is set in the first line of region 1. Therefore, region data of the partial region of region 1 is stored in the payload of packet A1, for this line. Furthermore, at the top of the payload, Y coordinate (Y) of the partial region, the number of partial regions (Num of ROI), and identification information (I1), X coordinate (X1), and a width (L1) of region 1, are inserted as information regarding the partial region. Therefore, "Fh (=4'b1111)" is set as the region type (ROI Info Type) in the packet header of packet A1. Furthermore, regarding the second line to the fourth line of region 1 to which the region data is transmitted next, there is no change from the first line of region 1 except for the Y coordinate (Y) of the partial region in the information regarding the partial region. Therefore, at the top of the payload of packet A1 used for transmitting the data of the partial regions in the second to fourth lines of region 1, information regarding the partial regions is not inserted. Therefore, "0h (=4'b0000)" is set as the region type (ROI Info Type) in the packet header of packet A1.

In addition, the partial region of region 1 and the partial region of region 2 are set in the line corresponding to the fifth line of region 1. Therefore, for this line, the payload of packet A1 stores the region data of the partial region of region 1 and the region data of the partial region of region 2. Furthermore, at the top of the payload, Y coordinate (Y) of the partial region, the number of partial regions (Num of ROI), identification information (I1), X coordinate (X1), and the width (L1) of region 1, identification information (I2), X coordinate (X2), and a width (L2) of region 2, are inserted as information regarding the partial region. Therefore, "Fh (=4'b1111)" is set as the region type (ROI Info Type) in the packet header of packet A1. In addition, in the line, a part of the partial region of region 1 and a part of the partial region of region 2 overlap each other. Regarding the overlapping region (overlapping region ROO), which of the region data of the partial region of region 1 and the region data of the partial region of region 2 is stored in the payload (that is, which is omitted) is optional. For example, in the example illustrated in FIG. 35, the overlapping region (overlapping region ROO) with the first region is omitted for the second region. Even in a case where the overlapping region is omitted, the X coordinate and the width of each of partial regions set as information regarding the partial region are set based on the state before the omission.

In addition, only the partial region of region 2 is set in the line corresponding to the second line of region 2. Therefore, region data of the partial region of region 2 is stored in the payload of packet A1, for this line. Note that the line is similar to the immediately preceding line except that the partial region of region 1 does not exist, that is, the number of regions (Num of ROI) and the identification information (I2) of region 2 are inserted at the top of the payload, as information regarding the partial region. Therefore, "4h (=4'b0100)" is set as the region type (ROI Info Type) in the packet header of packet A1. Furthermore, regarding the third line of region 2 for which the region data is transmitted next, there is no change from the second line of region 2 except for the Y coordinate (Y) of the partial region in the information regarding the partial region. Therefore, at the top of the payload of packet A1 used for transmitting the data of the partial regions in the third lines of region 2, information regarding the partial regions is not inserted. Therefore, "0h (=4'b0000)" is set as the region type (ROI Info Type) in the packet header of packet A1.

The region 3 is similar to the example described with reference to FIGS. 32 and 33 and thus detailed description thereof will be omitted.

Example of Configuration of Image Sensor 100 (Transmission Device)

Figure 36:
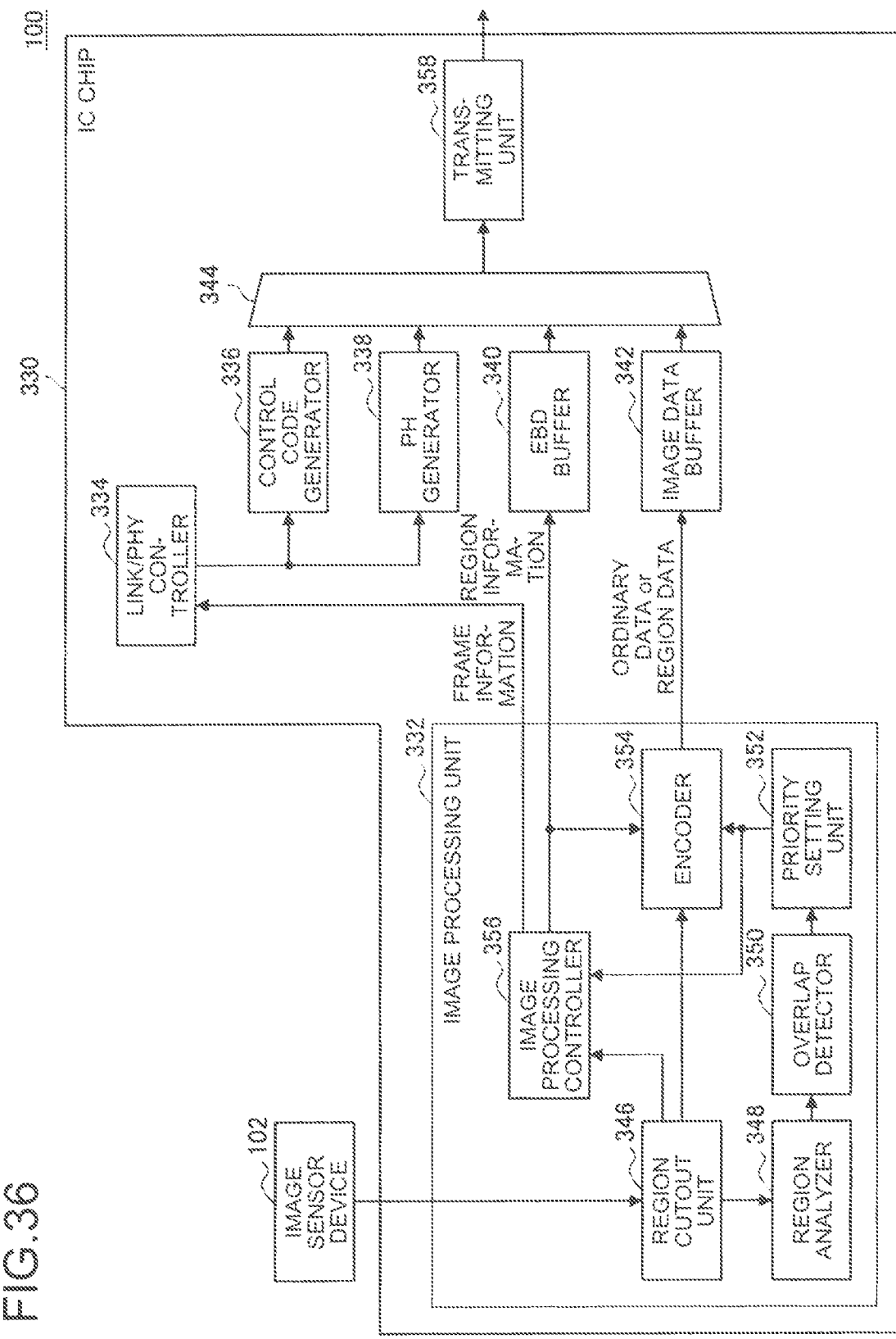
FIG. 36 is a block diagram illustrating an example of a functional configuration of an image sensor in the case of applying the fourth transmission method.

Next, an example of a functional configuration of the image sensor 100 (transmission device) in the case of applying the fourth transmission method will be described. For example, FIG. 36 is a block diagram illustrating an example of a functional configuration of the image sensor 100 in the case of applying the fourth transmission method. As illustrated in FIG. 36, the image sensor 100 includes an image sensor device 102 and an IC chip 330, for example. The image sensor 100 in FIG. 36 operates on electric power supplied from an internal power supply (not illustrated) such as a battery included in the communication system 1000, or electric power supplied from an external power supply of the communication system 1000.

The image sensor device 102 illustrated in FIG. 36 is substantially similar to the image sensor device 102 illustrated in FIG. 12.

The IC chip 330 is a chip formed with an IC in which a circuit related to the data transmission function using the third transmission method is integrated and is used to process image data transferred from the image sensor device 102 and transmit the data corresponding to the generated image. The circuit related to the data transmission function according to the fourth transmission method is not limited to the implementation in the form of one IC chip, and may be formed of a plurality of IC chips.

The IC chip 330 includes an image processing unit 332, a LINK/PHY controller 334, a control code generator 336, a PH generator 338, an EBD buffer 340, an image data buffer 342, a combining unit 344, and a transmitting unit 358, for example.

The image processing unit 332 can be formed as one circuit having a function of performing processes related to the transmission method according to the present embodiment. When performing the process related to the transmission method according to the present embodiment, the image processing unit 332 controls, for each of lines in the image, to transmit region data corresponding to the region set in the image, through the LINK/PHY controller 334, the control code generator 336, the PH generator 338, the EBD buffer 340, the image data buffer 342, the combining unit 344, and the transmitting unit 358, using the third transmission method. The image processing unit 332 can also control to transmit the image data transferred from the image sensor device 102 (that is, the data representing the entire image) for each of lines.

The image processing unit 332 can be formed by a processor such as an MPU, for example.

The function of the image processing unit 332 will be described in the form of functional blocks. As illustrated in FIG. 36, the image processing unit 332 includes a region cutout unit 346, a region analyzer 348, an overlap detector 350, a priority setting unit 322, an image processing controller 326, and an encoder 324, for example. Note that the region cutout unit 346, the region analyzer 348, the overlap detector 350, and the priority setting unit 322 are respectively substantially similar to the region cutout unit 316, the region analyzer 318, the overlap detector 320, and the priority setting unit 322 illustrated in FIG. 26, and thus, detailed description thereof will be omitted.

The image processing controller 356 has a function of performing a process related to the transmission method according to the present embodiment and thus transfers region information concerning the region set for the image to the encoder 324 and the EBD buffer 340. In addition, the image processing controller 356 may set the additional information other than the region information and may transfer the region information and the other additional information to the EBD buffer 340 as a series of additional information. Note that examples of the series of additional information including the region information includes information defined in Embedded Data described with reference to FIG. 29, for example.

An example of the process of setting additional information can be a process of generating additional information. Examples of the process of generating additional information include one or two or more of the processes, namely, a process of generating information indicating the amount of data in the region, a process of generating information indicating the size of the region, and a process of generating information indicating the priority of the region. As a specific example, the image processing controller 356 may execute the various processes for setting the additional information described above based on the result of the processing by the region analyzer 348, the overlap detector 350, and the priority setting unit 322 (that is, the result of the processing stored in the storage unit).

Note that the process of setting additional information is not limited to the process of generating the additional information. For example, the image processing controller 356 may set information acquired from the image sensor device 102, such as exposure information and gain information, as additional information. Furthermore, the image processing controller 356 may set, as additional information, data concerning various regions, such as data indicating a physical region length, data indicating an output region length, data indicating an image format, and data indicating the total amount of data.

The image processing controller 356 specifies a region included in each of lines of an image based on region designation information acquired from the region cutout unit 346, the result of the processing by the region analyzer 348, the overlap detector 350, and the priority setting unit 322 (that is, result of the processing stored in the storage unit). In addition, as another example, the image processing controller 356 may specify the region included in each of lines of the image based on region designation information (not illustrated) acquired from an external device. Subsequently, the image processing controller 356 sets the region information based on the specified region. The image processing controller 356 then transfers the region information set for each of regions to the encoder 354.

In addition, in a case where the region designation information is not acquired, the image processing controller 356 would not set the region information.

Furthermore, the image processing controller 356 may generate frame information and transfer the generated frame information to the LINK/PHY controller 334, for example. The frame information is similar to the example described above in the first transmission method.

The encoder 354 encodes the image data transferred from the image sensor device 102 by a predetermined method such as a method corresponding to the JPEG standard, for example.

In a case where the region information is not acquired from the image processing controller 356, the encoder 354 transfers the encoded image data (that is, ordinary data) to the image data buffer 342.

In addition, in a case where the region information is acquired from the image processing controller 356, the encoder 354 transfers the acquired region information and the encoded region data corresponding to the region to the image data buffer 342.

The image processing unit 332 includes a region cutout unit 346, a region analyzer 348, an overlap detector 350, a priority setting unit 352, an encoder 354, and an image processing controller 356, for example, and thereby performs processing according to the transmission method of the present embodiment. Note that the functional blocks of the image processing unit 332 illustrated in FIG. 36 are obtained by dividing the functions of the image processing unit 332 for convenience, and how to divide the functions in the image processing unit 332 is not limited to the example illustrated in FIG. 36.

The LINK/PHY controller 334 transfers frame information to the control code generator 336 and the PH generator 338 for each of lines, for example. Furthermore, at this time, the LINK/PHY controller 334 may control the protocol and the transmission path related to the data transmission and may transfer a result of the control to the control code generator 336 and the PH generator 338.

The control code generator 336 sets an error correction code for each of lines. The control code generator 336 generates an error correction code for a line on the basis of data for the line in the frame information. The control code generator 336 transfers the generated error correction code to the combining unit 344, for example. Furthermore, the control code generator 336 may generate an error correction code in cooperation with the PH generator 338.

The PH generator 338 uses the frame information to generate a packet header for each of lines. At this time, in the case of transmitting region data, the PH generator 112 sets information indicating that the region information (for example, region data) is to be transmitted as the header information type to the extension region of the packet header as described above. Thereafter, the PH generator 338 sets, for at least a part of the extension region, information indicating that the region data is to be transmitted using the payload and information indicating the region type (ROI Info Type) corresponding to the information regarding the partial region to be inserted into the payload.

The EBD buffer 340 is a buffer that temporarily holds additional information transferred from the image processing unit 332 (the image processing controller 356 in the example of FIG. 36). The EBD buffer 340 outputs additional information to the combining unit 344 as "Embedded Data" at a predetermined timing. The "Embedded Data" output from the EBD buffer 340 may be transferred to the combining unit 344 via the image data buffer 342 described below.

The image data buffer 342 is a buffer that temporarily holds data (ordinary data or region data) transferred from the image processing unit 332 (encoder 324 in the example of FIG. 36). The image data buffer 342 outputs the held data to the combining unit 344 for each of lines at a predetermined timing.

The combining unit 344 generates a packet to be transmitted based on the data acquired from the control code generator 336, the PH generator 338, the EBD buffer 340, and the image data buffer 342, for example.

The transmitting unit 358 transmits the packet transferred from the combining unit 344 for each of lines via the data bus B1.

For example, in a case where region 1, region 2, and region 3 illustrated in FIG. 32 are set, the transmitting unit 358 transmits the region information concerning each of regions as a part of additional information (Embedded Data) using packet A2 while transmitting region data corresponding to each of regions using packet A1 for each of lines as illustrated in FIG. 33. Moreover, as another example, in a case where region 1, region 2, and region 3 illustrated in FIG. 34 are set, the transmitting unit 358 transmits the region information concerning each of regions as a part of additional information (Embedded Data) using packet A2 while transmitting region data corresponding to each of regions using packet A1 for each of lines as illustrated in FIG. 35.

In addition, in a case where there is no region setting, that is, where ordinary data is output from the image data buffer 342, the transmitting unit 358 transmits, for each of lines, a packet having data corresponding to each of lines being stored in the payload. Even in this case, the transmitting unit 358 can also transmit the additional information as "Embedded Data".

The above-described configuration is merely an example, and the functional configuration of the image sensor 100 is not limited to this. For example, the device or electronic device that executes each of the above functions is not limited as long as each of the functions can be realized. As a more specific example, some of the functions of the IC chip 330 may be provided outside the IC chip 330.

Furthermore, additional functions may be added as long as the functions of the image sensor 100 described above are not hindered, similarly to the above-described first transmission method.

Hereinabove, an example of the functional configuration of the image sensor 100 (transmission device) in the case of applying the third transmission method has been described with reference to FIG. 36.

Configuration Example of Processor 200
(Reception Device)

Figure 37:
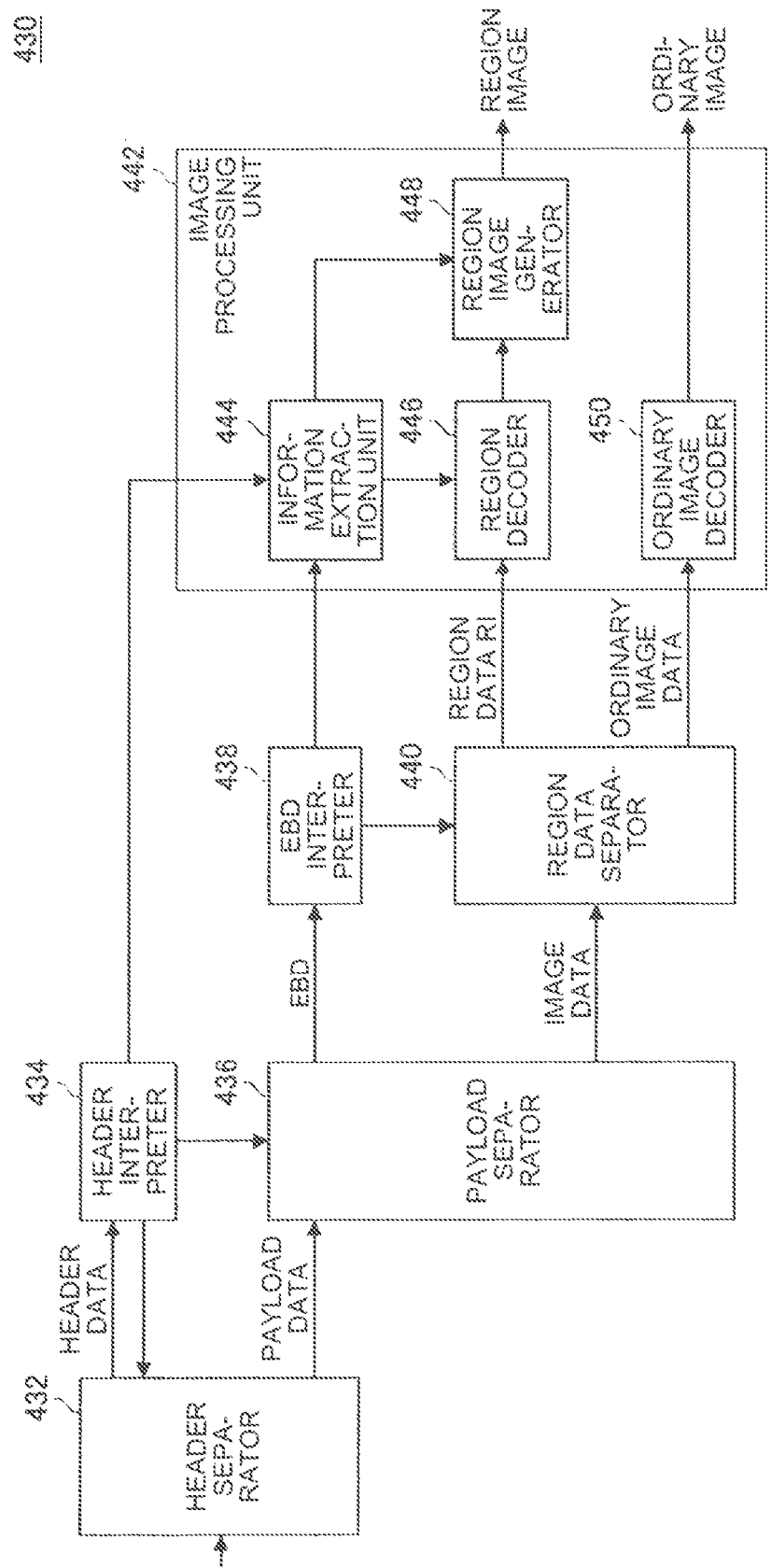
FIG. 37 is a block diagram illustrating an example of a functional configuration of a processor in the case of applying the fourth transmission method.

Next, an example of the functional configuration of the processor 200 (reception device) in the case of applying the fourth transmission method will be described. For example, FIG. 37 is a block diagram illustrating an example of the functional configuration of the processor 200 when the fourth transmission method is applied. As illustrated in FIG. 37, the processor 200 includes, for example, a header separator 432, a header interpreter 434, a payload separator 436, an EBD interpreter 438, a region data separator 440, and an image processing unit 442.

The header separator 432 separates the header data corresponding to a header portion and the payload data corresponding to the payload portion from the received data. The header separator 432 separates the header data from the received data according to a rule defined in advance by a standard or the like, for example. Furthermore, the header separator 432 may separate the payload data from the received data according to a rule preliminarily defined by the standard, for example, or may separate the payload data from the received data based on the result of the processing performed by the header interpreter 434.

The header interpreter 434 interprets the content indicated by the header data.

As a specific example, the header interpreter 434 recognizes the format of the information that is set in a region other than top three bits of the extension region according to the header information type set in the top three bits of the extension region of a packet header. Subsequently, the header interpreter 434 reads out various types of information set in the extension region according to the recognition result of the format. This enables the header interpreter 434 to recognize transmission of region (ROI) information (for example, region data) or the region type, that is, the type of information to be inserted in the payload as information related to the partial region based on, for example, the information set in the extension region. Subsequently, the header interpreter 434 notifies the payload separator 436 and the image processing unit 442 (an information extraction unit 444, which will be described below) of the setting recognized according to the read result of various types of information set in the extension region. Specifically, in a case where the header interpreter 434 has recognized transmission of the region (ROI) information (for example, region data), the header interpreter 434 notifies the payload separator 436 and the image processing unit 442 of the recognition result and the recognized region type.

The example of the process performed on the header interpreter 434 is not limited to the above example. For example, the header interpreter 434 may specify the position of the payload data and may transfer the specified position to the header separator 432. The header interpreter 434 can also distinguish between packet A2 that transmits "Embedded Data" and packet A1 that transmits region data.

The payload separator 436 separates the additional information, information regarding a partial region, and the image data (ordinary data or region data) from the payload data based on the interpretation result from the header interpreter 434.

For example, in a case where the packet as a processing target is packet A2 or A3, the payload separator 436 may separate additional information (Embedded Data) from the packet.

Furthermore, as another example, in a case where the packet as a processing target is packet A1, the payload separator 436 separates information (ROI Information (RI)) regarding the partial region and the image data from the payload data.

The payload separator 436 transmits additional information out of various types of data separated from the payload data, to the EBD interpreter 438. Furthermore, the payload separator 436 transmits information regarding a partial region and image data (region data or ordinary data) out of various data separated from the payload data, to the region data separator 440. The payload separator 436.

The EBD interpreter 438 interprets the content of additional information (Embedded Data) and then outputs the interpretation result of the additional information to the region data separator 440 and the image processing unit 442. The format of the additional information (Embedded Data) is as described above with reference to FIG. 29.

The region data separator 440 discriminates whether the image data stored in the payload is region data or ordinary data on the basis of the interpretation result of the additional information (Embedded Data). For example, in a case where the region data is stored in the payload, the region data separator 440 separates a series of data including the information regarding a partial region (ROI Information (RI)) and the region data from the payload data according to the interpretation result of the additional information and then transmits the separated data to the image processing unit 442 (a region decoder 416, which will be described below). In a case where ordinary data is stored in the payload, the region data separator 440 separates the ordinary data from the payload data and then transmits the separated ordinary data to the image processing unit 442 (an ordinary image decoder 450, which will be described below).

The image processing unit 442 includes an information extraction unit 444, a region decoder 446, a region image generator 448, and an ordinary image decoder 450.

In a case where the information extraction unit 444 has recognized transmission of region (ROI) information on the basis of the interpretation result on the header interpreter 434, the information extraction unit 444 extracts various types of information (particularly region information) included in the additional information on the basis of the interpretation result of the additional information (Embedded Data). Subsequently, the information extraction unit 214 outputs various types of information extracted from the additional information and the region type acquired as the interpretation result obtained by the header interpreter 434 to the region decoder 446 and the region image generator 448.

The region decoder 446 extracts information (ROI Information (RI)) regarding the partial region from the series of data transmitted from the region data separator 440 according to the region type output from the information extraction unit 444. Furthermore, the region decoder 446 separates region data corresponding to each of regions from the series of data based on the extracted information regarding the partial region. At this time, the region decoder 446 recognizes the number of pieces of region data included in the series of data (in other words, the number of regions included in the corresponding line) in accordance with the number of partial regions (Num of ROI) included in the information regarding the partial region. Furthermore, the region decoder 446 recognizes the length of the region data corresponding to each of regions in accordance with the width (ROI LEN) of each of regions included in the information regarding the partial region. This enables the region decoder 446 to separate the region data corresponding to each of regions from the series of data described above. The region decoder 446 decodes the separated region data of each of regions by a predetermined method corresponding to the encoding in the image sensor 100. At this time, the region decoder 446 may change the content of the process based on various types of information extracted from the additional information (Embedded Data).

The region image generator 448 generates data representing an image corresponding to the region from region data for each of regions decoded by the region decoder 446, based on various types of information (for example, region information) extracted from the additional information (Embedded Data) and based on information regarding a partial region (ROI Information (RI)).

For example, the region image generator 448 discriminates which region includes each of pieces of region data corresponding to partial region for each of lines, which is region data separated for each of regions, based on the identification information (ROI ID) included in the information (ROI Information (RI)) regarding a partial region. Furthermore, the region image generator 448 recognizes the position, within the image, of each of regions set in the image and the size of the region based on X coordinate (ROI X) and a width (ROI LEN) included in the information regarding a partial region. Subsequently, the region image generator 448 combines a series of region data corresponding to the region based on the position in the image of each of regions set in the image and based on the recognition result of the region size. As described above, the region image generator 448 combines the series of region data corresponding to each of regions to generate a region image corresponding to the region set in the image.

As described above, the region image generator 448 generates a region image for each of regions set in the image and outputs the generated region image to a predetermined output destination.

The ordinary image decoder 450 decodes the ordinary data transmitted from the region data separator 440 by a predetermined method corresponding to the encoding in the image sensor 100 to generate an ordinary image and then outputs the generated ordinary image to a predetermined output destination.

The above-described configuration is merely an example, and the functional configuration of the processor 200 is not limited to this. For example, the device or electronic device that executes each of the above functions is not limited as long as each of the functions can be realized. As a more specific example, some of the functions of the processor 200 may be provided outside the processor 200.

Furthermore, additional functions may be added as long as the functions of the processor 200 described above are not hindered, similarly to the above-described first transmission method.

(Evaluation)

As described above, in the fourth transmission method, the region information of each of regions set in the image is transmitted in packet A2 as a part of additional information (Embedded Data), and the region data corresponding to each of regions is transmitted for each of lines in packet A1. Furthermore, in a case of transmitting the data of the region set in the image, information indicating that the region information (for example, region data) is to be transmitted is set in the extension region of the header of each of packets. Furthermore, in this case, information (ROI Information (RI)) regarding each of partial regions of each of regions included in the corresponding line can be inserted into the payload of each of packets. At this time, a region type (ROI Info Type) is set for the extension region of the header of each of packets in accordance with the type of information regarding a partial region inserted in the payload. With the above configuration, the receiving side combines region data stored in the payload of each of packets A1 based on the additional information (Embedded Data) and information (ROI Information (RI)) regarding a partial region, making it possible to easily restore the region image of the region set in the image. As described above, in the fourth transmission method, it is possible to finely set information regarding each of partial regions for each of lines of the region (ROI) set in the image as information regarding the partial region (ROI Information (RI). Due to such characteristics, the fourth method makes it possible to transmit information regarding a region having an arbitrary shape.

<3.5. Supplement>

Note that the example described above is merely an example, and does not necessarily limit the technology according to the present disclosure, particularly the technology related to the transmission method for transmitting the region data concerning the region (ROI) that is set for an image. For example, the transmission method is not limited as long as the receiving side can recognize whether or not the payload of the packet includes region data. There is no need to set information indicating that the region information is to be transmitted to the extension region of the packet header. As a specific example, the receiving side may recognize whether or not the payload of the packet includes region data based on an extension region of a packet header or information regarding a region (ROI) included in additional information (Embedded Data), such as "ROI ID", "upper left coordinate", "height", and "width".

4. CONCLUSION

Preferred embodiments of the present disclosure have been described in detail hereinabove with reference to the accompanying drawings, but the technical scope of the present disclosure is not limited to such examples. It is obvious that a person with an ordinary skill in a technological field of the present disclosure could conceive of various alterations or corrections within the scope of the technical ideas described in the appended claims, and it should be understood that such alterations or corrections will naturally belong to the technical scope of the present disclosure.

Furthermore, the advantageous effects described in the present specification are only descriptive or exemplary, and non-limiting. In other words, the technology according to the present disclosure affords, in addition to or instead of the foregoing advantageous effects, other advantageous effects which are obvious to a person skilled in the art from the descriptions of the present specification.

Note that the following configurations also fall within the technical scope of the present disclosure.

(1)

A transmission device comprising an image processing unit that controls to transmit a first packet including region information regarding a region detected from an image and controls to transmit a second packet for each of lines in which at least the region has been detected in the image, the second packet including: a header including information regarding the line; and a payload including region data concerning a partial region corresponding to the line, out of the region, wherein the header includes: identification information of the data included in the payload; an error correction code of the information included in the header; and an extension region provided so as to be interposed between the identification information and the error correction code, and information indicating whether or not the region data is included in the payload corresponding to the header is set in at least a part of the extension region.

(2)

The transmission device according to (1), wherein the header includes: information indicating a start of a frame, information indicating an end of the frame, information indicating whether or not a corresponding line is valid, a line number, information indicating whether or not a line has embedded data, the identification information, the extension region, and the error correction code, being arranged in this order.

(3)

The transmission device according to (1) or (3), wherein the second packet is individually transmitted for each of the partial regions included in the line.

(4)

The transmission device according to (3), wherein the payload includes information regarding coordinates of the corresponding partial region, and information indicating that the payload includes the information regarding the coordinates is set in the extension region.

(5)

The transmission device according to (1) or (2), wherein the second packet is transmitted for each of lines, and the payload included in the second packet includes the region data for each of the partial regions included in the line.

(6)

The transmission device according to (5), wherein the payload of the second packet corresponding to the line including a plurality of the partial regions includes data corresponding to an interval between two partial regions separated from each other in the image, between the region data corresponding to each of the two partial regions.

(7)

The transmission device according to (6), wherein the payload includes information regarding coordinates of a top partial region out of the partial regions included in the corresponding line, and information indicating that the payload includes information regarding the coordinates is set in the extension region.

(8)

The transmission device according to (5), wherein a position, within the image, of the partial region corresponding to each of one or more pieces of the region data included in the payload is specified based on the region information regarding the region including the partial region included in the first packet.

(9)

The transmission device according to (5), wherein the payload includes information regarding the partial region included in the corresponding line, and information indicating type of information regarding the partial region included in the payload is set in the extension region.

(10)

The transmission device according to (9), wherein the information regarding the partial region includes information regarding the number of the partial regions included in the corresponding line and includes at least one of identification information, coordinates, or length regarding the partial region for each of the partial regions.

(11)

The transmission device according to (9) or (10), wherein, in the payload corresponding to a second line immediately succeeding a first line, information having a set value different from the first line out of the information regarding the partial region is set.

(12)

The transmission device according to any one of (1) to (11), wherein the region information includes at least one of identification information, coordinates, height, width, AD word length, exposure, gain, which are related to the region, information regarding a subject, or information for post-stage signal processing.

(13)

A reception device comprising an image processing unit that restores a partial image corresponding to a region detected from an image, based on a result of reception of a first packet including region information regarding the region and based on a result of reception of a second packet for each of lines in which at least the region has been detected in the image, the second packet including: a header including information regarding the line; and a payload including region data concerning a partial region corresponding to the line, out of the region, wherein the header includes: identification information of the data included in the payload; an error correction code of the information included in the header; and an extension region provided so as to be interposed between the identification information and the error correction code, and information indicating whether or not the region data is included in the payload corresponding to the header is set in at least a part of the extension region.

(14)

The reception device according to (13), wherein, in a case where information indicating that the region data is included in the payload corresponding to the header is set for at least a part of the extension region of the header, the image processing unit restores the partial image corresponding to the region, based on the result of reception of the first packet and the result of reception of the second packet.

(15)

The reception device according to (13) or (14), wherein the image processing unit restores the partial image corresponding to the region by performing restoration processing on the region data included in the payload of one or more of the second packets, based on the region information.

(16)

The reception device according to (13) or (14), wherein the second packet is transmitted individually for each of the partial regions included in the line, the payload includes information regarding coordinates of the corresponding partial region, information indicating that the payload includes the information regarding the coordinates is set in the extension region, and the image processing unit performs restoration processing on the region data included in the payload of the one or more second packets and thereby restores the partial image corresponding to the region, for each of the regions set in the image, based on the region information, and the information regarding the coordinates included in the payload of the one or more second packets corresponding to the partial region of the region.

(17)

The reception device according to (13) or (14), wherein the payload of the second packet corresponding to the line including a plurality of the partial regions includes data corresponding to an interval between two partial regions separated from each other in the image, between the region data corresponding to each of the two partial regions, the payload includes information regarding coordinates of a top partial region out of the partial regions included in the corresponding line, Information indicating that the payload includes the information regarding coordinates is set in the extension region, and the image processing unit performs, for each of the regions, restoration processing on the region data included in the payload of the one or more second packets and thereby restores the partial image corresponding to the region, based on the region information, and the coordinates included in the payload of the one or more second packets.

(18)

The reception device according to (13) or (14), wherein the payload includes information regarding the partial region included in the corresponding line, information indicating the type of information regarding the partial region included in the payload is set in the extension region, and the image processing unit performs, for each of the regions, restoration processing on the region data included in the payload of the one or more second packets and thereby restores the partial image corresponding to the region, based on the region information and the information regarding the partial region included in the payload which has been extracted on the basis of the information indicating the type set in the extension region for each of the one or more second packets.

(19)

A communication system comprising:

a transmission device including a first image processing unit that controls to transmit a first packet including region information regarding a region detected from an image and controls to transmit a second packet for each of lines in which at least the region has been detected in the image, the second packet including a header including information regarding the line, and a payload including region data concerning a partial region corresponding to the line, out of the region; and a reception device including a second image processing unit that restores a partial image corresponding to the region on the basis of a result of reception of the first packet and a result of reception of the second packet for each of lines in which at least the region has been detected in the image, wherein the header includes: identification information of the data included in the payload; an error correction code of the information included in the header; and an extension region provided so as to be interposed between the identification information and the error correction code, and information indicating whether or not the region data is included in the payload corresponding to the header is set in at least a part of the extension region.

(20)

A transmission device comprising
an image processing unit that controls to transmit a first packet including region information regarding a region detected from an image and controls to transmit a second packet for each of lines in which at least the region has been detected in the image, the second packet including: a header including information regarding the line; and a payload including region data concerning a partial region corresponding to the line, out of the region,
wherein whether or not the payload of the second packet includes the region data is recognized on the receiving side of the second packet, based on at least one of information included in the header corresponding to the payload or the region information.

(21)

A reception device comprising
an image processing unit that restores a partial image corresponding to a region detected from an image, based on a result of reception of a first packet including region information regarding the region and based on a result of reception of a second packet for each of lines in which at least the region has been detected in the image, the second packet including: a header including information regarding the line; and a payload including region data concerning a partial region corresponding to the line, out of the region,
wherein the image processing unit recognizes whether or not the payload of the second packet includes the region data, based on at least one of information included in the header corresponding to the payload or the region information.

(22)

A communication system comprising:
a transmission device including a first image processing unit that controls to transmit a first packet including region information regarding a region detected from an image and controls to transmit a second packet for each of lines in which at least the region has been detected in the image, the second packet including a header including information regarding the line, and a payload including region data concerning a partial region corresponding to the line, out of the region; and
a reception device including a second image processing unit that restores a partial image corresponding to the region on the basis of a result of reception of a first packet and a result of reception of a second packet for each of lines in which at least the region has been detected in the image,
wherein the second image processing unit recognizes whether or not the payload of the second packet includes the region data, based on at least one of information included in the header corresponding to the payload or the region information.

REFERENCE SIGNS LIST

1000 COMMUNICATION SYSTEM
100 IMAGE SENSOR
102 IMAGE SENSOR DEVICE
104, 130, 300 IC CHIP
106, 132, 302 IMAGE PROCESSING UNIT
108, 304, 334 LINK/PHY CONTROLLER
110, 306, 336 CONTROL CODE GENERATOR
112, 134, 308, 338 PH GENERATOR
114, 138, 310, 340 EBD BUFFER
116, 312, 342 IMAGE DATA BUFFER
118, 136, 314 COMBINING UNIT
120, 328, 358 TRANSMITTING UNIT
122, 316, 346 REGION CUTOUT UNIT
124, 326 IMAGE PROCESSING CONTROLLER
126, 140, 324, 354 ENCODER
318, 348 REGION ANALYZER
320, 350 OVERLAP DETECTOR
322, 352 PRIORITY SETTING UNIT
200 PROCESSOR
202, 232, 402, 432 HEADER SEPARATOR
204, 234, 404, 434 HEADER INTERPRETER
206, 236, 406, 436 PAYLOAD SEPARATOR
208, 238, 408, 438 EBD INTERPRETER
210 FRAME MEMORY
212, 240, 412, 442 IMAGE PROCESSING UNIT
214, 242, 414, 444 INFORMATION EXTRACTION UNIT
216, 244, 416, 446 REGION DECODER
218, 246, 418, 448 REGION IMAGE GENERATOR
220, 420, 450 ORDINARY IMAGE DECODER
410, 440 REGION DATA SEPARATOR
800 MEMORY
900 DISPLAY DEVICE

The invention claimed is:

1. A transmission device comprising
an image processing unit that controls to transmit a first packet including region information regarding a region detected from an image and controls to transmit a second packet for each of lines in which at least the region has been detected in the image, the second packet including: a header including information regarding the line; and a payload including region data concerning a partial region corresponding to the line, out of the region,
wherein the header includes: identification information of the data included in the payload; an error correction code of the information included in the header; and an extension region provided so as to be interposed between the identification information and the error correction code, and
information indicating whether or not the region data is included in the payload corresponding to the header is set in at least a part of the extension region.

2. The transmission device according to claim 1, wherein the header includes: information indicating a start of a frame, information indicating an end of the frame, information indicating whether or not a corresponding line is valid, a line number, information indicating whether or not a line has embedded data, the identification information, the extension region, and the error correction code, being arranged in this order.

3. The transmission device according to claim 1, wherein the second packet is individually transmitted for each of the partial regions included in the line.

4. The transmission device according to claim 3,
wherein the payload includes information regarding coordinates of the corresponding partial region, and
information indicating that the payload includes the information regarding the coordinates is set in the extension region.

5. The transmission device according to claim 1,
wherein the second packet is transmitted for each of lines, and
the payload included in the second packet includes the region data for each of the partial regions included in the line.

6. The transmission device according to claim 5, wherein the payload of the second packet corresponding to the line including a plurality of the partial regions includes data corresponding to an interval between two partial regions separated from each other in the image, between the region data corresponding to each of the two partial regions.

7. The transmission device according to claim 6,
wherein the payload includes information regarding coordinates of a top partial region out of the partial regions included in the corresponding line, and
information indicating that the payload includes information regarding the coordinates is set in the extension region.

8. The transmission device according to claim 5, wherein a position, within the image, of the partial region corresponding to each of one or more pieces of the region data included in the payload is specified based on the region information regarding the region including the partial region included in the first packet.

9. The transmission device according to claim 5,
wherein the payload includes information regarding the partial region included in the corresponding line, and
information indicating type of information regarding the partial region included in the payload is set in the extension region.

10. The transmission device according to claim 9, wherein the information regarding the partial region includes information regarding the number of the partial regions included in the corresponding line and includes at least one of identification information, coordinates, or length regarding the partial region for each of the partial regions.

11. The transmission device according to claim 9, wherein, in the payload corresponding to a second line immediately succeeding a first line, information having a set value different from the first line out of the information regarding the partial region is set.

12. The transmission device according to claim 1, wherein the region information includes at least one of identification information, coordinates, height, width, AD word length, exposure, gain, which are related to the region, information regarding a subject, or information for post-stage signal processing.

13. A reception device comprising
an image processing unit that restores a partial image corresponding to a region detected from an image, based on a result of reception of a first packet including region information regarding the region and based on a result of reception of a second packet for each of lines in which at least the region has been detected in the image, the second packet including: a header including information regarding the line; and a payload including region data concerning a partial region corresponding to the line, out of the region,
wherein the header includes: identification information of the data included in the payload; an error correction code of the information included in the header; and an extension region provided so as to be interposed between the identification information and the error correction code, and
information indicating whether or not the region data is included in the payload corresponding to the header is set in at least a part of the extension region.

14. The reception device according to claim 13,
wherein, in a case where information indicating that the region data is included in the payload corresponding to the header is set for at least a part of the extension region of the header,
the image processing unit restores the partial image corresponding to the region, based on the result of reception of the first packet and the result of reception of the second packet.

15. The reception device according to claim 13, wherein the image processing unit restores the partial image corresponding to the region by performing restoration processing on the region data included in the payload of one or more of the second packets, based on the region information.

16. The reception device according to claim 13,
wherein the second packet is transmitted individually for each of the partial regions included in the line,
the payload includes information regarding coordinates of the corresponding partial region,
information indicating that the payload includes the information regarding the coordinates is set in the extension region, and
the image processing unit performs restoration processing on the region data included in the payload of the one or more second packets and thereby restores the partial image corresponding to the region, for each of the regions set in the image, based on the region information, and the information regarding the coordinates included in the payload of the one or more second packets corresponding to the partial region of the region.

17. The reception device according to claim 13,
wherein the payload of the second packet corresponding to the line including a plurality of the partial regions includes data corresponding to an interval between two partial regions separated from each other in the image, between the region data corresponding to each of the two partial regions,
the payload includes information regarding coordinates of a top partial region out of the partial regions included in the corresponding line,
Information indicating that the payload includes the information regarding coordinates is set in the extension region, and
the image processing unit performs, for each of the regions, restoration processing on the region data included in the payload of the one or more second packets and thereby restores the partial image corresponding to the region, based on the region information, and the coordinates included in the payload of the one or more second packets.

18. The reception device according to claim 13,
wherein the payload includes information regarding the partial region included in the corresponding line,
information indicating the type of information regarding the partial region included in the payload is set in the extension region, and
the image processing unit performs, for each of the regions, restoration processing on the region data included in the payload of the one or more second packets and thereby restores the partial image corresponding to the region, based on the region information and the information regarding the partial region included in the payload which has been extracted on the basis of the information indicating the type set in the extension region for each of the one or more second packets.

19. A communication system comprising:
a transmission device including a first image processing unit that controls to transmit a first packet including region information regarding a region detected from an image and controls to transmit a second packet for each of lines in which at least the region has been detected in the image, the second packet including a header including information regarding the line, and a payload including region data concerning a partial region corresponding to the line, out of the region; and a reception device including a second image processing unit that restores a partial image corresponding to the region on the basis of a result of reception of the first packet and a result of reception of the second packet for each of lines in which at least the region has been detected in the image, wherein the header includes: identification information of the data included in the payload; an error correction code of the information included in the header; and an extension region provided so as to be interposed between the identification information and the error correction code, and information indicating whether or not the region data is included in the payload corresponding to the header is set in at least a part of the extension region.

20. A transmission device comprising an image processing unit that controls to transmit a first packet including region information regarding a region detected from an image and controls to transmit a second packet for each of lines in which at least the region has been detected in the image, the second packet including: a header including information regarding the line; and a payload including region data concerning a partial region corresponding to the line, out of the region, wherein whether or not the payload of the second packet includes the region data is recognized on the receiving side of the second packet, based on at least one of information included in the header corresponding to the payload or the region information.

21. A reception device comprising an image processing unit that restores a partial image corresponding to a region detected from an image, based on a result of reception of a first packet including region information regarding the region and based on a result of reception of a second packet for each of lines in which at least the region has been detected in the image, the second packet including: a header including information regarding the line; and a payload including region data concerning a partial region corresponding to the line, out of the region, wherein the image processing unit recognizes whether or not the payload of the second packet includes the region data, based on at least one of information included in the header corresponding to the payload or the region information.

22. A communication system comprising:

a transmission device including a first image processing unit that controls to transmit a first packet including region information regarding a region detected from an image and controls to transmit a second packet for each of lines in which at least the region has been detected in the image, the second packet including a header including information regarding the line, and a payload including region data concerning a partial region corresponding to the line, out of the region; and a reception device including a second image processing unit that restores a partial image corresponding to the region on the basis of a result of reception of a first packet and a result of reception of a second packet for each of lines in which at least the region has been detected in the image, wherein the second image processing unit recognizes whether or not the payload of the second packet includes the region data, based on at least one of information included in the header corresponding to the payload or the region information.

\* \* \* \* \*